United States Patent
Doi et al.

(10) Patent No.: US 11,842,234 B2
(45) Date of Patent: Dec. 12, 2023

(54) IMAGE PROCESSING METHOD, IMAGE PROCESSING APPARATUS AND STORAGE MEDIUM

(71) Applicant: CANON KABUSHIKI KAISHA, Tokyo (JP)

(72) Inventors: Tsukasa Doi, Tokyo (JP); Hirokazu Tanaka, Tokyo (JP); Satoshi Seki, Kanagawa (JP); Junichi Nakagawa, Tokyo (JP); Mayuko Yamagata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/181,903

(22) Filed: Mar. 10, 2023

(65) Prior Publication Data

US 2023/0214618 A1 Jul. 6, 2023

Related U.S. Application Data

(63) Continuation of application No. 17/382,117, filed on Jul. 21, 2021, now Pat. No. 11,625,563.

(30) Foreign Application Priority Data

Jul. 29, 2020 (JP) .................. 2020-128331

(51) Int. Cl.
G06K 15/00 (2006.01)
G06K 15/10 (2006.01)
B41J 2/21 (2006.01)

(52) U.S. Cl.
CPC .......... *G06K 15/105* (2013.01); *B41J 2/2135* (2013.01)

(58) Field of Classification Search
None
See application file for complete search history.

(56) References Cited

U.S. PATENT DOCUMENTS

| 6,099,104 A | 8/2000 | Sato |
| 6,128,099 A | 10/2000 | Delabastita |
| (Continued) | | |

FOREIGN PATENT DOCUMENTS

| CN | 1945559 A | 4/2007 |
| CN | 101121340 A | 2/2008 |
| (Continued) | | |

OTHER PUBLICATIONS

Chinese Notification to Grant Patent issued in corresponding Chinese Patent Application No. 202110865682.2 dated May 2, 2023 (English translation included).

*Primary Examiner* — Dung D Tran
(74) *Attorney, Agent, or Firm* — VENABLE LLP

(57) ABSTRACT

An object is to print a high quality image with resistance to print misalignment. To this end, the image processing apparatus generates quantized data for printing a first dot pattern and a second dot pattern in an overlapping manner. The first dot pattern and the second dot pattern are lattice patterns varying in a combination of two basis vectors. In a combined dot pattern obtained by combining the first and second dot patterns, there is a neighboring dot in which a dot in the first dot pattern and a dot in the second dot pattern are arranged at an interval smaller than a lattice spacing. The neighboring dot includes multiple neighboring dots varying in an approach direction.

23 Claims, 43 Drawing Sheets

(56) References Cited

U.S. PATENT DOCUMENTS

| | | |
|---|---|---|
| 6,655,773 B2 | 12/2003 | Gotoh |
| 6,867,884 B1 | 3/2005 | Rozzi |
| 7,878,613 B2 | 2/2011 | Nishikori |
| 9,064,202 B2 | 6/2015 | Tanaka |
| 9,087,291 B2 | 7/2015 | Hori |
| 9,092,720 B2 | 7/2015 | Nakagawa |
| 9,195,917 B2 | 11/2015 | Nakagawa |
| 9,210,292 B2 | 12/2015 | Miyake |
| 9,862,214 B2 | 1/2018 | Suzuki |
| 9,888,149 B2 | 2/2018 | Suzuki |
| 10,033,906 B2 * | 7/2018 | Nakagawa ......... H04N 1/40087 |
| 10,225,439 B2 | 3/2019 | Suzuki |
| 10,771,657 B2 | 9/2020 | Doi |
| 11,565,527 B2 | 1/2023 | Tanaka |
| 11,573,750 B2 | 2/2023 | Nakagawa |
| 2006/0125865 A1 | 6/2006 | Shibata |
| 2008/0036812 A1 | 2/2008 | Kakutani |
| 2010/0245445 A1 | 9/2010 | Kano |
| 2010/0245446 A1 * | 9/2010 | Nishikori ............ G06K 15/107 |
| | | 347/15 |
| 2012/0044287 A1 | 2/2012 | Yamaguchi |
| 2012/0062636 A1 * | 3/2012 | Yamamoto ......... G06K 15/1881 |
| | | 347/15 |
| 2014/0139885 A1 | 5/2014 | Nakagawa |
| 2015/0158289 A1 | 6/2015 | Marumoto |
| 2015/0286905 A1 * | 10/2015 | Kikuta ................ G06K 15/105 |
| | | 358/1.8 |
| 2016/0210539 A1 | 7/2016 | Kato |
| 2016/0241740 A1 | 8/2016 | Nakagawa |
| 2017/0036466 A1 | 2/2017 | Tanaka |
| 2018/0124278 A1 | 5/2018 | Suzuki |
| 2020/0042840 A1 | 2/2020 | Doi |
| 2021/0019582 A1 | 1/2021 | Nakagawa |
| 2022/0032610 A1 * | 2/2022 | Doi ....................... B41J 19/142 |
| 2022/0032646 A1 * | 2/2022 | Tanaka ..................... B41J 2/15 |
| 2022/0035577 A1 * | 2/2022 | Nakagawa ........... G06K 15/107 |

FOREIGN PATENT DOCUMENTS

| | | |
|---|---|---|
| CN | 101540002 A | 9/2009 |
| EP | 0564252 B1 | 9/2003 |
| JP | 2005-136612 A | 5/2005 |
| JP | 2006-205490 A | 8/2006 |
| JP | 2014-113819 A | 6/2014 |
| JP | 2017-035886 A | 2/2017 |
| JP | 2013-129140 A | 7/2023 |
| RU | 2337009 C2 | 10/2008 |

\* cited by examiner

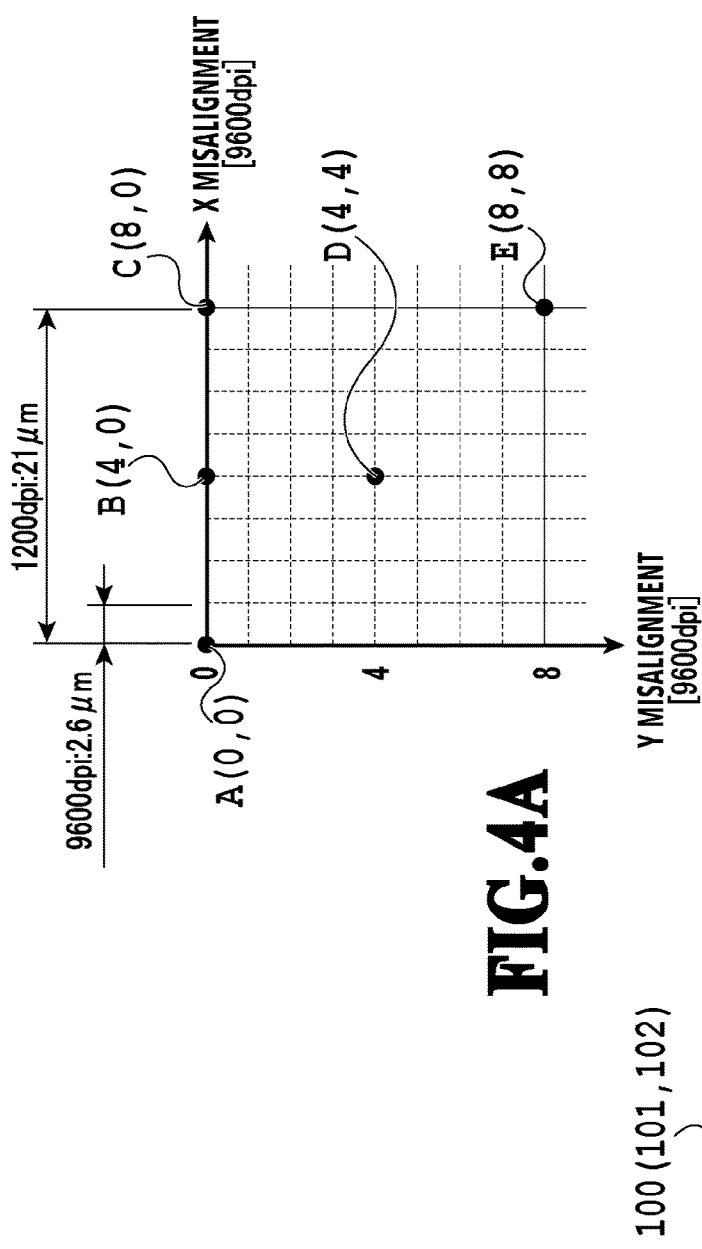
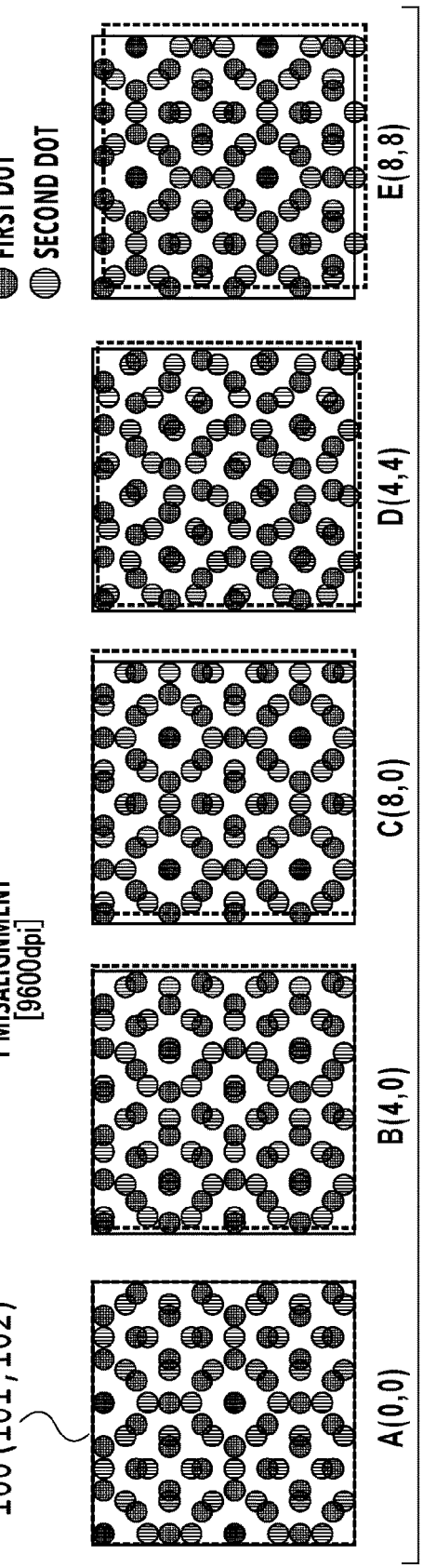
FIG.4A
FIG.4B

FOR FORWARD SCAN

| 1 | 187 | 240 | 118 | 166 | 46 | 143 | 194 | 136 | 244 | 10 | 187 | 241 | 119 | 167 | 47 | 144 | 195 | 136 | 242 |
|---|---|---|---|---|---|---|---|---|---|---|---|---|---|---|---|---|---|---|---|
| 217 | 104 | 30 | 76 | 223 | 99 | 183 | 12 | 77 | 161 | 218 | 106 | 28 | 74 | 222 | 100 | 182 | 14 | 78 | 162 |
| 65 | 138 | 196 | 159 | 3 | 237 | 62 | 113 | 209 | 48 | 63 | 139 | 198 | 158 | 5 | 235 | 61 | 113 | 210 | 49 |
| 177 | 23 | 246 | 92 | 131 | 175 | 25 | 152 | 239 | 97 | 178 | 23 | 245 | 93 | 131 | 174 | 26 | 151 | 238 | 99 |
| 229 | 115 | 51 | 43 | 208 | 81 | 122 | 200 | 6 | 134 | 228 | 116 | 52 | 44 | 207 | 79 | 123 | 199 | 9 | 133 |
| 32 | 163 | 193 | 145 | 221 | 15 | 249 | 56 | 184 | 86 | 31 | 164 | 191 | 146 | 220 | 15 | 247 | 57 | 185 | 85 |
| 72 | 254 | 10 | 70 | 107 | 170 | 94 | 38 | 141 | 213 | 73 | 253 | 3 | 69 | 108 | 168 | 95 | 39 | 140 | 212 |
| 157 | 103 | 129 | 232 | 33 | 190 | 154 | 231 | 109 | 20 | 155 | 102 | 128 | 233 | 34 | 189 | 153 | 230 | 111 | 21 |
| 224 | 42 | 180 | 204 | 81 | 127 | 8 | 66 | 203 | 172 | 226 | 40 | 178 | 205 | 83 | 125 | 5 | 68 | 201 | 171 |
| 54 | 86 | 150 | 22 | 58 | 216 | 251 | 90 | 37 | 120 | 53 | 88 | 148 | 21 | 60 | 215 | 250 | 90 | 36 | 121 |
| 1 | 188 | 242 | 118 | 168 | 47 | 145 | 196 | 137 | 243 | 0 | 186 | 240 | 117 | 166 | 46 | 143 | 194 | 135 | 244 |
| 219 | 106 | 28 | 74 | 223 | 101 | 181 | 14 | 77 | 162 | 217 | 105 | 29 | 75 | 224 | 100 | 182 | 13 | 76 | 161 |
| 64 | 139 | 198 | 159 | 7 | 235 | 61 | 112 | 211 | 50 | 65 | 138 | 197 | 160 | 12 | 236 | 63 | 114 | 210 | 49 |
| 177 | 16 | 246 | 93 | 130 | 173 | 27 | 150 | 237 | 98 | 176 | 17 | 247 | 92 | 132 | 175 | 26 | 152 | 239 | 97 |
| 227 | 116 | 53 | 45 | 207 | 79 | 124 | 200 | 4 | 132 | 228 | 115 | 51 | 44 | 208 | 80 | 123 | 201 | 0 | 134 |
| 30 | 165 | 192 | 147 | 219 | 24 | 248 | 58 | 185 | 84 | 31 | 164 | 193 | 146 | 221 | 24 | 249 | 56 | 184 | 85 |
| 72 | 253 | 11 | 69 | 109 | 169 | 96 | 40 | 141 | 212 | 71 | 255 | 2 | 70 | 108 | 170 | 95 | 38 | 142 | 214 |
| 156 | 102 | 127 | 234 | 35 | 189 | 154 | 230 | 111 | 18 | 157 | 104 | 129 | 233 | 33 | 191 | 155 | 231 | 110 | 17 |
| 226 | 41 | 179 | 206 | 83 | 125 | 7 | 67 | 202 | 171 | 225 | 42 | 180 | 205 | 82 | 126 | 8 | 67 | 203 | 173 |
| 54 | 88 | 148 | 19 | 60 | 214 | 251 | 91 | 35 | 122 | 55 | 87 | 149 | 19 | 59 | 216 | 252 | 89 | 37 | 120 |

1701

FOR BACKWARD SCAN

| 8 | 99 | 213 | 69 | 112 | 31 | 210 | 72 | 108 | 232 | 0 | 100 | 212 | 70 | 113 | 32 | 211 | 72 | 109 | 234 |
|---|---|---|---|---|---|---|---|---|---|---|---|---|---|---|---|---|---|---|---|
| 63 | 182 | 127 | 16 | 178 | 201 | 132 | 163 | 40 | 143 | 61 | 182 | 129 | 17 | 177 | 200 | 131 | 164 | 42 | 144 |
| 253 | 37 | 166 | 244 | 58 | 83 | 10 | 237 | 189 | 119 | 254 | 35 | 167 | 242 | 56 | 81 | 1 | 239 | 190 | 117 |
| 155 | 89 | 208 | 109 | 40 | 150 | 214 | 93 | 54 | 18 | 154 | 91 | 207 | 111 | 38 | 148 | 216 | 92 | 54 | 17 |
| 196 | 76 | 5 | 137 | 230 | 186 | 120 | 35 | 173 | 223 | 198 | 74 | 9 | 135 | 231 | 187 | 121 | 33 | 171 | 224 |
| 47 | 127 | 218 | 162 | 66 | 24 | 76 | 246 | 139 | 104 | 46 | 125 | 217 | 161 | 67 | 24 | 77 | 247 | 138 | 106 |
| 236 | 185 | 95 | 26 | 240 | 103 | 194 | 159 | 3 | 64 | 235 | 184 | 96 | 27 | 242 | 102 | 196 | 158 | 3 | 65 |
| 150 | 14 | 60 | 175 | 201 | 123 | 45 | 229 | 84 | 205 | 152 | 13 | 59 | 174 | 203 | 122 | 44 | 228 | 85 | 205 |
| 116 | 250 | 141 | 87 | 1 | 146 | 53 | 178 | 132 | 29 | 115 | 251 | 141 | 88 | 7 | 145 | 51 | 180 | 134 | 28 |
| 81 | 193 | 48 | 226 | 155 | 247 | 97 | 21 | 219 | 168 | 79 | 191 | 49 | 224 | 157 | 249 | 98 | 20 | 221 | 170 |
| 8 | 101 | 212 | 70 | 114 | 31 | 210 | 73 | 108 | 233 | 11 | 100 | 214 | 69 | 113 | 30 | 209 | 71 | 107 | 233 |
| 61 | 181 | 129 | 19 | 176 | 199 | 130 | 165 | 42 | 145 | 62 | 183 | 128 | 19 | 177 | 200 | 131 | 164 | 41 | 143 |
| 255 | 36 | 168 | 243 | 56 | 82 | 5 | 239 | 191 | 118 | 253 | 37 | 166 | 244 | 57 | 83 | 0 | 238 | 189 | 118 |
| 153 | 90 | 207 | 111 | 38 | 148 | 216 | 92 | 55 | 23 | 154 | 90 | 208 | 110 | 39 | 149 | 215 | 93 | 53 | 23 |
| 198 | 74 | 4 | 136 | 231 | 188 | 122 | 33 | 171 | 223 | 197 | 75 | 7 | 136 | 230 | 187 | 120 | 34 | 172 | 222 |
| 46 | 125 | 217 | 161 | 68 | 15 | 78 | 246 | 138 | 106 | 47 | 126 | 219 | 162 | 67 | 15 | 77 | 245 | 139 | 105 |
| 235 | 184 | 95 | 26 | 241 | 102 | 195 | 159 | 10 | 65 | 237 | 185 | 94 | 25 | 240 | 104 | 194 | 160 | 6 | 63 |
| 152 | 12 | 58 | 173 | 203 | 123 | 43 | 227 | 86 | 204 | 151 | 14 | 60 | 175 | 202 | 124 | 44 | 228 | 85 | 206 |
| 115 | 252 | 142 | 88 | 2 | 146 | 51 | 180 | 134 | 28 | 116 | 251 | 140 | 86 | 12 | 147 | 52 | 179 | 133 | 30 |
| 79 | 192 | 50 | 225 | 157 | 249 | 99 | 21 | 221 | 170 | 80 | 193 | 49 | 226 | 156 | 248 | 97 | 22 | 220 | 169 |

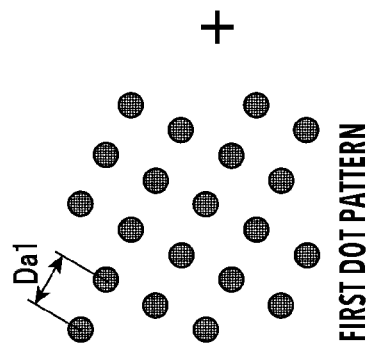
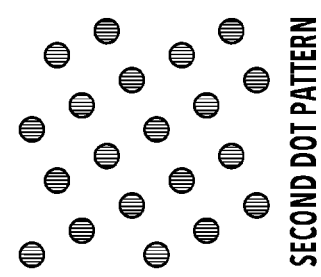
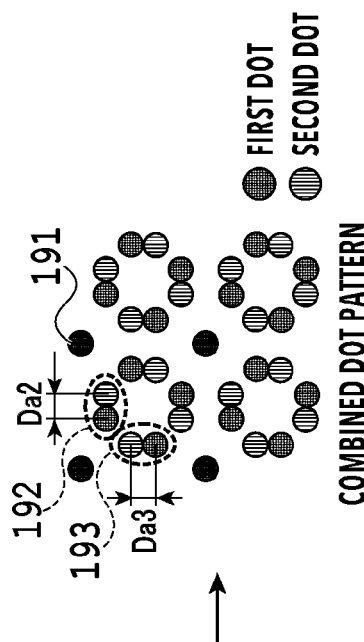
FIG.19A $K1' = K2' = 13$
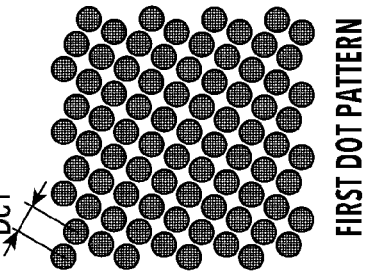
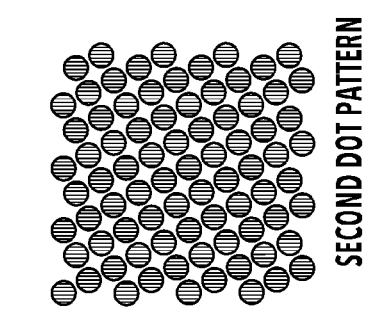
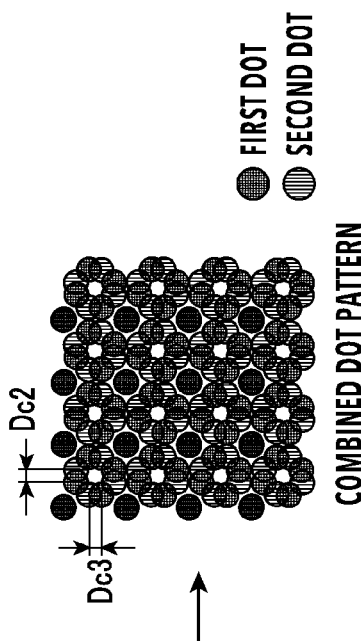
FIG.19B $K1' = K2' = 26$
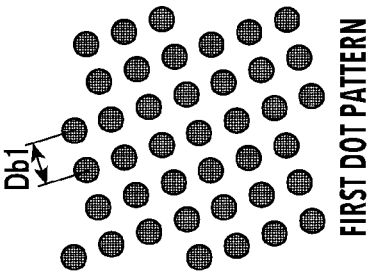
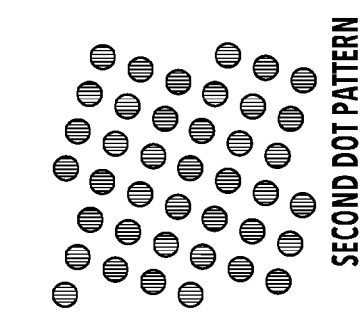
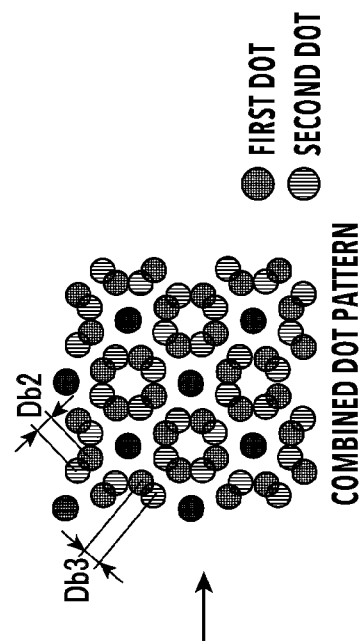
FIG.19C $K1' = K2' = 51$

1701 FIRST THRESHOLD MATRIX

1702 SECOND THRESHOLD MATRIX

FIG. 20B $C1' = C2' = 6$

CORRECTED FIRST THRESHOLD MATRIX

CORRECTED SECOND THRESHOLD MATRIX

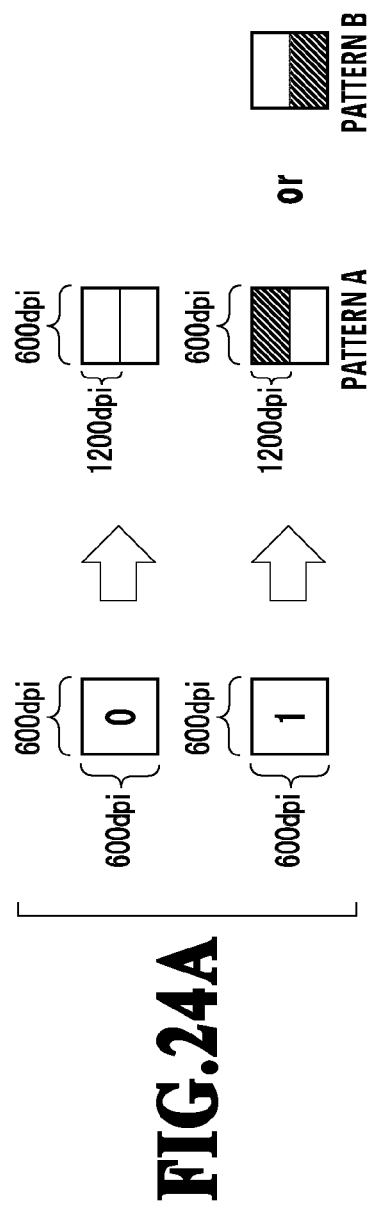
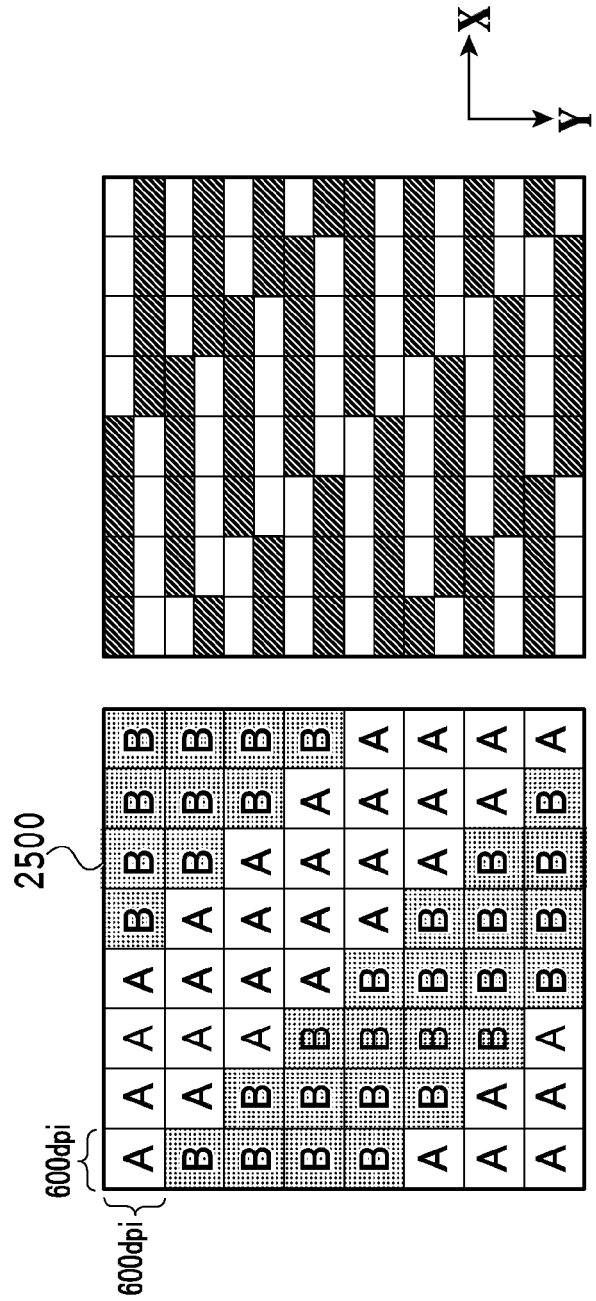
FIG.24A  FIG.24B  FIG.24C

| DRIVING ORDER | DRIVING BLOCK NO. |
|---|---|
| 1 | 1 |
| 2 | 5 |
| 3 | 9 |
| 4 | 13 |
| 5 | 2 |
| 6 | 6 |
| 7 | 10 |
| 8 | 14 |
| 9 | 3 |
| 10 | 7 |
| 11 | 11 |
| 12 | 15 |
| 13 | 4 |
| 14 | 8 |
| 15 | 12 |
| 16 | 16 |

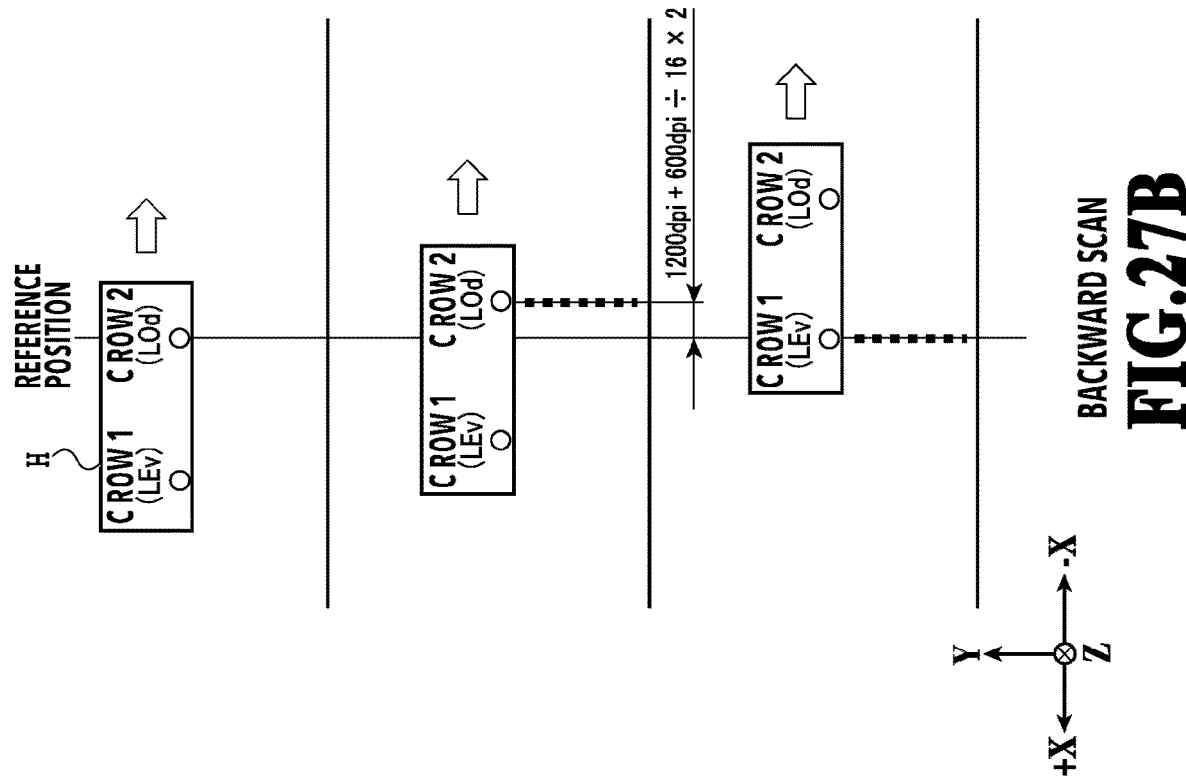
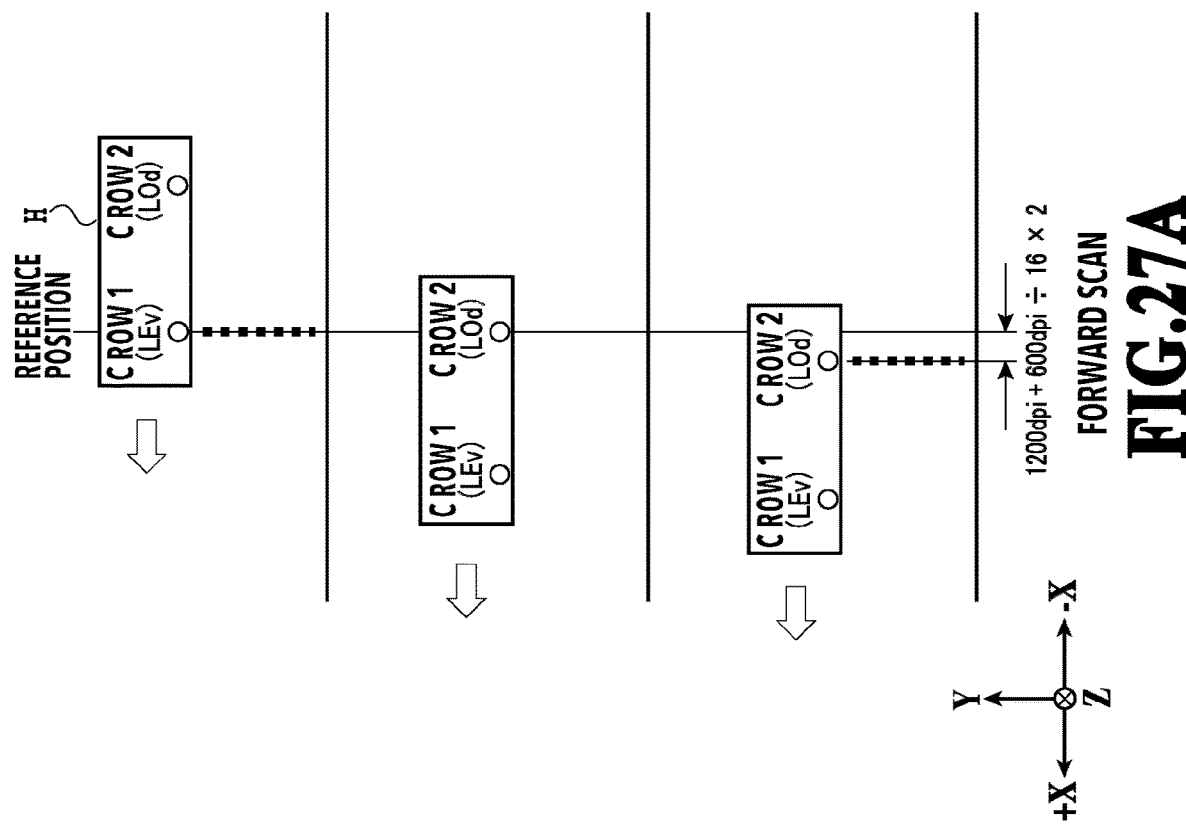

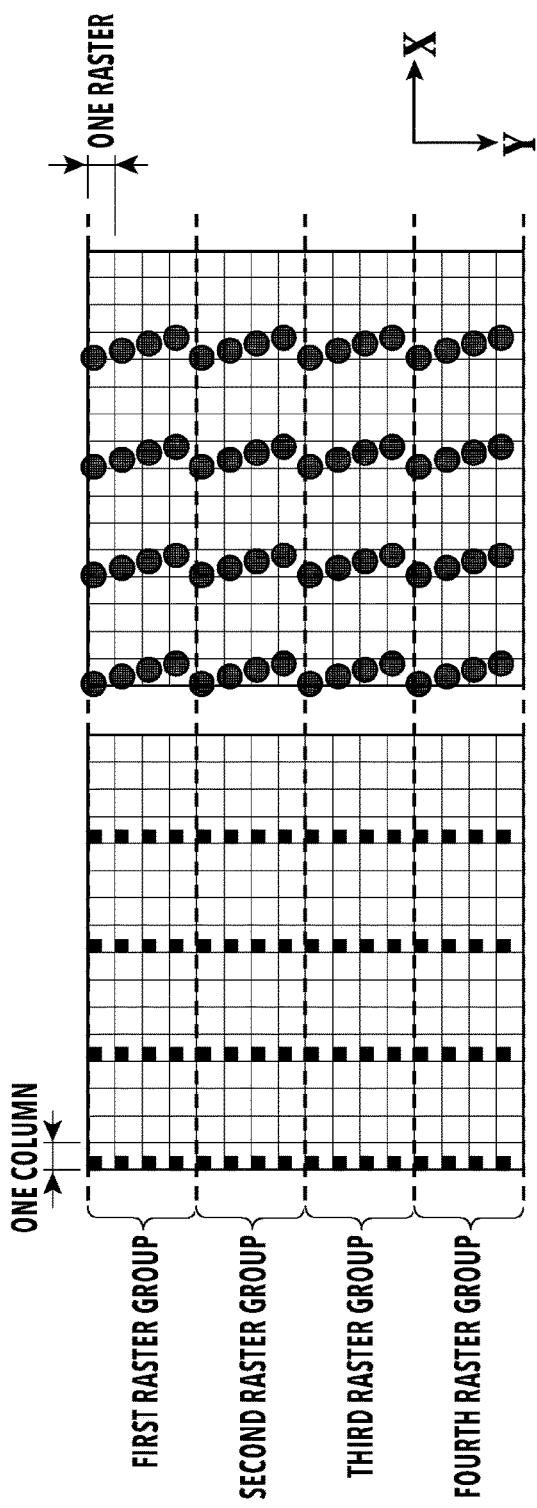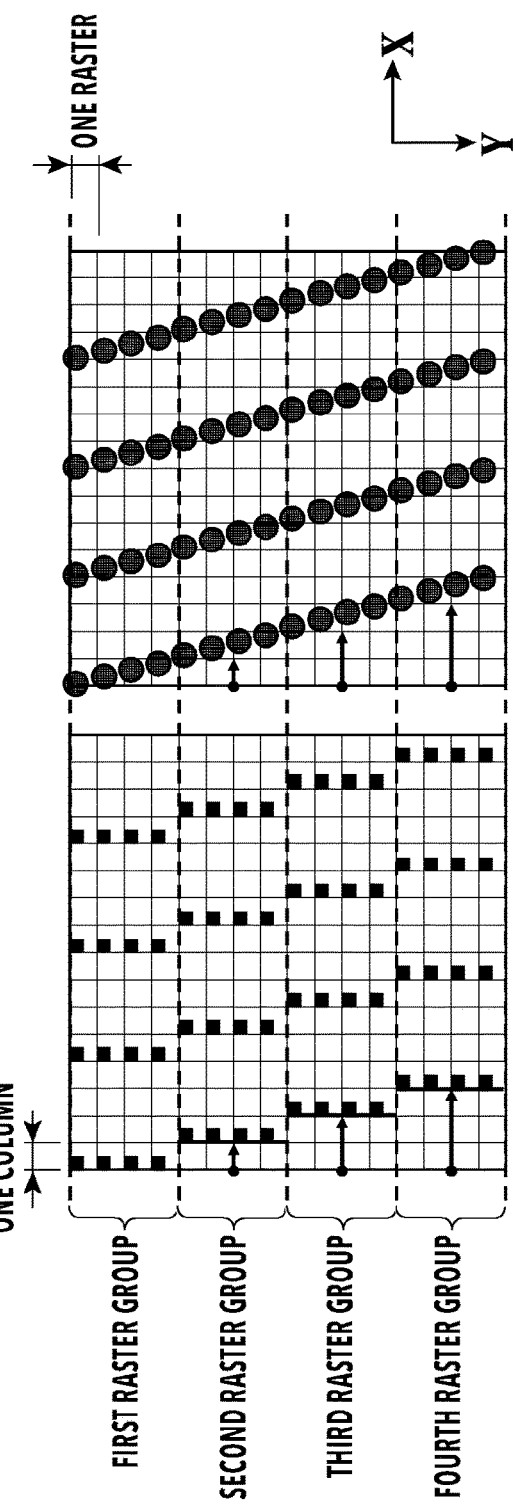

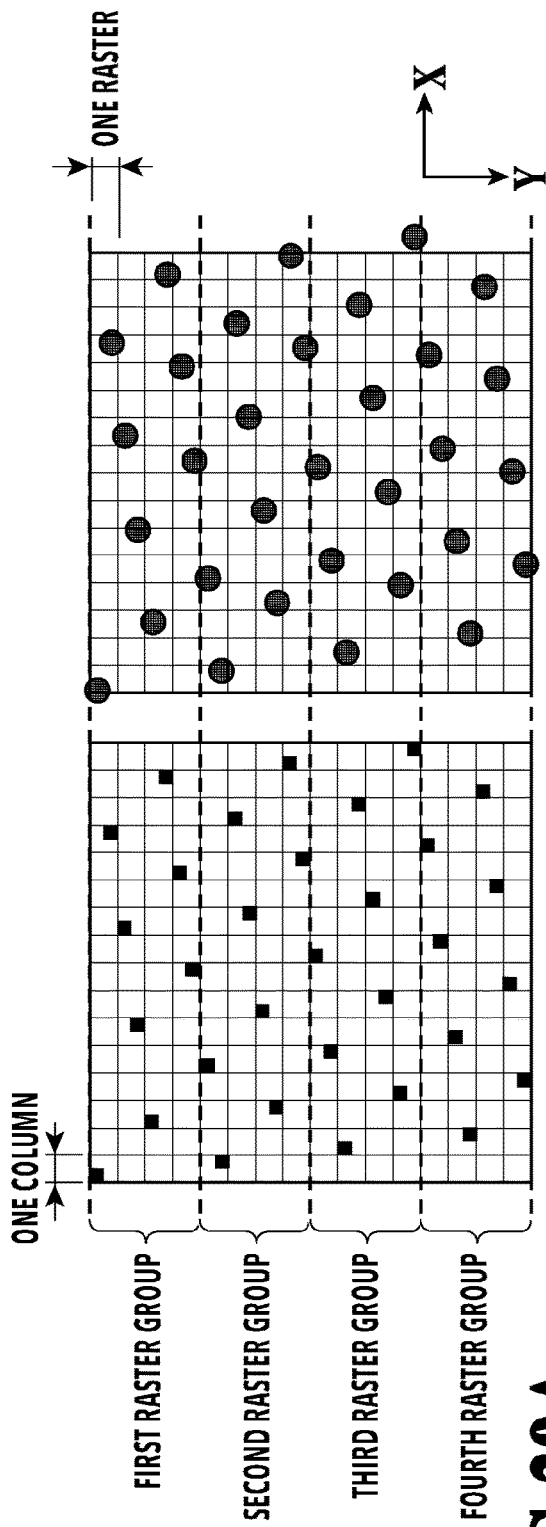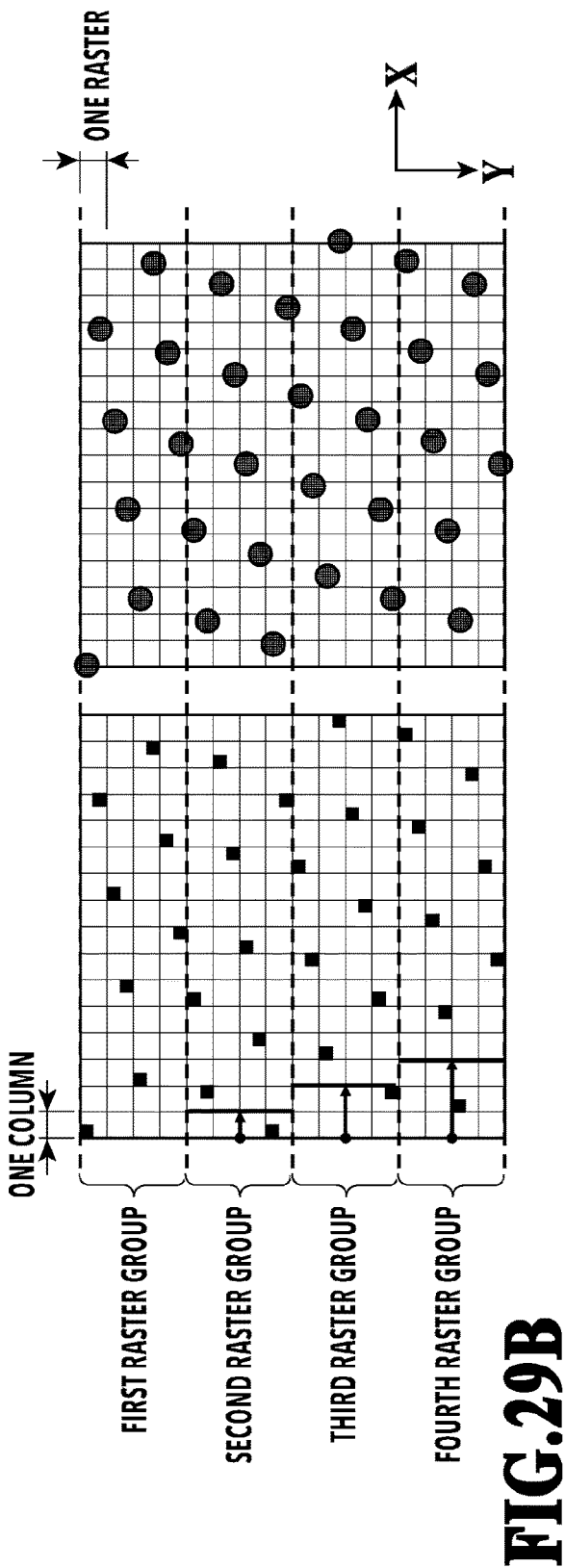

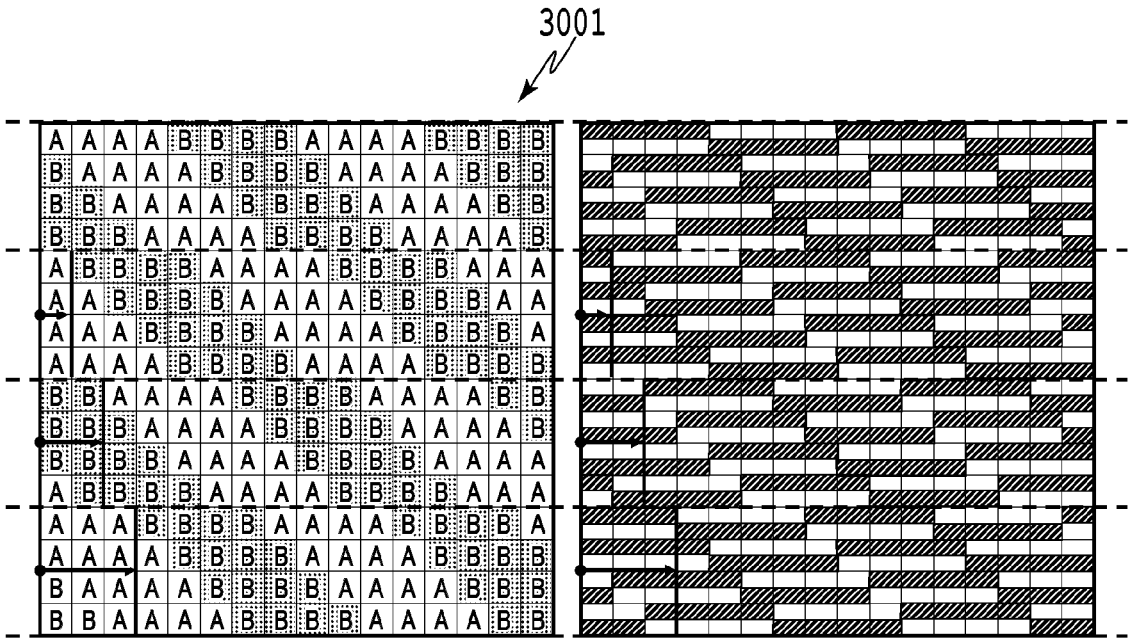
FIG.30A  FIG.30B
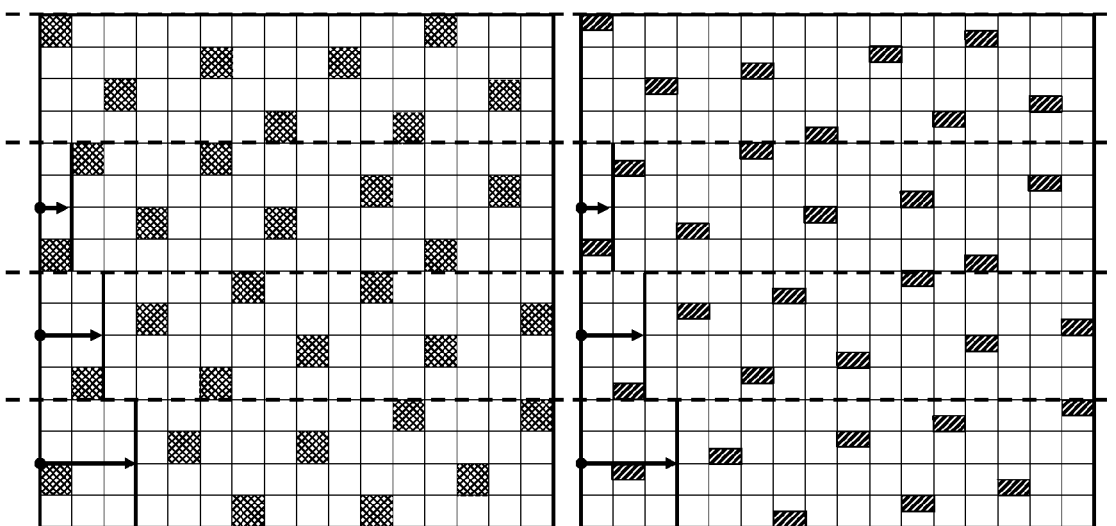
FIG.30C  FIG.30D

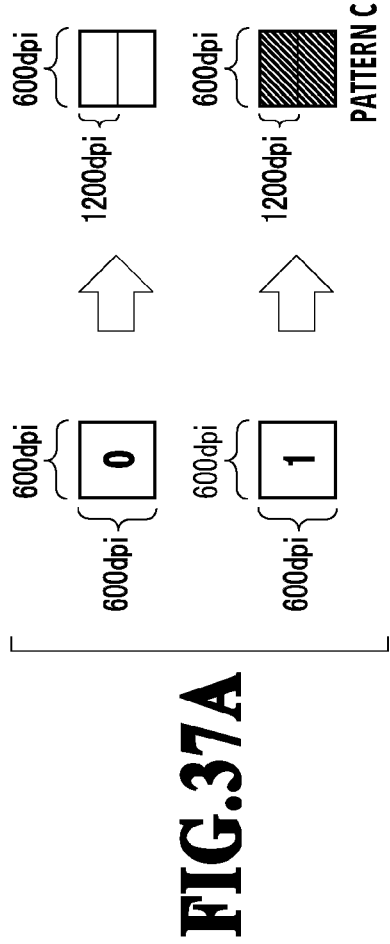
FIG.37A
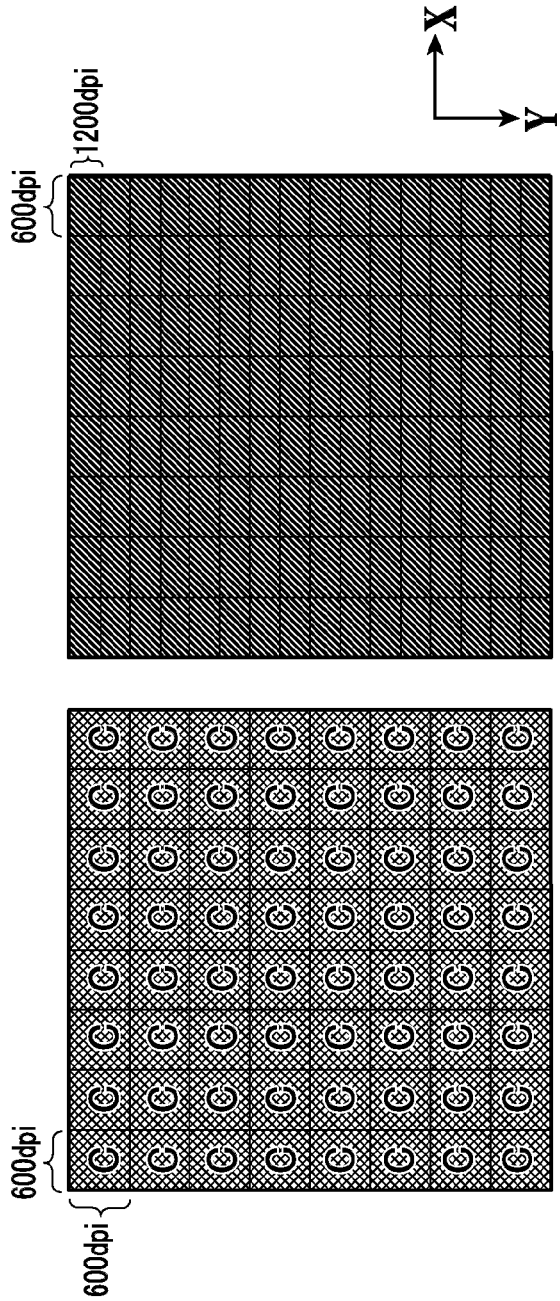
FIG.37B
FIG.37C

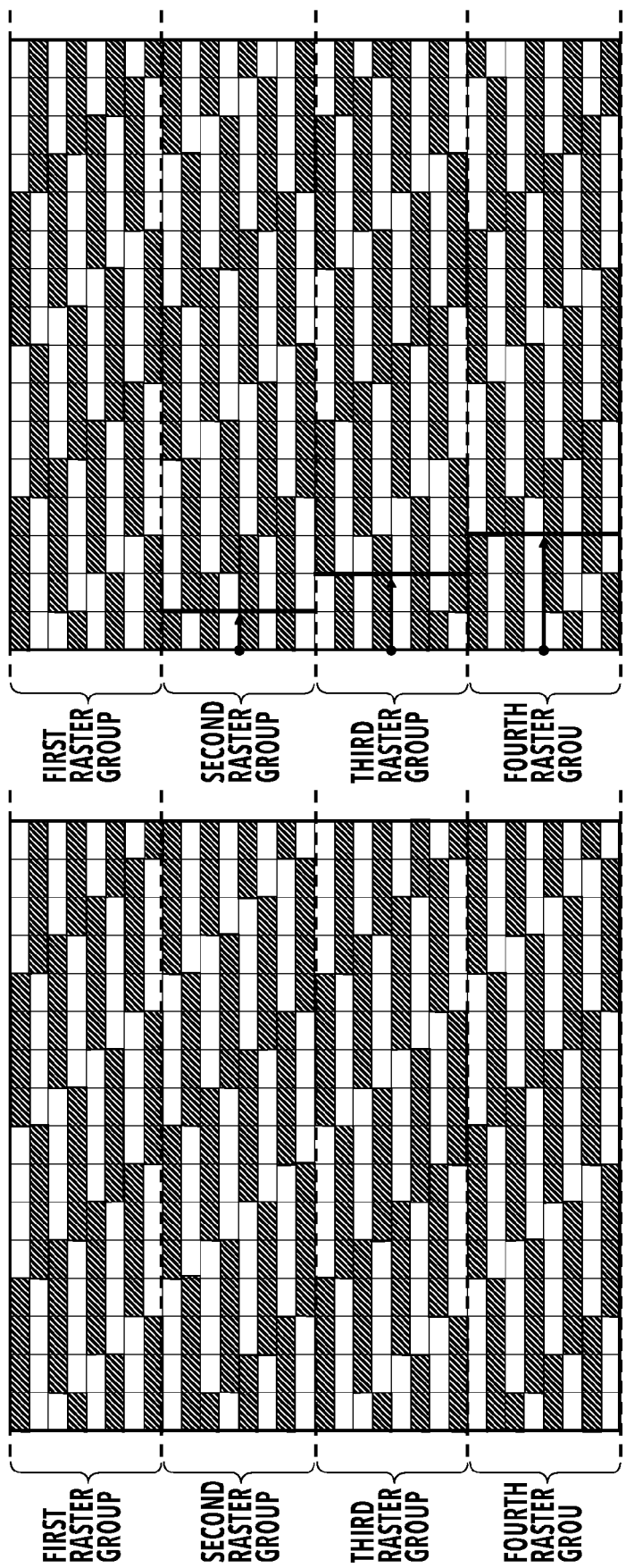

IMAGE PROCESSING METHOD, IMAGE PROCESSING APPARATUS AND STORAGE MEDIUM

This application is a continuation of U.S. application Ser. No. 17/382,117, filed Jul. 21, 2021, the contents of which are incorporated by reference herein.

BACKGROUND OF THE INVENTION

Field of the Invention

The present invention relates to an image processing method and an image processing apparatus.

Description of the Related Art

In a printing apparatus that prints an image by causing a print head and a print medium to move relative to each other, granularity or density unevenness of an image caused by print misalignment due to the aforementioned relative movement sometimes becomes noticeable. For example, in the case where a serial inkjet printing apparatus performs multipass printing and the print misalignment occurs in any print scan, relative misalignment between dot groups printed in different print scans affects dispersiveness of dots and this is sensed as graininess or density unevenness in some cases.

Japanese Patent Laid-Open No. 2017-035886 discloses a method of suppressing density unevenness due to print misalignment between scans by controlling frequency of a dot printed in one scan being adjacent to a dot printed in the other scan in a scanning direction in multipass printing. Moreover, Japanese Patent Laid-Open No. 2014-113819 discloses a method of creating a threshold matrix for each of first print scan and second print scan that can stabilize coverage of dots on a print medium even if print misalignment occurs between the first print scan and the second print scan.

Although the configuration of Japanese Patent Laid-Open No. 2017-035886 is effective for the case where dots printed in one scan are misaligned relative to dots printed in another scan in the scanning direction of the print head, this effect cannot be obtained for misalignment in a sub scanning direction. Moreover, although the configuration of Japanese Patent Laid-Open No. 2014-113819 can suppress variation in density unevenness and granularity, problems regarding granularity originally present in an image still remain.

SUMMARY OF THE INVENTION

The present invention has been made to solve the aforementioned problems. Accordingly, an object thereof is to print a high-quality image while making graininess or density unevenness less noticeable even in the case where print misalignment due to movement of a print head and a print medium relative to each other occurs.

In a first aspect of the present disclosure, there is provided an image processing method comprising the step of: obtaining gradation data for expressing a predetermined gradation value on a print medium by printing a first dot pattern and a second dot pattern on the print medium in an overlapping manner; and generating data for printing the first dot pattern and data that causes the print head to print the second dot pattern based on the gradation data corresponding to the predetermined gradation value, wherein the first dot pattern and the second dot pattern are each a lattice pattern in which a position of any dot to a position of a dot other than the any dot is specified by two basis vectors and are lattice patterns that vary in a combination of the two basis vectors, a combined dot pattern formed by superimposing any dot included in the first dot pattern and any dot included in the second dot pattern one on top of the other includes a superimposed dot that is formed by superimposing of one dot included in the first dot pattern and one dot included in the second dot pattern and a neighboring dot in which one dot included in the first dot pattern and one dot included in the second dot pattern are arranged at an interval smaller than a lattice spacing defined by the basis vectors, and the neighboring dot includes a plurality of neighboring dots varying in tilt of a straight line connecting a center of the one dot in the first dot pattern and a center of the one dot in the second dot pattern forming the neighboring dot.

In a second aspect of the present disclosure, there is provided an image processing apparatus comprising: a unit configured to obtain gradation data for expressing a predetermined gradation value on a print medium by printing a first dot pattern and a second dot pattern on the print medium in an overlapping manner; and a unit configured to generate data for printing the first dot pattern and data that causes the print head to print the second dot pattern based on the gradation data corresponding to the predetermined gradation value, wherein the first dot pattern and the second dot pattern are each a lattice pattern in which a position of any dot to a position of a dot other than the any dot is specified by two basis vectors and are lattice patterns that vary in a combination of the two basis vectors, a combined dot pattern formed by superimposing any dot included in the first dot pattern and any dot included in the second dot pattern one on top of the other includes a superimposed dot that is formed by superimposing of one dot included in the first dot pattern and one dot included in the second dot pattern and a neighboring dot in which one dot included in the first dot pattern and one dot included in the second dot pattern are arranged at an interval smaller than a lattice spacing defined by the basis vectors, and the neighboring dot includes a plurality of neighboring dots varying in tilt of a straight line connecting a center of the one dot in the first dot pattern and a center of the one dot in the second dot pattern forming the neighboring dot.

In a third aspect of the present disclosure, there is provided a non-transitory computer-readable storage medium storing a program for causing one or more processors of a computer to execute an information processing method, the image processing method comprising the steps of: obtaining gradation data for expressing a predetermined gradation value on a print medium by printing a first dot pattern and a second dot pattern on the print medium in an overlapping manner; and generating data for printing the first dot pattern and data that causes the print head to print the second dot pattern based on the gradation data corresponding to the predetermined gradation value, wherein the first dot pattern and the second dot pattern are each a lattice pattern in which a position of any dot to a position of a dot other than the any dot is specified by two basis vectors and are lattice patterns that vary in a combination of the two basis vectors, a combined dot pattern formed by superimposing any dot included in the first dot pattern and any dot included in the second dot pattern one on top of the other includes a superimposed dot that is formed by superimposing of one dot included in the first dot pattern and one dot included in the second dot pattern and a neighboring dot in which one dot included in the first dot pattern and one dot included in the second dot pattern are arranged at an interval smaller than a lattice spacing defined by the basis vectors, and the neighboring dot includes a plurality of neighboring dots varying in tilt of a straight line connecting a center of the one dot in the first dot pattern and a center of the one dot in the second dot pattern forming the neighboring dot.

Further features of the present invention will become apparent from the following description of exemplary embodiments with reference to the attached drawings.

BRIEF DESCRIPTION OF THE DRAWINGS

FIGS. 4A and 4B are diagrams illustrating misalignment states in reproduction cycles of the translational symmetric dot pattern;

FIG. 17 is a diagram illustrating an example of threshold matrices;

FIGS. 18A to 18C are diagrams illustrating results of performing the quantization process for different gradation values;

FIGS. 19A to 19C are diagrams illustrating dot patterns according to the results of the quantization process;

FIGS. 20A to 20C are diagrams illustrating results of performing a quantization process in a second embodiment;

FIGS. 24A to 24C are diagrams illustrating dot arrangement patterns and a reference index pattern;

FIGS. 27A and 27B are diagrams for explaining shifting of a drive timing in forward and backward scan;

FIGS. 28A and 28B are diagrams for explaining column shifting of a raster group;

FIGS. 29A and 29B are diagrams illustrating lattice patterns achieved in the third embodiment;

FIGS. 30A to 30D are diagrams illustrating an index pattern and pieces of binary data;

FIGS. 32A and 32B are diagrams illustrating threshold matrices used in the third embodiment;

FIGS. 37A to 37C are diagrams illustrating a dot arrangement pattern and an index pattern in the fourth embodiment; and FIGS. 38A and 38B are diagrams illustrating mask patterns used in a mask process.

DESCRIPTION OF THE EMBODIMENTS

<Characteristics of Robust Pattern>

First, description is given of a robust pattern that is commonly applicable to embodiments of the present invention. In this specification, the robust pattern is a dot pattern formed in the case where two dot patterns are printed in a predetermined pixel region in an overlapping manner, and has such a characteristic that a dot coverage and granularity do not vary greatly in the pixel region even if the two dot patterns are misaligned relative to each other. Note that the coverage indicates a proportion of a dot coverage area to a print medium.

Figure 1:
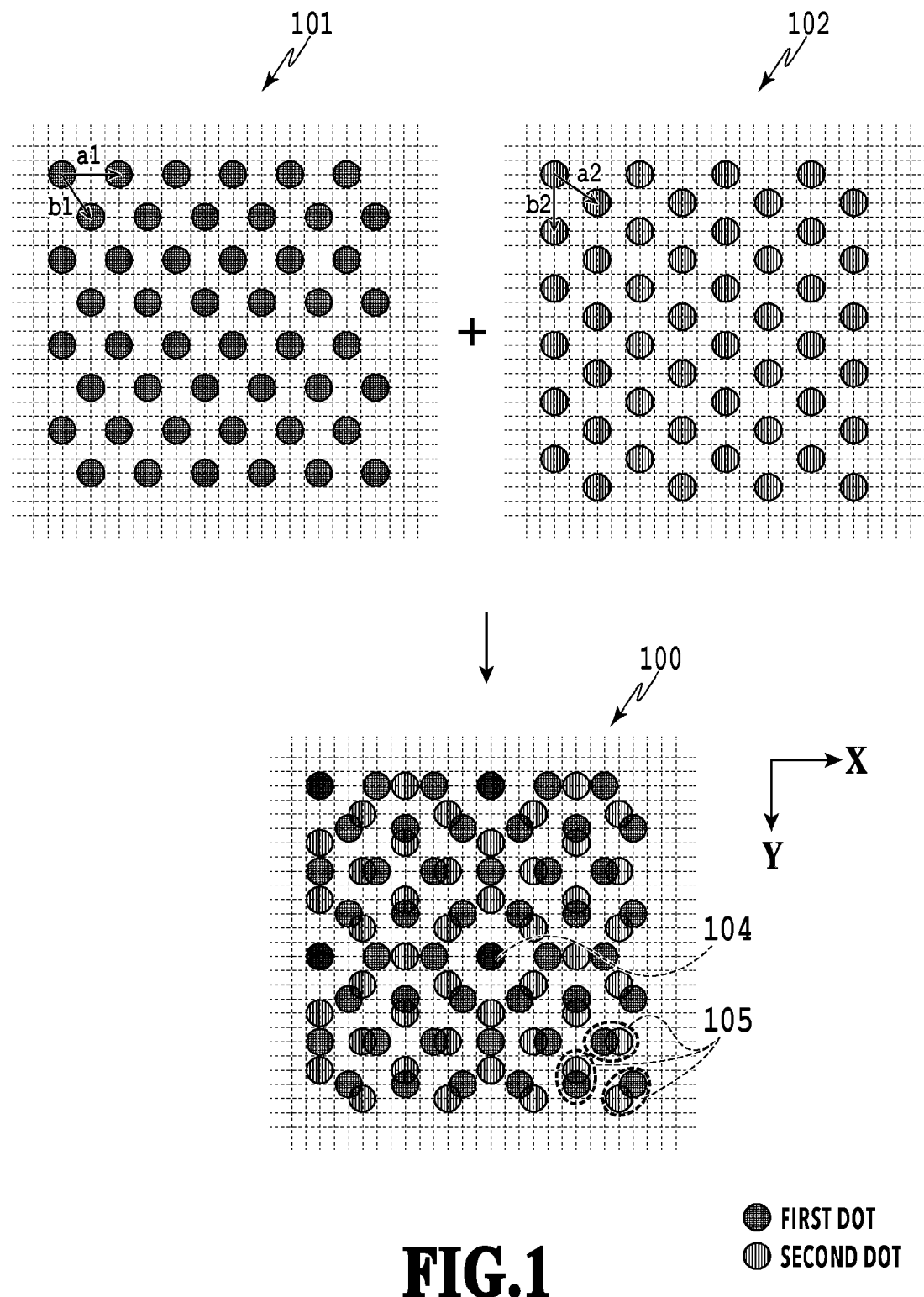
FIG. 1 is a diagram illustrating an example of the robust pattern.

FIG. 1 is a diagram illustrating an example of the robust pattern. FIG. 1 illustrates a state where dots with a diameter of 42 µm are selectively disposed at pixel positions arranged at 1200 dpi on an XY plane. FIG. 1 illustrates a state where a first dot pattern 101 formed of a group of first dots and a second dot pattern 102 formed of a group of second dots are laid one on top of the other to form a robust pattern 100. In FIG. 1, although the patterns are partially cut out and illustrated, each pattern is assumed to be repeatedly arranged in X and Y directions.

<Misalignment in Unit of One Pixel>

Figure 2:
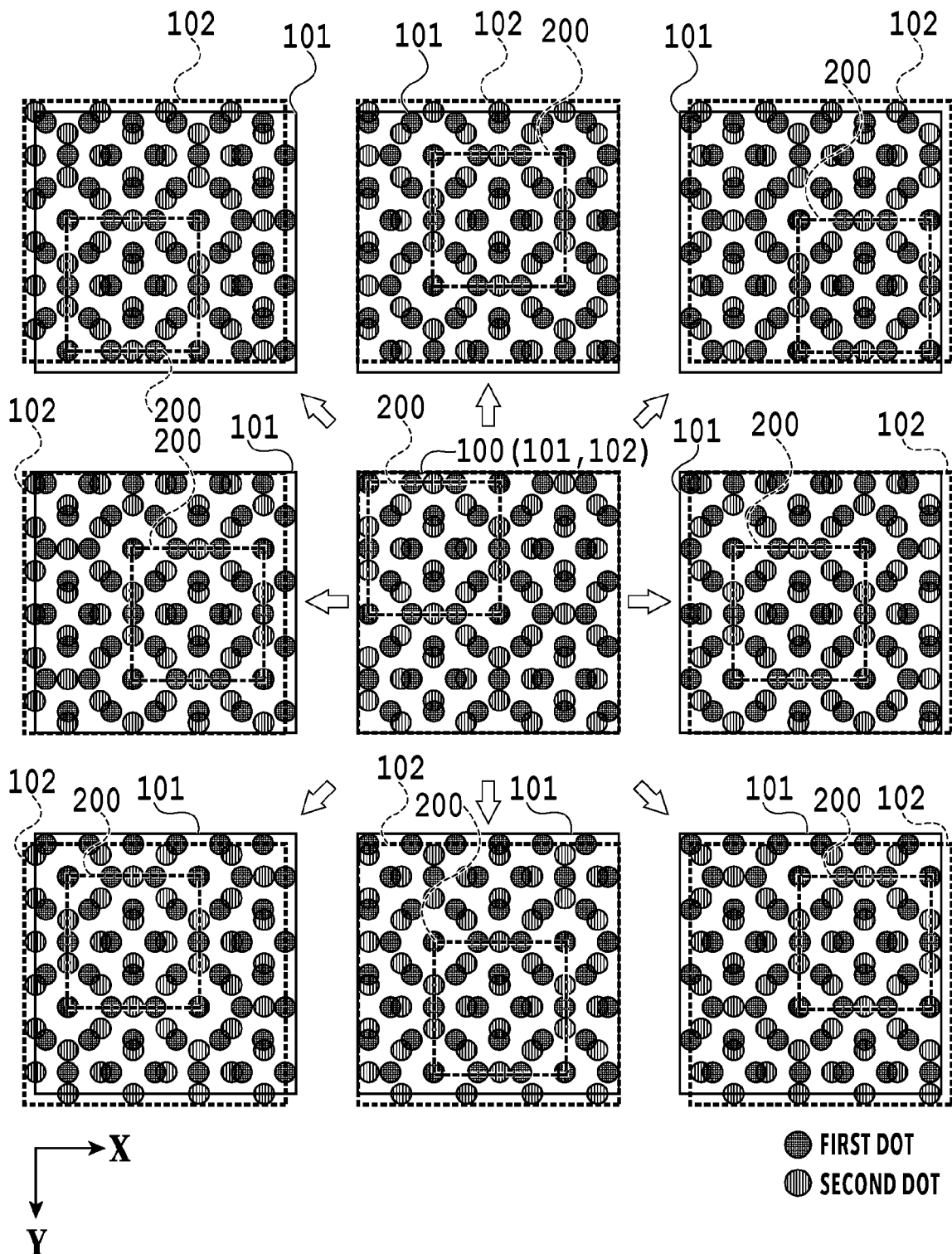
FIG. 2 is a diagram illustrating states where first and second dot patterns are misaligned relative to each other.

FIG. 2 is a diagram illustrating states where the second dot pattern 102 is shifted relative to the first dot pattern 101 in the unit of one pixel. The center pattern illustrates a state where there is no shifting and is the same as the robust pattern 100 in FIG. 1. The patterns around the center pattern illustrate states in which the second dot pattern 102 is shifted relative to the first dot pattern 101 by one pixel (21 µm) in eight directions on the XY plane, respectively.

It is found that a similar repeated pattern 200 appears in each of the dot patterns. Moreover, it is found that, although these nine patterns vary in a position where the repeated pattern 200 appears, the nine patterns are substantially the same dot pattern in which the same repeated pattern 200 is repeatedly laid in vertical and horizontal directions. In such a case, if the second dot pattern 102 in each of the eight patterns illustrated around the center pattern is further shifted by one pixel in the same direction, a pattern in which the repeated pattern 200 is repeatedly laid in the vertical and horizontal directions is obtained as described above.

As described above, the robust pattern 100 has such a characteristic that, in the case where the first dot pattern 101 and the second dot pattern 102 are misaligned relative to each other, the same dot pattern can be obtained irrespective of the misalignment amount and the misalignment direction of the patterns. In the following description, a characteristic in which, even if the first dot pattern 101 and the second dot pattern 102 are misaligned relative to each other in an XY direction, a pattern in which the same repeated pattern 200 is arranged at a different phase can be obtained is referred to as "translational symmetry". Moreover, the minimal misalignment amount at which the "translational symmetry" is reproduced is referred to as "translational symmetry reproduction cycle". In the robust pattern described in FIGS. 1 and 2, one pixel in 1200 dpi (21 µm) is the "translational symmetry reproduction cycle".

Figures 3A, 3B:
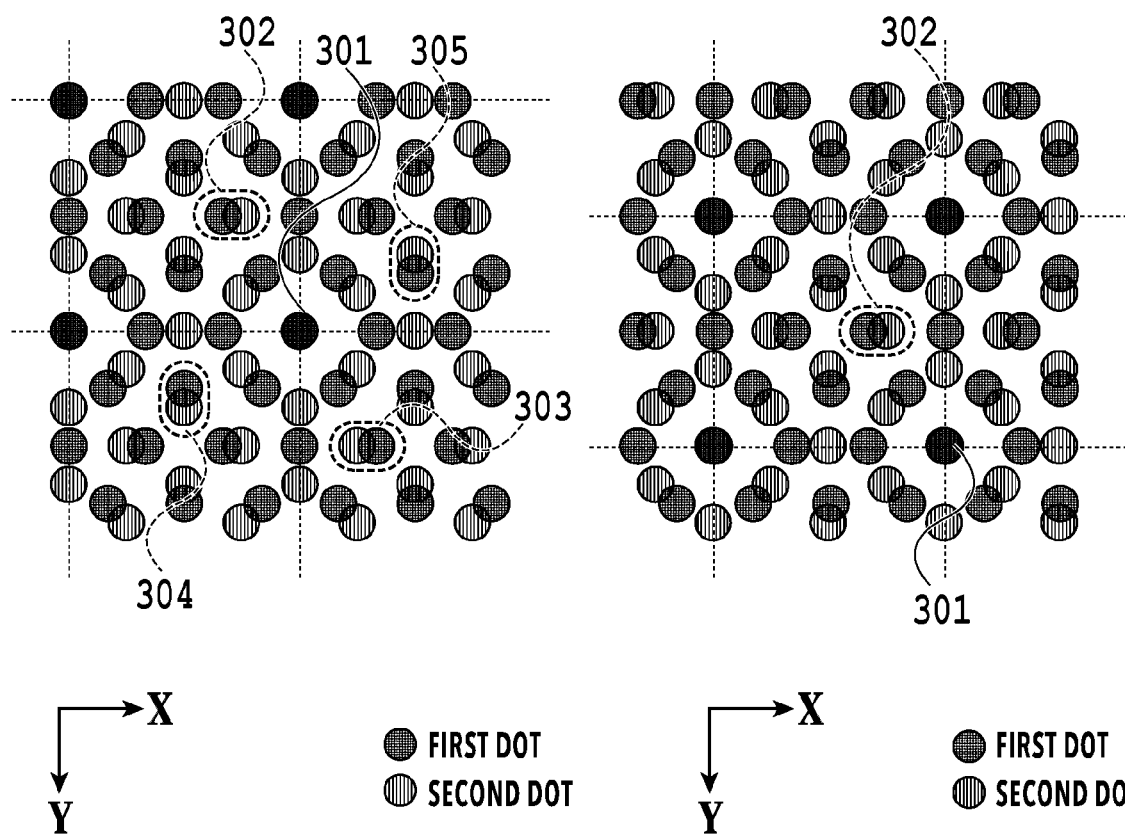
FIGS. 3A and 3B are diagrams for explaining misalignment and reproduction of a translational symmetric dot pattern.

FIGS. 3A and 3B are diagrams for explaining mechanisms in which the translational symmetry can be obtained in the robust pattern.

FIG. 3A illustrates a state in which there is no misalignment between the first dot pattern 101 and the second dot pattern 102. The dot pattern of FIG. 3A includes superimposed dots 301 in each of which a first dot forming the first dot pattern 101 and a second dot forming the second dot pattern 102 are superimposed one on top of the other. Moreover, the dot pattern of FIG. 3A includes neighboring dots 302 to 305 in which the first dots and the second dots are partially superimposed one on top of another and solo dots that are not superimposed on the other dots. In FIG. 3A, reference lines passing through the centers of the superimposed dots 301 are illustrated by broken lines.

In this case, if we focus on any one of the superimposed dots 301, it is found that the arrangement of the first dots and the second dots around this superimposed dot 301 is point symmetry with respect to the superimposed dot 301. For example, in FIG. 3A, the neighboring dot 303 formed of a left second dot and a right first dot is arranged at a position point symmetric to the neighboring dot 302, formed of a left first dot and a right second dot, with respect to the superimposed dot 301. Moreover, the neighboring dot 305 formed of an upper second dot and a lower first dot is arranged at a position point symmetric to the neighboring dot 304, formed of an upper first dot and a lower second dot, with respect to the superimposed dot 301.

FIG. 3B illustrates a state where the second dot pattern 102 is shifted relative to the first dot pattern 101 in a +X direction by one pixel (21 µm). Each of the superimposed dots 301 in FIG. 3A changes to the neighboring dot 302 formed of the left first dot and the right second dot in FIG. 3B. Moreover, the neighboring dot 303 formed of the left second dot and the right first dot in FIG. 3A changes to the superimposed dot 301 in FIG. 3B.

In comparison of FIGS. 3A and 3B, although the positions where the superimposed dots 301 are arranged in FIG. 3B change from the positions where the superimposed dot 301 are arranged in FIG. 3A, the number and the cycle of the superimposed dots 301, that is the number and the cycle of the reference lines do not change. Moreover, the layout of the first dots and the second dots in the repeated pattern 200 surrounded by the reference lines also does not change. Specifically, the dot coverage does not change in the repeated pattern 200 even if misalignment in the unit of one pixel, that is in the unit of translational symmetry reproduction cycle occurs between the first dot pattern 101 and the second dot pattern 102.

<Misalignment Smaller than Translational Symmetry Reproduction Cycle>

FIGS. 4A and 4B are diagrams for explaining effects of misalignment smaller than one pixel (21 µm) between the first dot pattern 101 and the second dot pattern 102. FIG. 4A is a diagram illustrating a unit of misalignment smaller than one pixel for the sake of convenience. One pixel in 1200 dpi is illustrated to be further divided into 8×8 regions in 9600 dpi. In the case of 9600 dpi, spacing of a lattice is about 2.6 µm.

FIG. 4B illustrates states where an upper left corner of the second dot pattern 102 is shifted to various positions with an upper left corner of the first dot pattern 101 fixed at an original point A (0, 0). In FIG. 4B, five states where the upper left corner of the second dot pattern 102 is shifted to the point A (0, 0), a point B (4, 0), a point C (8, 0), a point D (4, 4), and a point E (8, 8) are illustrated. The pattern of the point A (0, 0) corresponds to the robust pattern 100 illustrated in a center portion of FIG. 2. The pattern of the point C (8, 0) corresponds to the pattern in a center right portion of FIG. 2 and the pattern of the point E (8, 8) corresponds to the pattern in a lower right portion of FIG. 2.

Figure 5A:
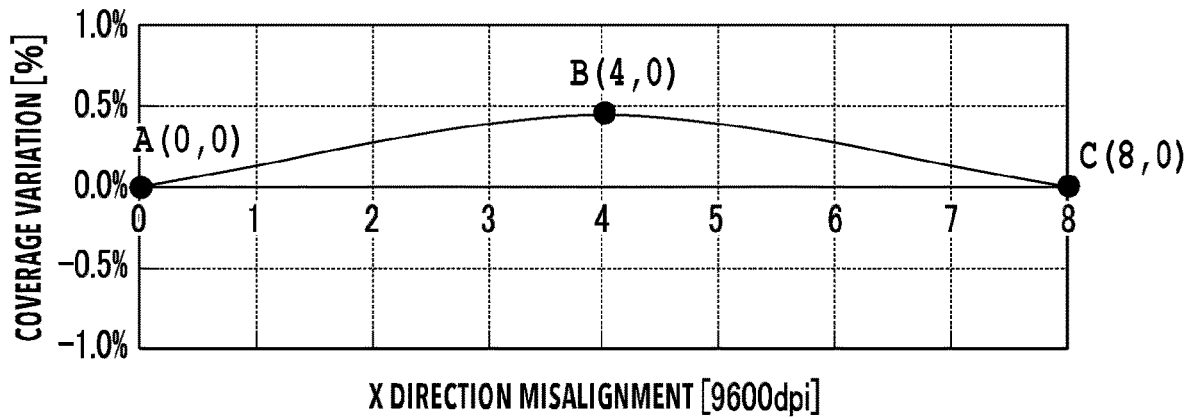
FIGS. 5A and 5B are diagrams for explaining variation in coverage.
Figure 5B:
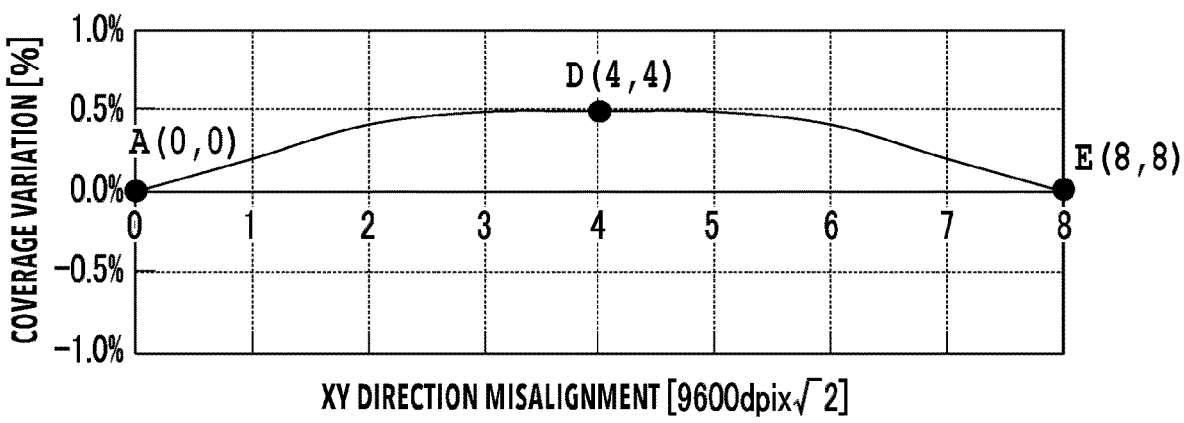

FIGS. 5A and 5B are diagrams illustrating variation in the dot coverage in misalignment smaller than the translational symmetry reproduction cycle. FIG. 5A illustrates the dot coverage variation in the case where the position of the second dot pattern 102 is changed between the point A (0, 0) and the point C (8, 0) of FIG. 4A, specifically, in the case where the second dot pattern 102 is misaligned in the +X direction (right direction). Meanwhile, FIG. 5B illustrates the dot coverage variation in the case where the position of the second dot pattern is changed between the point A (0, 0) and the point E (8, 8), specifically, in the case where the second dot pattern is misaligned in a +XY direction (lower right direction). In this case, the dot coverage indicates a proportion at which a sheet surface is covered with dots with a diameter of 42 µm and the dot coverage variation indicates a rate of change value at which the dot coverage varies depending on misalignment.

In FIG. 5A, the pattern of the point A (0, 0) and the pattern of the point C (8, 0) are in a relationship in which these patterns are misaligned from each other by one translational symmetry reproduction cycle. Accordingly, these patterns are translational symmetric to each other and have the same dot coverage (40.1%). Thus, the dot coverage variation is 0% in both patterns. Meanwhile, the pattern of the point B (4, 0) is a pattern between the point A (0, 0) and the point C (8, 0) and is not translational symmetric to the patterns of the point A (0, 0) and the point C (8, 0) and has a larger dot coverage of 40.5%. Accordingly, the dot coverage variation is +0.4%(=40.5-40.1).

In FIG. 5B, the pattern of the point A (0, 0) and the pattern of the point E (8, 8) are in a relationship in which these patterns are misaligned from each other by one translational symmetry reproduction cycle. Accordingly, these patterns are translational symmetric to each other and both have the dot coverage of 40.1%. Thus, the dot coverage variation is 0% in both patterns. Meanwhile, the pattern of the point D (4, 4) is a pattern between the point A (0, 0) and the point E (8, 8) and is not translational symmetric to the patterns of the point A (0, 0) and the point E (8, 8) and has a larger dot coverage of 40.6%. Accordingly, the dot coverage variation is +0.5%(=40.6-40.1). However, the variation of this level is sufficiently smaller than the coverage of the sheet surface and is difficult to be visually sensed.

Specifically, in the aforementioned robust pattern, a density variation caused by misalignment smaller than the translational symmetry reproduction cycle is not visually sensed and the density variation itself does not occur in misalignment in the unit of the translational symmetry reproduction cycle. Thus, the aforementioned robust pattern is a pattern in which an uneven density is less likely to occur irrespective of the misalignment direction and the misalignment amount.

<Regarding Neighboring Dots>

Figure 6:
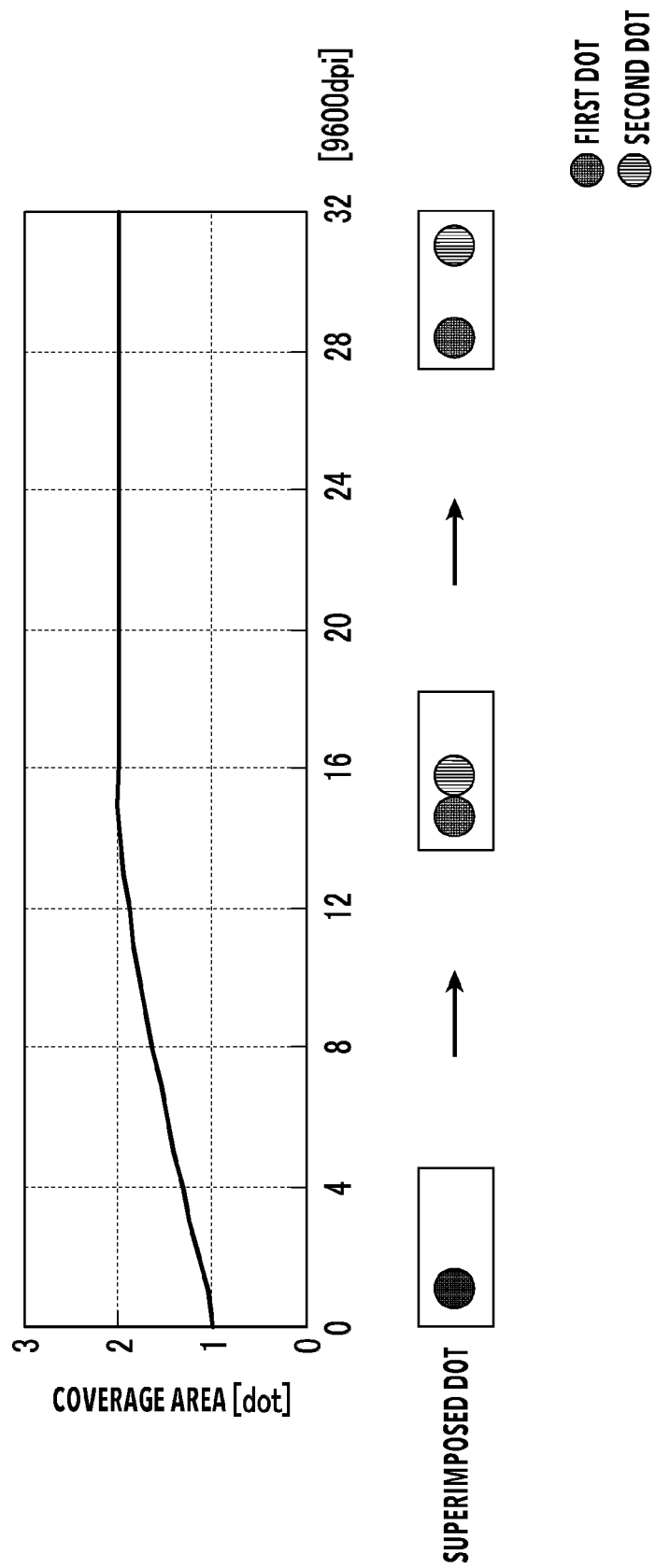
FIG. 6 is a diagram illustrating variation in a coverage area that occurs with separation of superimposed dots.

FIG. 6 is a diagram illustrating variation in the coverage area that occurs with separation of superimposed dots on a microscopic level. The horizontal axis represents the misalignment amount of the second dot relative to the first dot and the unit is a pixel in 9600 dpi. One pixel corresponds to about 2.6 μm. The vertical axis represents the coverage area with respect to the sheet and the unit is a dot. Specifically, "1" corresponds to a coverage area of one dot with a diameter of 42 μm.

In the case where the first dot and the second dot are completely superimposed one on top of the other, the coverage area is 1. The more the second dot is misaligned relative to the first dot, the greater the coverage area becomes. The two dots are completely separated from each other at a misalignment amount of about 16 pixels and the coverage area becomes 2. Thereafter, the coverage area is maintained at 2 irrespective of the misalignment amount. Note that, in the case where the misalignment occurs between the first and second dot patterns, there are portions where the superimposed dots separate as in FIG. 6 and portions where the separated dots change to the superimposed dots.

Figure 7A:
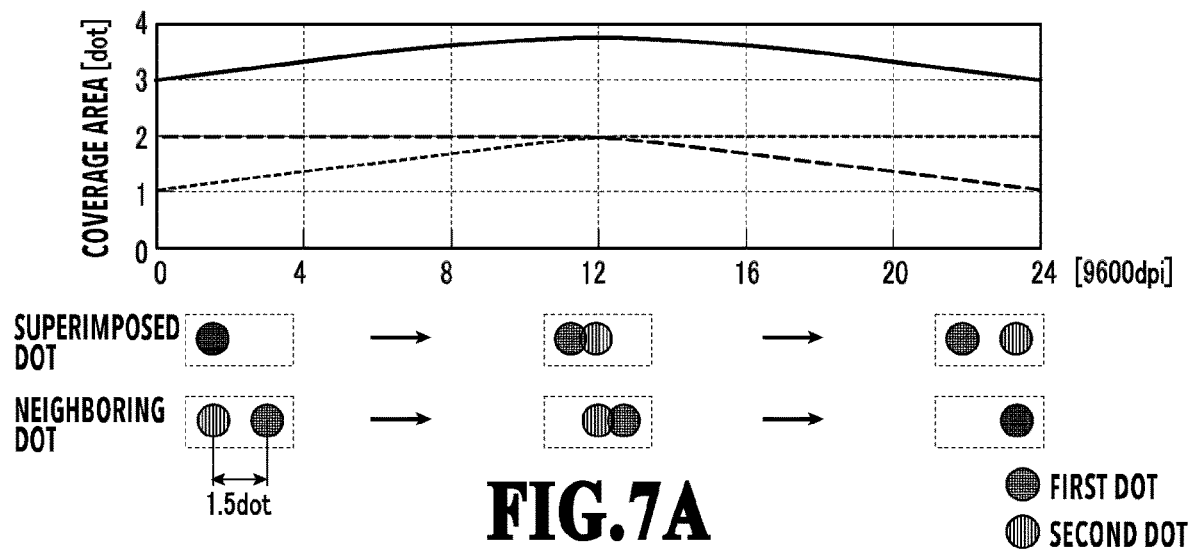
FIGS. 7A to 7C are diagrams illustrating separation of the superimposed dot and superimposing of a neighboring dot in parallel.
Figure 7B:
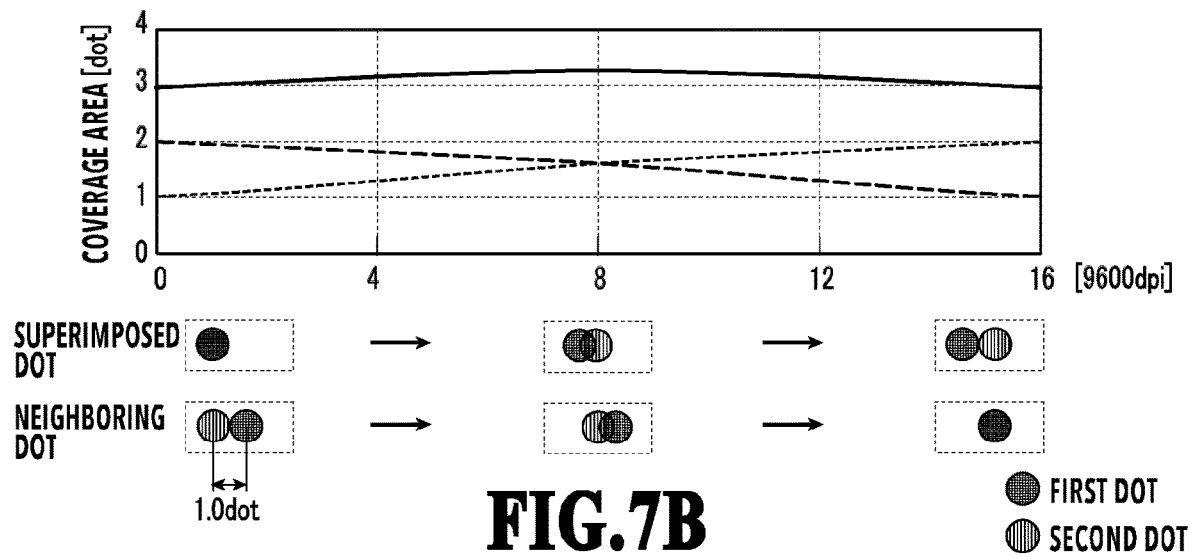
Figure 7C:
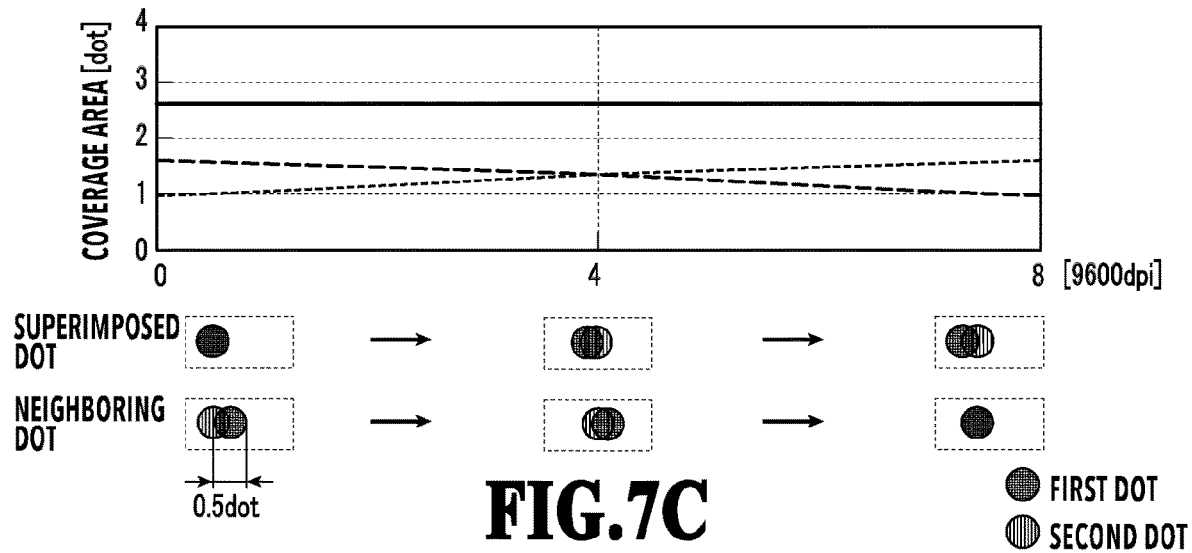

FIGS. 7A to 7C are diagrams illustrating, in parallel, a state where the superimposed dot separates with the misalignment between the first dot pattern 101 and the second dot pattern 102 and a state where dots of the neighboring dot are superimposed one on top of the other with the misalignment. FIG. 7A illustrates a case where dots of the neighboring dot located away from each other at an interval corresponding to 1.5 dots (≈63 μm) are superimposed one on top of the other and FIG. 7B illustrates a case where dots of the neighboring dot located away from each other at an interval corresponding to 1.0 dots (≈42 μm) are superimposed one on top of the other. Moreover, FIG. 7C illustrates a case where dots of the neighboring dots located away from each other at an interval corresponding to 0.5 dots (≈21 μm) are superimposed one on top of the other. In each drawing, the coverage area of the superimposed dot that is eventually separated is illustrated by a dotted line, the coverage area of the neighboring dot that is eventually superimposed is illustrated by a broken line, and the sum (total coverage area) of these two types of coverage areas is illustrated by a solid line. Moreover, in each drawing, the horizontal axis illustrates a range up to a point where the neighboring dot becomes a complete superimposed dot.

In FIG. 7A, an initial value and a final value of the total coverage area are 3 dots and the total coverage area takes the maximum value of 3.8 dots at 12 pixels which is the median value. In FIG. 7B, the initial value and the final value of the total coverage area are 3 dots and the total coverage area takes the maximum value of 3.3 dots at 8 pixels which is the median value. In FIG. 7C, the total coverage area is stable at 2.6 dots from the initial value to the final value.

Specifically, by comparing FIGS. 7A to 7C, it can be said that, in order to suppress density variation for misalignment smaller than the translational symmetry reproduction cycle, it is preferable to make the interval between the two dots forming the neighboring dot prepared in advance as small as possible, more preferably to make this interval equal to 0.5 dots or smaller. However, the visually detected density is not always proportional to the coverage of the dots. Specifically, the interval between the two dots of the neighboring dot to be prepared in advance in the robust pattern is preferably adjusted as appropriate depending on the print resolution, the dot diameter, the dot density, and the like.

<Conditions of Robust Pattern>

Description is given below of conditions required for a pattern to become the robust pattern having the aforementioned characteristics.

The first condition is that the first dot pattern and the second dot pattern are formed of lattice patterns different from each other.

Definition of the lattice pattern is described. In this specification, the lattice pattern refers to a pattern in which a position of any dot to a position of another dot can be specified by two basis vectors. For example, the first dot pattern 101 of FIG. 1 can be referred to as a lattice pattern having a1 and b1 as basis vectors. Moreover, the second dot pattern 102 can be referred to as a lattice pattern having a2 and b2 as basis vectors. The two lattice patterns defined by the same basis vectors can be regarded as the same lattice pattern and the two lattice patterns defined by different basis vectors can be regarded as different lattice patterns. Specifically, the first dot pattern 101 in which the basis vectors are a1 and b1 and the second dot pattern 102 in which the basis vectors are a2 and b2 are different lattice patterns.

In the case where the first dot pattern and the second dot pattern are the same lattice pattern, almost all dots become superimposed dots at a position where any dot becomes a superimposed dot. In this case, a translational symmetric dot pattern is not reproduced in misalignment smaller than the lattice spacing defined by the basis vectors. Thus, there is a risk that the density unevenness and the granularity become poor in the case where misalignment smaller than the magnitudes of the basis vectors occurs.

The second condition is that, in the case where a superimposed dot is generated with an arbitrary dot, the superimposed dot and the neighboring dot are present in a mixed manner. Moreover, the first dot and the second dot forming the neighboring dot are arranged at an interval smaller than the lattice spacing defined by the basis vectors.

Figure 8:
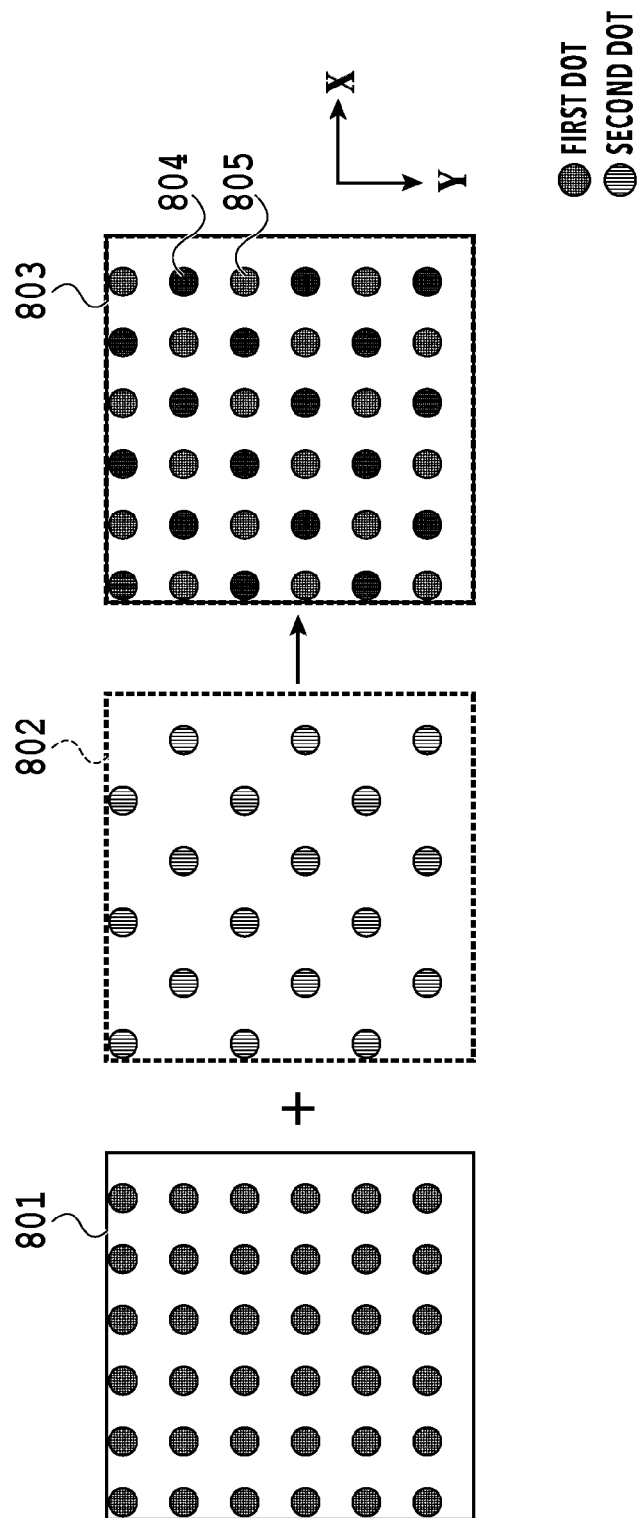
FIG. 8 is a diagram for explaining a counterexample of a second condition for achieving a robust pattern.

FIG. 8 illustrates an example of a pattern that satisfies the first condition but does not satisfy the second condition. Although a first dot pattern 801 and a second dot pattern 802 are different lattice patterns, there are no neighboring dots in a combined dot pattern 803 obtained by superimposing the patterns 801 and 802 one on top of the other. All dots are either superimposed dots 804 or solo dots 805. In this case, no translational symmetry can be achieved between the first dot pattern 801 and the second dot pattern 802 in misalignment smaller than the lattice spacing and the effect of stabilizing the coverage area as described in FIGS. 7A to 7C cannot be obtained.

Figure 9:
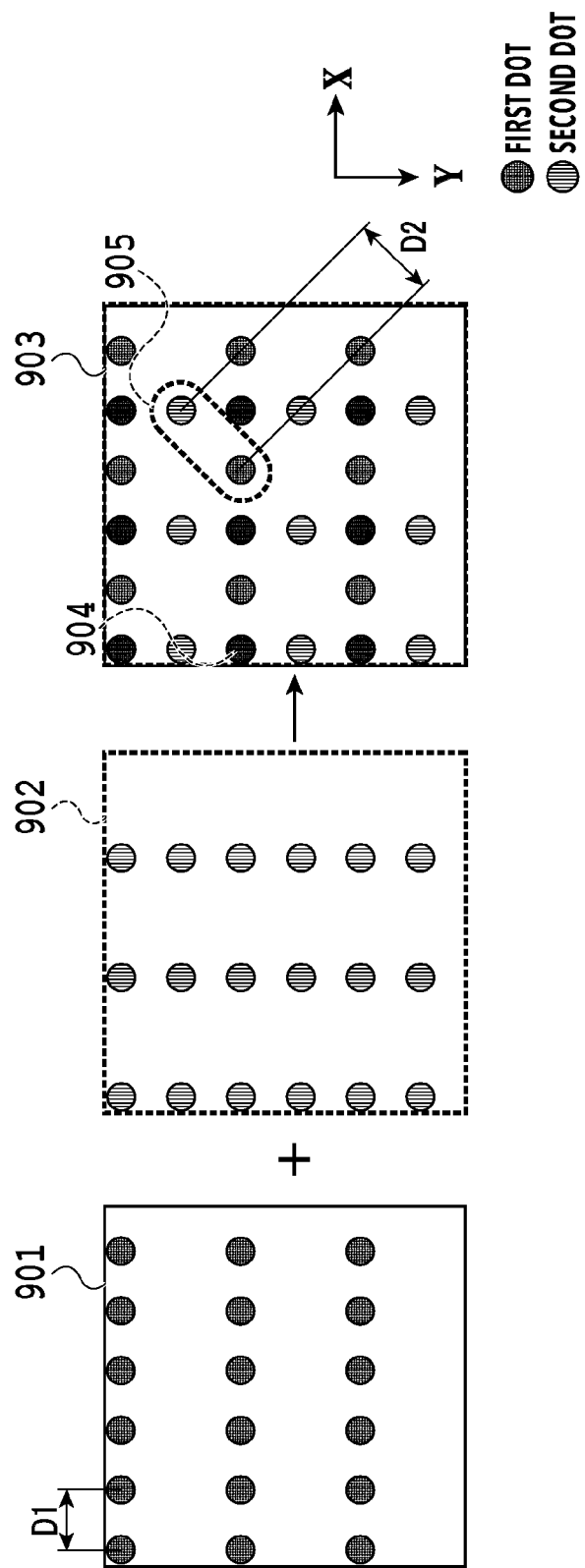
FIG. 9 is a diagram for explaining a counterexample of the second condition for achieving the robust pattern.

Moreover, FIG. 9 illustrates another example of a pattern that satisfies the first condition but does not satisfy the second condition. In this example, a first dot pattern 901 and a second dot pattern 902 are different lattice patterns and superimposed dots 904 and neighboring dots 905 are present in a combined dot pattern 903 obtained by superimposing the patterns 901 and 902 one on top of the other. However, an interval D2 between two dots forming the neighboring dot 905 is greater than the lattice spacing D1 defined by the basis vectors of the first dot pattern 901. In this case, the dots of the neighboring dot 905 cannot be sufficiently superimposed one on top of the other in the case where the first dot pattern 901 and the second dot pattern 902 are misaligned relative to each other at a distance equal to or smaller than the lattice spacing and the superimposed dot 904 is separated. As a result, also in this pattern, the effect of stabilizing the coverage area as described in FIGS. 7A to 7C cannot be obtained.

The third condition is that neighboring dots with different approach directions are present among the multiple neighboring dots. In this case, the approach direction refers to a tilt of a straight line connecting the centers of the first dot and the second dot forming each neighboring dot.

Figure 10:
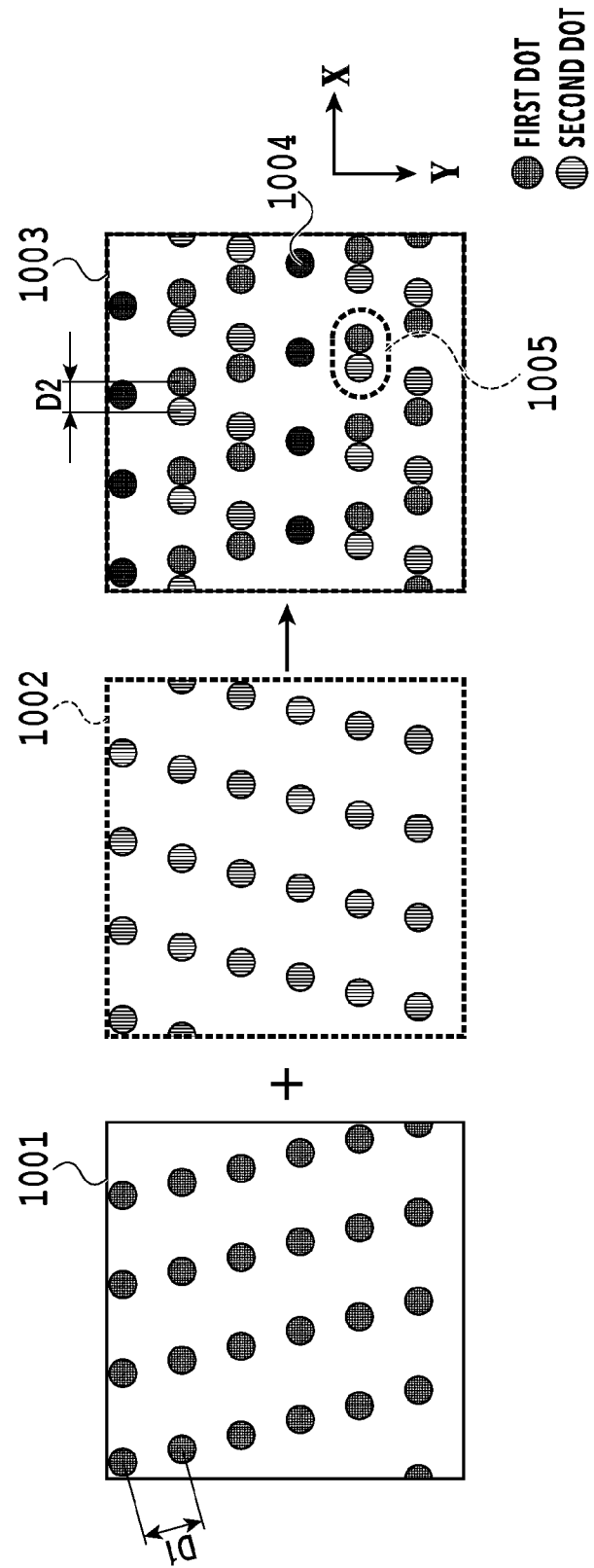
FIG. 10 is a diagram for explaining a counterexample of a third condition for achieving the robust pattern.

FIG. 10 illustrates an example of a pattern that satisfies the first condition and the second condition but does not satisfy the third condition. In this example, a first dot pattern 1001 and a second dot pattern 1002 are different lattice patterns and superimposed dots 1004 and neighboring dots 1005 are present in a combined dot pattern 1003 obtained by superimposing the patterns 1001 and 1002 one on top of the other. Moreover, the first dot and the second dot forming each neighboring dot 1005 are arranged at an interval D2 smaller than the lattice spacing D1 of the first dot pattern 1001 and the second dot pattern 1002.

However, in the combined dot pattern 1003, all neighboring dots 1005 are formed by approaching of the first dots and the second dots in the X direction and are not formed by approaching in a direction other than the X direction. In this configuration, the effect described in FIGS. 7A and 7C can be obtained in the case where the direction in which the first dot pattern 1001 and the second dot pattern 1002 are misaligned in the approach direction, that is the X direction. However, in the case where the first dot pattern 1001 and the second dot pattern 1002 are misaligned in a Y direction orthogonal to the X direction, the two dots forming each neighboring dot are not superimposed one on top of the other with separation of the superimposed dot 1004 in the Y direction and this leads to variation in the coverage area.

Meanwhile, the robust pattern 100 described in FIG. 1 satisfies all of the first to third conditions described above. Specifically, with reference to FIG. 1, the first dot pattern 101 and the second dot pattern 102 are formed of lattice patterns with different basis vectors (first condition). There are the superimposed dots 104 and the neighboring dots 105 in the combined dot pattern 100 obtained by superimposing the patterns 101 and 102 one on top of the other and the first dot and the second dot forming each neighboring dot 105 are arranged at an interval smaller than the lattice spacing defined by the basis vectors (second condition). Furthermore, in the combined dot pattern 100, there are multiple neighboring dots with different approach directions such as neighboring dots in which the first and second dots approach one another in the X direction, neighboring dots in which the first and second dots approach one another in the Y direction, and neighboring dots in which the first and second dots approach one another in an oblique direction (third condition).

Accordingly, in the combined dot pattern 100 satisfying the aforementioned three conditions, the effects already described by using FIGS. 2 to 7C are obtained. Specifically, even if relative misalignment between the first and second dot patterns occurs, granularity variation and density unevenness are not sensed and an obtained image can be recognized as a high-quality image.

Embodiments using the robust pattern having the aforementioned characteristics are specifically described below.

First Embodiment

In the embodiment, the aforementioned robust pattern is used in the case where a serial inkjet printing apparatus performs bidirectional multipass printing.

Figure 11:
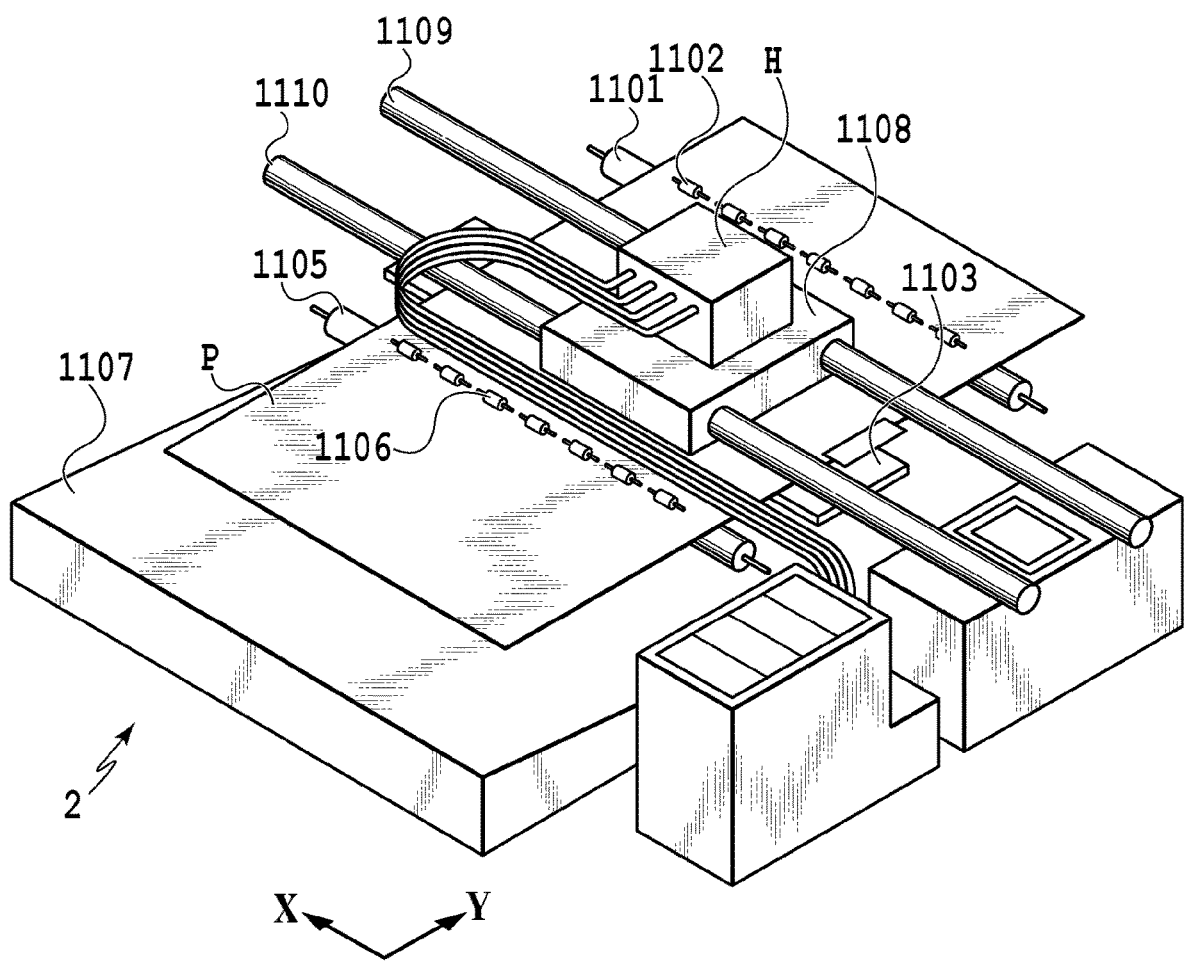
FIG. 11 is a view for explaining the configuration of a printing apparatus.

FIG. 11 is a perspective view illustrating an outline of a printing unit in a serial inkjet printing apparatus 2 (hereinafter, also simply referred to as printing apparatus) applicable to the embodiment. A nipping part including a conveyance roller 1101 arranged on a conveyance route and pinch rollers 1102 configured to follow the conveyance roller 1101 conveys the print medium P fed to the printing unit, in a −Y direction (sub scanning direction) with rotation of the conveyance roller 1101.

A platen 1103 is provided at a print position facing a surface (nozzle surface) of a print head H of an inkjet method on which nozzles are formed and supports the back side of the print medium P from below to maintain a constant distance between the front side of the print medium P and the nozzle surface of the print head H.

The print medium P in a region in which printing is performed on the platen 1103 is conveyed in the −Y direction with rotation of a discharge roller 1105 while being nipped by the discharge roller 1105 and a spur 1106 configured to follow the discharge roller 1105 and is discharged to a discharge tray 1107.

The print head H is detachably mounted on a carriage 1108 in such a position that its nozzle surface faces the platen 1103 or the print medium P. The carriage 1108 is reciprocated in the X direction that is the main scanning direction, along two guide rails 1109 and 1110 by driving force of a carriage motor (not illustrated) and, in the process of this reciprocation, the print head H executes an ejection operation according to an ejection signal.

The ±X directions in which the carriage 1108 is moved are directions intersecting the −Y direction in which the print medium is conveyed and are referred to as the main scanning direction. Meanwhile, the −Y direction of the print medium conveyance is referred to as the sub scanning direction. The main scan (movement involving ejection) of the carriage 1108 and the print head H and the conveyance (sub-scan) of the print medium P are alternately repeated and an image is thereby formed on the print medium P step by step.

Figure 12:
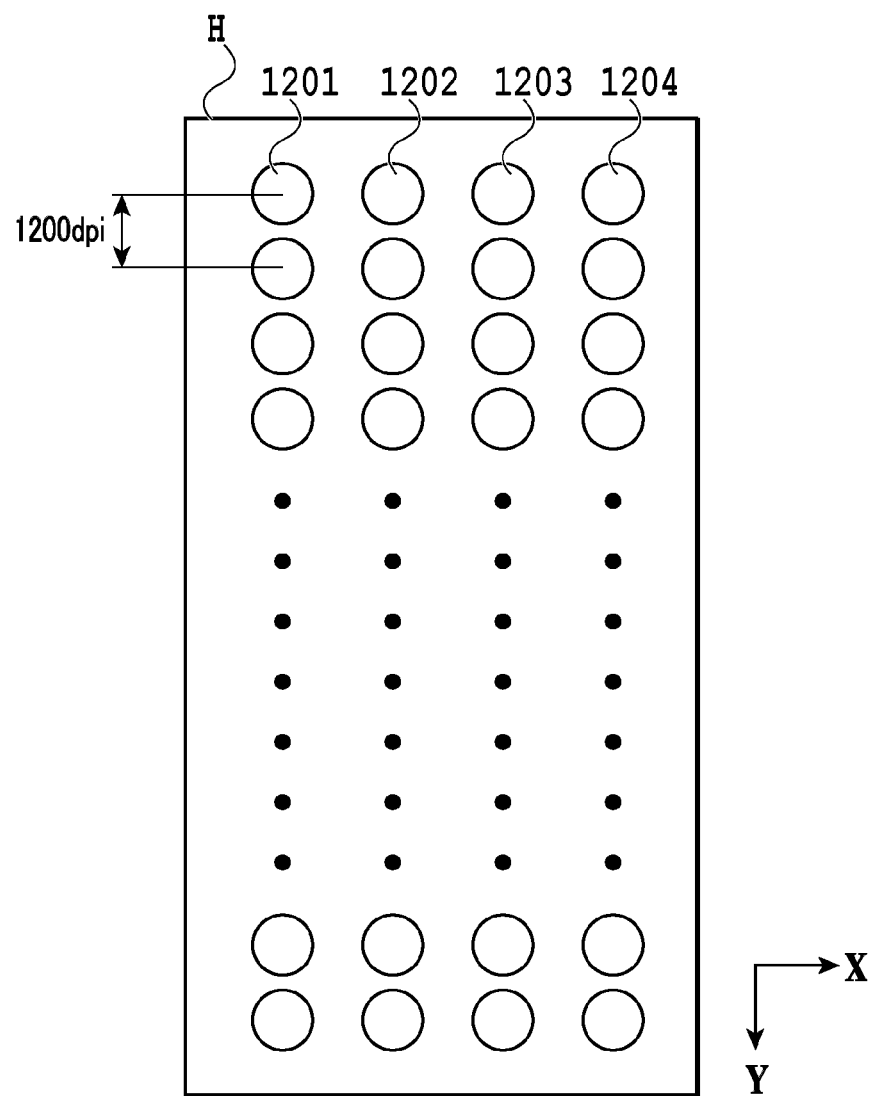
FIG. 12 is a diagram for explaining a print head.

FIG. 12 is a schematic diagram in the case where the print head H is observed from the side of the nozzle surface. On the nozzle surface, four nozzle rows 1201 to 1204 are arranged in parallel. In each of the nozzle rows, 128 nozzles configured to eject the same type of ink are aligned in the Y direction at a pitch of 1200 dpi. In the embodiment, the nozzle row 1201 ejects a cyan ink, the nozzle row 1202 ejects a magenta ink, the nozzle row 1203 ejects a yellow ink, and the nozzle row 1204 ejects a black ink.

Figure 13:
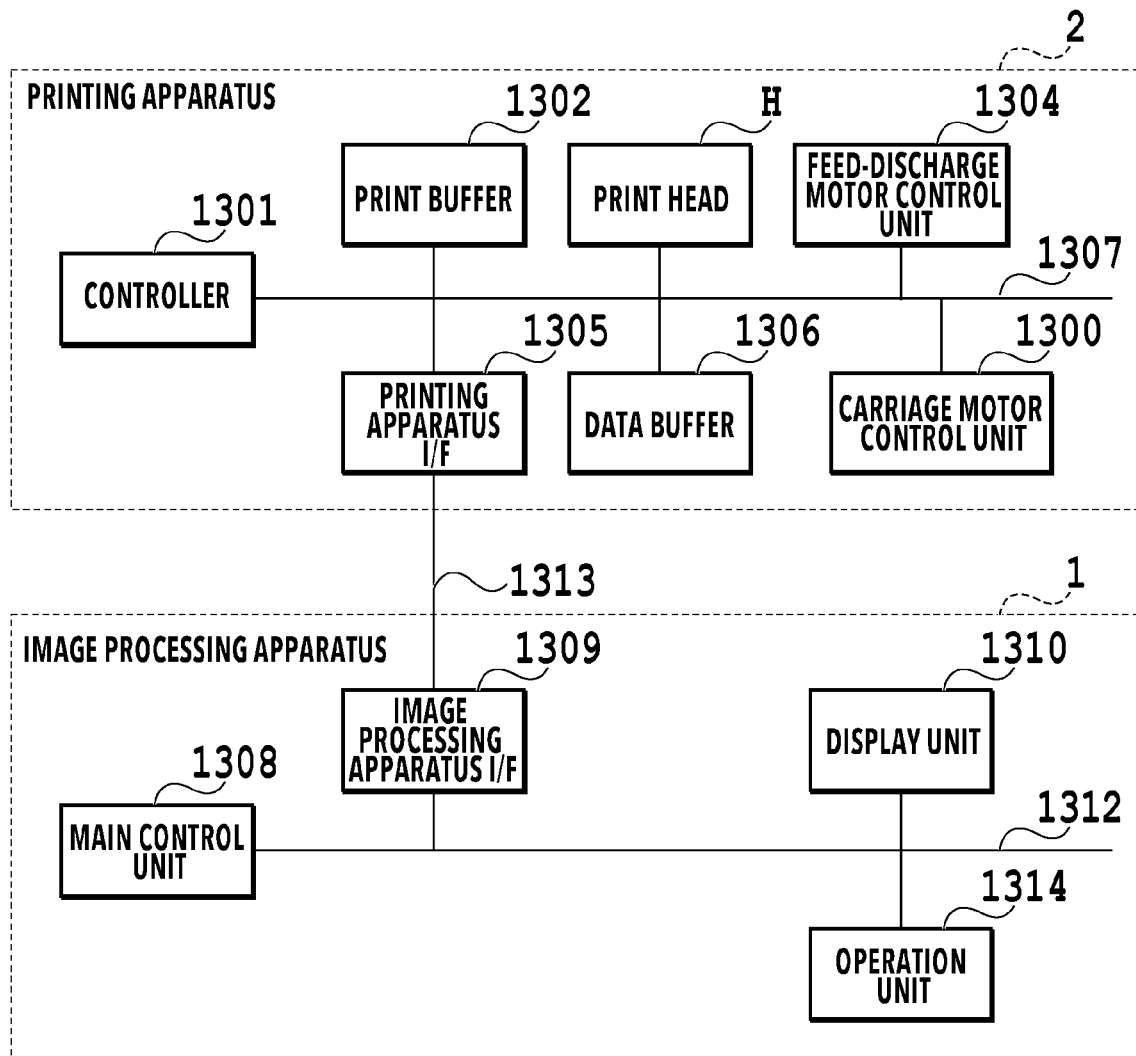
FIG. 13 is a block diagram illustrating a configuration of a printing system.

FIG. 13 is a block diagram for explaining a configuration of control of an inkjet printing system applicable to the embodiment. The inkjet printing system of the embodiment includes the inkjet printing apparatus 2 described in FIG. 11 and an image processing apparatus 1. The image processing apparatus 1 can be, for example, a personal computer (PC).

The image processing apparatus 1 generates image data printable by the printing apparatus 2. In the image processing apparatus 1, a main control unit 1308 is formed of a central processing unit (CPU), a read-only memory (ROM), a random access memory (RAM), an application specific integrated circuit (ASIC), or the like and performs image processing and the like in creation of an image in the image processing apparatus 1 and in printing of the created image in the printing apparatus 2. An image processing apparatus I/F 1309 exchanges data signals with the printing apparatus 2. A display unit 1310 displays various pieces of information to a user and, for example, a liquid crystal display (LCD) or the like is applicable as the display unit 1310. An operation unit 1314 is an operation unit used by the user to perform operations and, for example, a keyboard and a mouse is applicable as the operation unit 1314. A system bus 1312 connects the main control unit 1308 and various functions to one another. An I/F signal line 1313 connects the image processing apparatus 1 and the printing apparatus 2 to each other. For example, a line meeting the specifications of Centronics Data Computer Corp. is applicable as a type of I/F signal line 1313.

In the printing apparatus 2, a controller 1301 is formed of a CPU, a ROM, a RAM, and the like and controls the entire printing apparatus 2. A print buffer 1302 stores image data before transfer to the print head H as raster data. The inkjet print head H ejects the inks from the nozzles according to the image data stored in the print buffer 1302.

A feed-discharge motor control unit 1304 drives a not-illustrated conveyance motor and controls conveyance, feeding, and discharge of the print medium P. A carriage motor control unit 1300 drives the not-illustrated carriage motor and controls reciprocating scan of the carriage 1108. A data buffer 1306 temporarily stores the image data received from the image processing apparatus 1. A system bus 1307 connects the functions of the printing apparatus 2 to one another.

Figure 14:
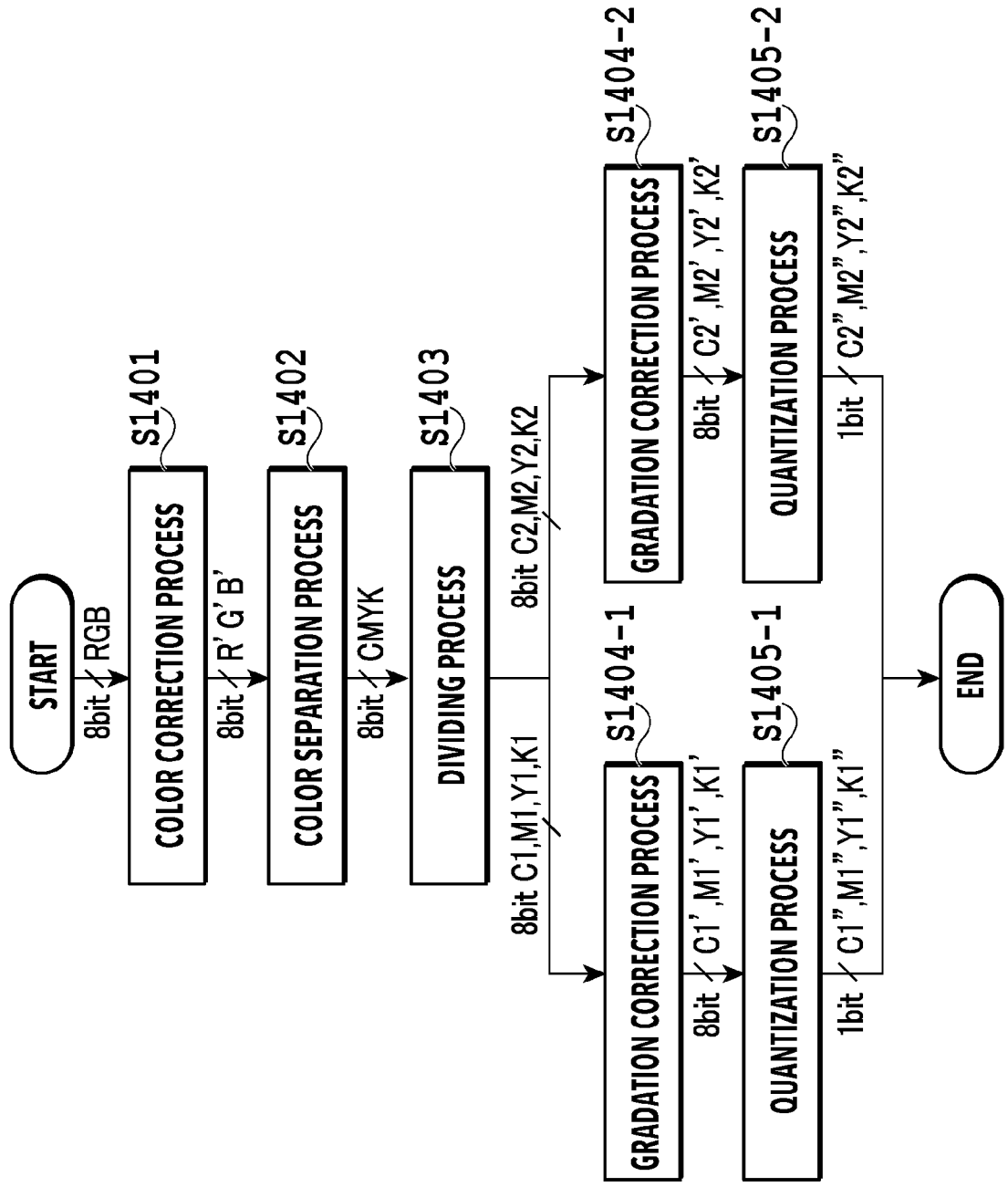
FIG. 14 is a flowchart of image processing in a first embodiment.

FIG. 14 is a flowchart for explaining processing executed by the main control unit 1308 of the image processing apparatus 1 in printing of any image with the printing apparatus 2. This processing starts in the case where the user inputs a print command of any image.

In the case where this processing is started, the main control unit 1308 first performs a color correction process in step S1401. In the embodiment, the image data generated by an application or the like is assumed to be data in which each of pixels arranged at 1200 dpi has a 8-bit, 256-level brightness value for each of R (red), G (green), and B (blue). In the color correction process, the main control unit 1308 converts such RGB data of each pixel to R'G'B' data expressed in a color space unique to the printing apparatus 2. For example, as a specific conversion method, the conversion can be performed by referring to a look-up table stored in advance in a memory.

In step S1402, the main control unit 1308 performs a color separation process on the R'G'B' data. Specifically, the main control unit 1308 refers to a look-up table stored in advance in the memory and converts the brightness values R'G'B' of each pixel to 8-bit, 256-level density values CMYK corresponding to the ink colors used by the printing apparatus 2.

In step S1403, the main control unit 1308 performs a dividing process on 8-bit, 256-level CMYK data and generates pieces of density data C1, M1, Y1, and K1 for the forward scan and pieces of density data C2, M2, Y2, and K2 for backward scan. In this case, the main control unit 1308 may substantially equally divide the density value of each color indicated in the CMYK data into two.

Hereinafter, the same processes are performed in parallel for each ink color. Accordingly, only the processes for the pieces of black data (K1, K2) are described herein for simplification.

In steps S1404-1 and S1404-2, the main control unit 1308 performs a gradation correction process on each of density values K1 and K2. The gradation correction process is correction performed to achieve a linear relationship between the inputted density value and an optical density expressed on the print medium P. Generally, the gradation correction process is performed by referring to a one-dimensional look-up table prepared in advance. The 8-bit, 256-level density values K1 and K2 are converted to 8-bit, 256-level density values K1' and K2' by the gradation correction process in steps S1404-1 and S1404-2.

In steps S1405-1 and S1405-2, the main control unit 1308 performs a predetermined quantization process on each of the density values K1' and K2' and generates a quantized value K1" for the forward scan and a quantized value K2" for backward scan. The quantized value K1" is a 1-bit binary data indicating print (1) or non-print (0) for each pixel in the forward scan. The quantized value K2" is a 1-bit binary data indicating print (1) or non-print (0) for each pixel in the backward scan. This processing is thus completed.

Pieces of binary data C1", M1", Y1", and K1" for the forward scan and pieces of binary data C2", M2", Y2", and K2" for backward scan generated in the image processing apparatus are sent to the printing apparatus 2. The controller 1301 of the printing apparatus 2 performs predetermined multipass printing according to the received binary data.

Note that, although the dividing process for dividing the data into the data for the forward scan and the data for backward scan is performed between the color separation process and the gradation correction process in the flowchart of FIG. 14, the dividing process may be performed after the gradation correction.

Figure 15:
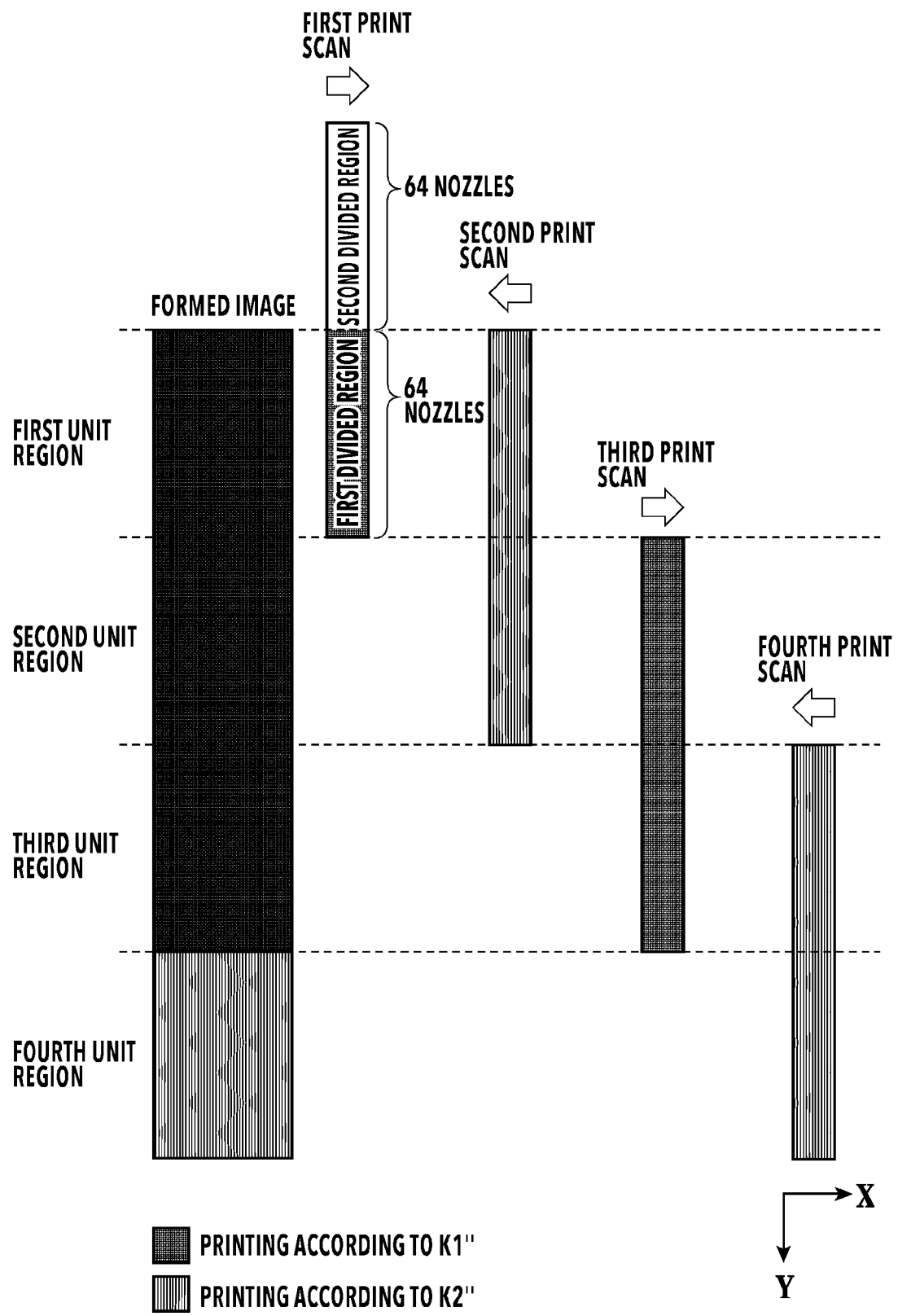
FIG. 15 is an explanatory diagram of bidirectional multipass printing.

FIG. 15 is a schematic diagram for explaining bidirectional two-pass multipass printing that is executed in the printing apparatus 2 under control of the controller 1301. In this case, in order to simply the description, a printing operation of the nozzle row 1204 (see FIG. 12) for black among the multiple nozzle rows arranged in the print head H is described.

In the case where the two-pass multipass printing is performed, 128 nozzles included in the nozzle row 1204 is divided into a first divided region and a second divided region.

In the first print scan, the controller 1301 performs the ejection operation according to the binary data K1" by using the first divided region while moving the print head H in the +X direction that is the forward direction. Then, the controller 1301 conveys the print medium in the −Y direction by 64 pixels. In FIG. 15, the nozzle row 1204 is moved in the +Y direction to express relative positional relationships between the divided regions and the print medium.

In the second print scan, the controller 1301 performs the ejection operation according to the binary data K2" by using the first divided region and the second divided region while moving the print head H in the backward direction opposite to the direction in the first print scan. Then, the controller 1301 conveys the print medium in the −Y direction by 64 pixels.

In the third print scan, the controller 1301 performs the ejection operation according to the binary data K1" by using the first divided region and the second divided region while moving the print head H in the forward direction. Then, the controller 1301 conveys the print medium in the −Y direction by 64 pixels.

Thereafter, a backward scan like the second print scan and a forward scan like the third print scan are repeatedly performed with the conveyance operation of 64 pixels performed between these scans. A dot pattern according to the binary data K1" printed in the forward scan and a dot pattern according to the binary data K2" printed in the backward scan are thereby printed in an overlapping manner in each unit region of the print medium. In the embodiment, the dot pattern according to the binary data K1" printed in the forward scan is referred to as the first dot pattern and the dot pattern according to the binary data K2" printed in the backward scan is referred to as the second dot pattern.

Figure 16:
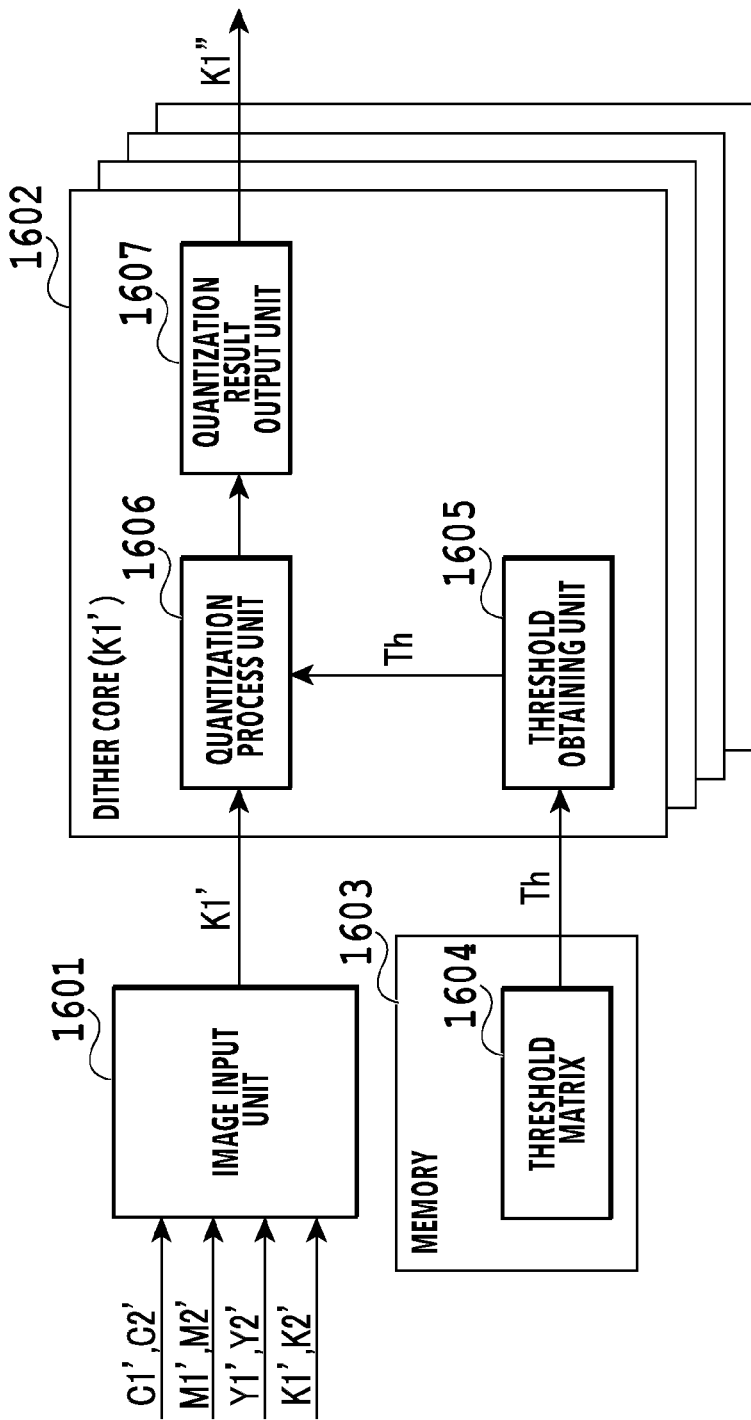
FIG. 16 is a functional block diagram for achieving a quantization process.

FIG. 16 is a functional block diagram for achieving the quantization process executed in steps S1405-1 and S1405-2 of FIG. 14. Blocks in FIG. 16 are implemented by the main control unit 1308 of the image processing apparatus 1 described in FIG. 13.

An image input unit 1601 sends the pieces of 256-level gradation data C1', C2', M1', M2', Y1', Y2', K1', and K2' subjected to the gradation correction process to dither cores 1602 prepared for the respective pieces of gradation data. Although FIG. 16 illustrates a configuration of the dither core 1602 for K1', similar dither cores 1602 are prepared also for the other pieces of gradation data.

Multiple threshold matrices 1604 corresponding to the respective pieces of gradation data C1', C2', M1', M2', Y1', Y2', K1', and K2' are stored in advance in a memory 1603. The threshold matrices 1604 store thresholds in association with pixel positions of individual pixels and can be generated by a computer and stored in the memory 1603 in advance.

A threshold obtaining unit 1605 refers to the threshold matrix 1604 corresponding to K1', obtains a threshold Th corresponding to the pixel position of K1' and received by the dither core 1602 from the threshold matrix 1604, and provides the threshold Th to a quantization process unit 1606. The quantization process unit 1606 compares the gradation value K1' of the pixel to be processed received from the image input unit 1601 and the threshold Th provided from the threshold obtaining unit 1605 and determines print (1) or non-print (0) of the dot for the pixel to be processed. A quantization result output unit 1607 outputs information of print (1) or non-print (0) determined by the quantization process unit 1606 as the quantized data K1" for the pixel to be processed.

FIG. 17 is a diagram illustrating an example of the threshold matrices stored in the memory 1603. A first threshold matrix 1701 for the forward scan and a second threshold matrix 1702 for backward scan are prepared as the threshold matrices.

In FIG. 17, individual squares correspond respectively to the pixels arranged on the XY plane and a value described in each square indicates the threshold of the corresponding pixel position. In the embodiment, since K1' and K2' each have one of values of 0 to 255, each threshold Th is set to one of values of 0 to 254. In the case where K1'>Th in the pixel to be processed, the quantized value K1" of the pixel to be processed is set to print (K1"=1). Meanwhile, in the case where K1'≤Th, the quantized value K1" of the pixel to be processed is set to non-print (K1"=0). The same applies to a relationship between K2' and K2".

In the embodiment, the threshold matrices 1701 and 1702 each having a region of 20 pixels×20 pixels as illustrated in FIG. 17 are prepared and are used by being repeatedly arranged in the X direction and the Y direction in the forward scan and the backward scan, respectively. Note that the size of the threshold matrices is not limited to this size. The size may be larger or smaller.

The first threshold matrix 1701 of the embodiment is created such that a dot pattern printed according to the result of the quantization process becomes the first dot pattern 101 in FIG. 1 at a predetermined gradation value. Moreover, the second threshold matrix 1702 is created such that a dot pattern printed according to the result of the quantization process becomes the second dot pattern 102 in FIG. 1 at the predetermined gradation value. Accordingly, even if print misalignment occurs at the predetermined gradation value between the forward scan in which the first dot pattern 101 is printed and the backward scan in which the second dot pattern 102 is printed, the dot coverage and the granularity do not vary greatly and a high-quality image can be printed.

Figure 18A:
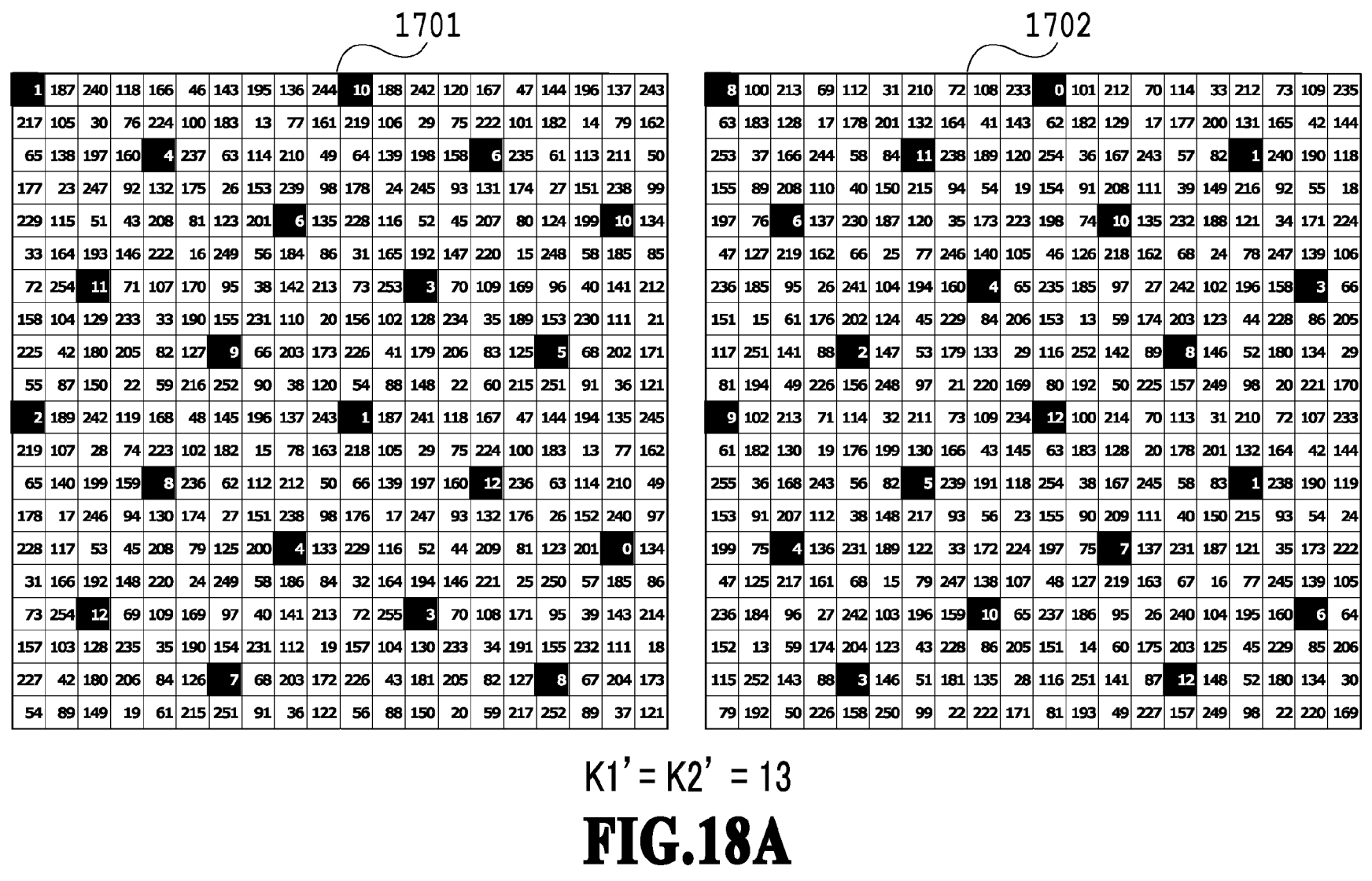
Figure 18B:
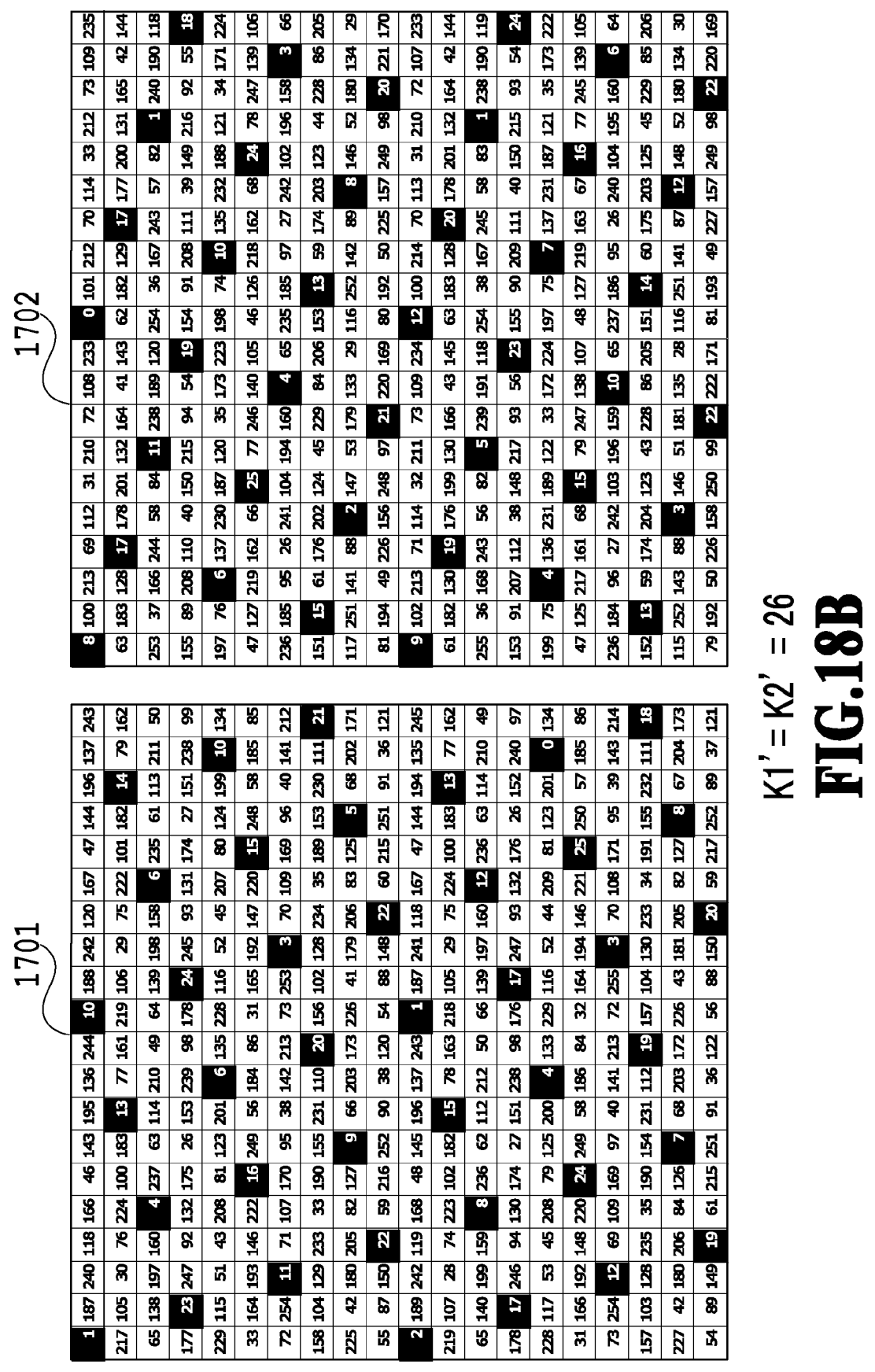
Figure 18C:
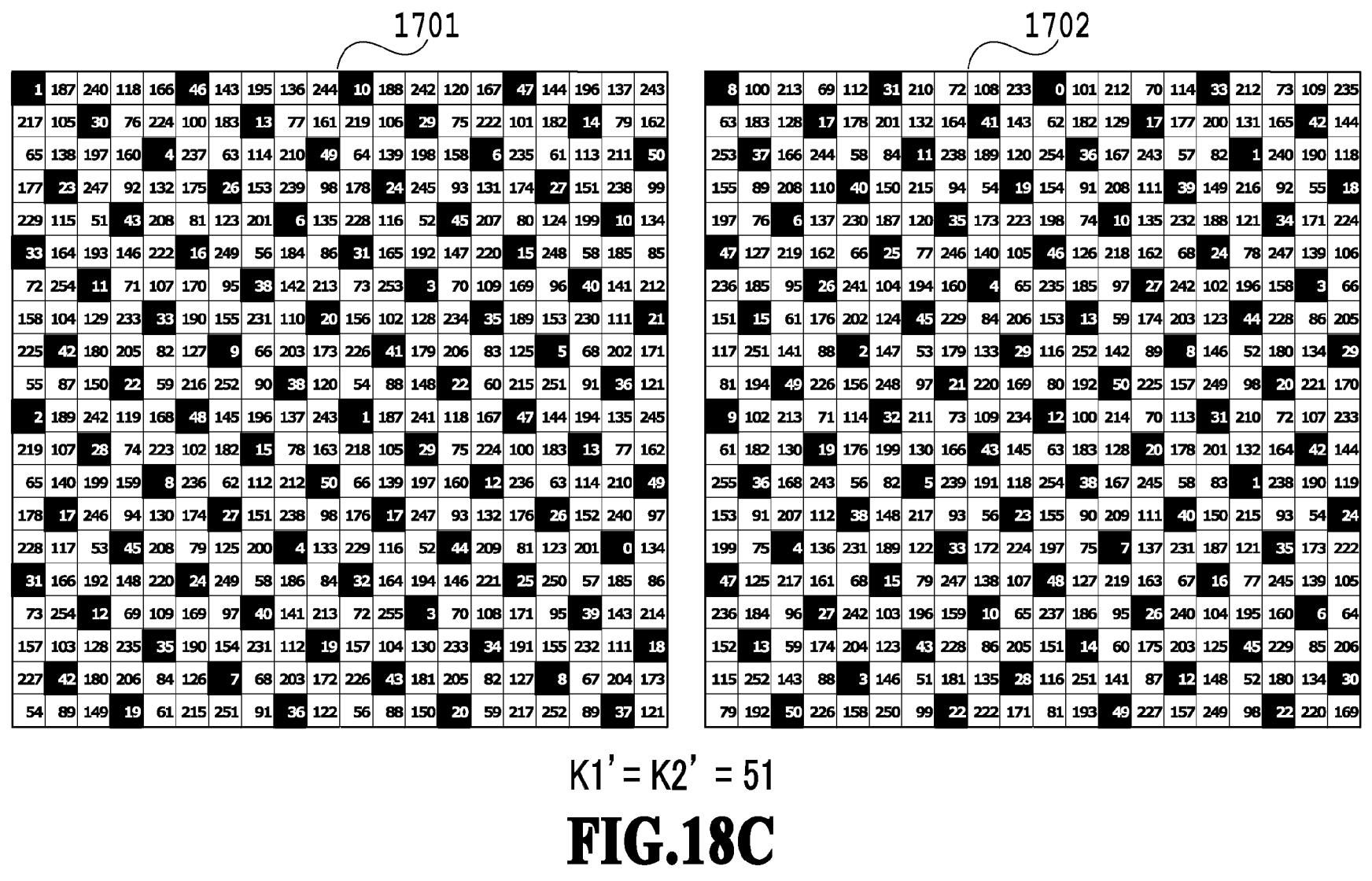

FIGS. 18A to 18C are diagrams illustrating results of performing the quantization process by using the first threshold matrix 1701 and the second threshold matrix 1702 in the case where K1' and K2' of the same value are inputted for all pixels. FIG. 18A illustrates a case where K1'=K2'=13 is inputted for all pixels. Pixels whose threshold Th satisfies Th<K1'=13 in the first threshold matrix 1701 and pixels whose threshold Th satisfies Th<K2'=13 in the second threshold matrix 1702, that is pixels indicating print of dots are illustrated as black pixels.

Similarly, FIG. 18B illustrates a case where K1'=K2'=26 is inputted for all pixels and FIG. 18C illustrates a case where K1'=K2'=51 is inputted for all pixels. It is found that, in all of FIGS. 18A to 18C, a group of black pixels in the first threshold matrix 1701 and a group of black pixels in the second threshold matrix 1702 form lattice patterns different from each other.

FIGS. 19A to 19C are diagrams illustrating dot patterns formed on the print medium in the case where dots are printed according to the results of quantization illustrated in FIGS. 18A to 18C. The print resolution is 1200 dpi and the dot diameter is 42 μm.

FIG. 19A illustrates a first dot pattern and a second dot pattern in which dots are printed according to the black pixels in FIG. 18A and a combined dot pattern obtained by superimposing these patterns one on top of the other. The first dot pattern and the second dot pattern are lattice patterns whose lattice spacing is Da1 and which are different from each other (first condition). In the combined dot pattern, a superimposed dot 191 and multiple neighboring dots 192 and 193 are formed. The first dots and the second dots forming the neighboring dots 192 and 193 are arranged at intervals of Da2 and Da3 smaller than the lattice spacing Da1 (second condition). Moreover, the neighboring dots 192 and 193 vary in the approach direction of the first dot and the second dot (third condition). Specifically, the approach direction of the first dot and the second dot in the neighboring dot 192 is the X direction while the approach direction of the first dot and the second dot in the neighboring dot 193 is the Y direction. Thus, the combined dot pattern can be considered as the robust pattern.

FIG. 19B illustrates a first dot pattern and a second dot pattern in which dots are printed according to the black pixels in FIG. 18B and a combined dot pattern obtained by superimposing these patterns one on top of the other. Moreover, FIG. 19C illustrates a first dot pattern and a second dot pattern in which dots are printed according to the black pixels in FIG. 18C and a combined dot pattern obtained by superimposing these patterns one on top of the other. Although these combined dot patterns vary in the lattice spacing (db1, Dc1), the interval (db2, db3, Dc2, and Dc3) between the first dot and the second dot forming each neighboring dot, and the approach direction, the combined dot patterns both satisfy the first to third conditions. In other words, at all of the gradation values illustrated in FIGS. 19A to 19C, the formed combined dot pattern can be considered as the robust pattern.

As described above, using the threshold matrices of the embodiment described in FIG. 17 allows formation of the robust pattern with the first dot pattern printed in the forward scan and the second dot pattern printed in the backward scan. As a result, even if misalignment occurs in any direction on the XY plane between the forward scan and the backward scan, the translational symmetric dot pattern is reproduced and the dot coverage and the granularity do not greatly vary. Hence, a high-quality image can be printed.

Simple description is given of a method of creating a threshold matrix by which a preferable robust pattern can be obtained at multiple gradation levels as described above. As a method of creating a threshold matrix for obtaining high dot dispersiveness, there has been conventionally known a method in which how dense or sparse dots are in a pixel region forming the threshold matrix is evaluated and thresholds for the respective pixels in the threshold matrix are set in the ascending order. In the embodiment, the thresholds may be set for the respective pixels of the threshold matrices by adding restrictions for expressing different lattice patterns in the individual threshold matrices and by further performing dense-sparse evaluation of dots in the combined dot pattern. In any case, as long as the threshold matrices satisfying the aforementioned first to third conditions are achieved in each gradation level, it is possible to reproduce a translational symmetric dot pattern and print a high-quality image even if misalignment occurs in any direction between the forward scan and the backward scan.

Application of First Embodiment

Although the case where the dots with the diameter of 42 μm are printed at the print resolution of 1200 dpi is described above as an example, the embodiment is not limited to such conditions as a matter of course.

Moreover, although the density values CMYK of the respective colors are each substantially evenly divided into two in the dividing process (S1403) of FIG. 14, the density value may be unevenly divided in the dividing process. In this case, although the number of printed dots is uneven between the first dot pattern and the second dot pattern formed on the print medium, the same effects as those in the aforementioned embodiment can be obtained as long as the aforementioned first to third conditions are satisfied.

Moreover, although the two-pass, bidirectional multipass printing is described above as an example, the embodiment can be applied to bidirectional printing of four or more passes. In 2N-pass multipass printing in which printing is performed by performing the forward scan N times and the backward scan N times in each unit region of the print medium, the printing apparatus only has to form the first dot pattern in a combination of the N forward scans and form the second dot pattern in a combination of the N backward scans.

Moreover, although the two-pass, bidirectional multipass printing is described above, in the multipass printing, print misalignment between print scans may occur even if the print scans are scans in the same direction. In such a case, a dot pattern formed in a first print scan and a dot pattern formed in a second print scan only have to be the first dot pattern and the second dot pattern, respectively.

Moreover, although the case where the first dot pattern and the second dot pattern are printed with the same ink and the same dot size is described as an example, these patterns may be printed with different inks or different dot sizes. For example, the printing may be such that the first dot pattern is printed in black and the second dot pattern is printed in cyan. Moreover, the printing may be such that the first dot pattern is printed with large dots and the second dot pattern is printed with small dots. Also in this case, hue unevenness and variation in granularity due to print misalignment between the dot patterns can be reduced as long as the combined dot pattern is the robust pattern. In this case, the printing may be one-pass printing in which the first dot pattern and the second dot pattern are printed in the same print scan.

Second Embodiment

Conventionally, there has been a case where, even if preferable dot dispersiveness is obtained for one color, dot dispersiveness decreases in printing of a color-mixed image and graininess becomes noticeable. To counter such a problem, the specification of U.S. Pat. No. 6,867,884 discloses a quantization method in which preferable dot dispersiveness is obtained also in color mixing. Specifically, U.S. Pat. No. 6,867,884 discloses a quantization process in which one dither matrix capable of achieving preferable dispersiveness is prepared and the same dither matrix is used for multiple colors while offsetting thresholds among the multiple colors. In the embodiment, description is given of a mode of performing a quantization process by using the dither matrices described in FIG. 17 while offsetting the thresholds among the multiple colors. Note that the inkjet printing system described in FIGS. 11 to 13 is assumed to be used also in this embodiment.

The quantization process of this embodiment is described with reference to FIG. 16 again. In this case, black is set as the first color and cyan as the second color as an example of priority of performing the quantization. First, in the dither core 1602 for K1' that is the first color, the threshold obtaining unit 1605 refers to the threshold matrix 1604 and provides a threshold Thk corresponding to the pixel position of the pixel to be processed, to the quantization process unit 1606. Specifically, the first threshold matrix 1701 described in FIG. 17 is assumed to be used as the dither matrix for K1'.

The quantization process unit 1606 compares the gradation value of K1' received from the image input unit 1601 and the threshold Thk provided by the threshold obtaining unit 1605 and determines print (1) or non-print (0) of the dot for the pixel to be processed. Specifically:

$K1''=1$ in the case where $K1' \leq Thk$ $K1''=0$ in the case where $K1' \leq Thk$.

Next, in the dither core 1602 for cyan that is the second color, the threshold obtaining unit 1605 refers to the aforementioned first threshold matrix 1701 and provides the threshold Thk corresponding to the pixel position of the pixel to be processed, to the quantization process unit 1606. The quantization process unit 1606 for cyan sets a value obtained by subtracting the value of K1' from the provided threshold Thk as a new threshold Thc for C1'. Specifically:

$Thc = Thk - K1'$.

In this case, if the Thc is a negative value, the quantization process unit 1606 adds the maximum gradation value 255 to correct the threshold Thc.

$Thc = 255 + Thc$

Then, the quantization process unit 1606 performs the quantization process of C1' received from the image input unit 1601 by using the threshold Thc obtained as described above. Specifically:

$C1''=1$ in the case where $C1' > Thc$ $C1''=0$ in the case where $C1' \leq Thc$.

Note that K2' and C2' that are pieces of gradation data for backward scan are also subjected to the same process as that described above by using the second threshold matrix 1702.

Figure 20C:
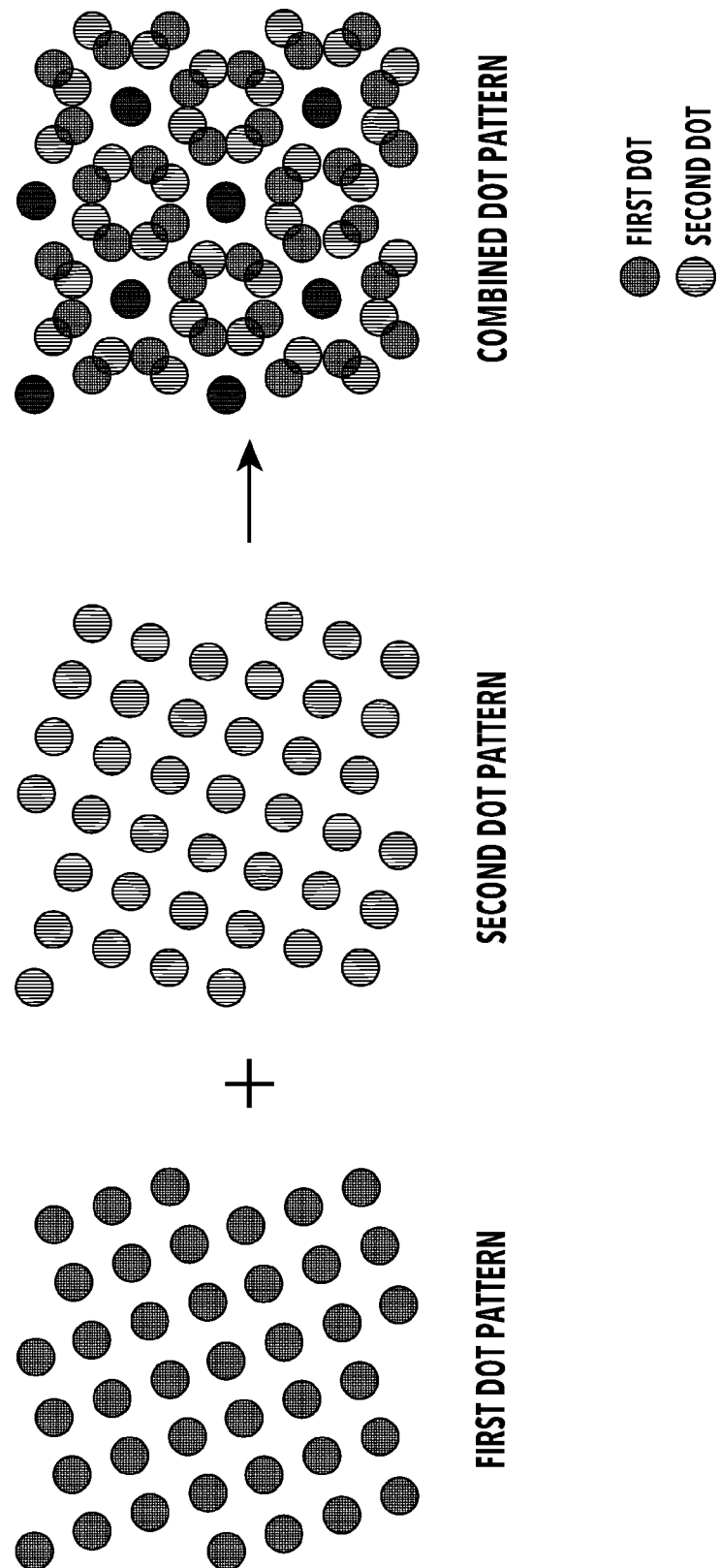

FIGS. 20A to 20C are diagrams illustrating results of performing the quantization process of the embodiment. FIG. 20A illustrates distribution of pixels whose pieces of quantized data K1" and K2" are 1 in the case where K1'=K2'=20 is inputted for each pixel. For K1' and K2' that are the first color, pixels for which thresholds of 0 to 19 are set in the first threshold matrix 1701 and the second threshold matrix 1702 are the black pixels.

FIG. 20B illustrates distribution of pixels whose pieces of quantized data C1" and C2" are 1 in the case where C1'=C2'=6 is inputted for each pixel. FIG. 20B illustrates threshold matrices obtained by correcting each of the thresholds in the first threshold matrix 1701 and the second threshold matrix 1702 according to the aforementioned formulae. For C1' and C2' that are the second color, pixels for which corrected thresholds of 0 to 5 are set in the corrected first and second threshold matrices are the black pixels. Such black pixels correspond to pixels for which thresholds of 20 to 25 are set in the first threshold matrix 1701 and the second threshold matrix 1702 before the correction. Specifically, in the sum of K1" and C1", the pixels for which thresholds of 0 to 25 are set in the first threshold matrix 1701 are the black pixels and, in the sum of K2" and C2", the pixels for which thresholds of 0 to 25 are set in the second threshold matrix 1702 are the black pixels.

FIG. 20C illustrates a dot pattern formed on the print medium in the case where dots are printed according to the quantization results illustrated in FIGS. 20A and 20B. In FIG. 20C, the print resolution is 1200 dpi and the dot diameter is 42 The first dot pattern being the sum of K1" and C1" is a lattice pattern according to the first threshold matrix 1701. Moreover, the second dot pattern being the sum of K2" and C2" is a lattice pattern according to the second threshold matrix 1702. Accordingly, a combined dot pattern obtained by combining these two lattice patterns is a robust pattern.

The same process may be performed for magenta and yellow. Specifically, in the case where magenta is the third color and yellow is the fourth color, a value obtained by subtracting the values of K1' and C1' from the threshold Thk is set as a new threshold Thm for M1' and a value obtained by subtracting the values of K1', C1', and M1' from the threshold Thk is set as a new threshold Thy for Y1'. Then, if the obtained value is a negative value, the threshold may be corrected by adding the maximum gradation value 255 thereto.

Specifically, in the embodiment, even if misalignment occurs in any direction on the XY plane between the forward scan and the backward scan, it is possible to suppress variation of dot coverage with the dot dispersiveness in the color mixing maintained at a high level and print a high-quality image in which no density unevenness or hue unevenness is detected.

Note that, although the case where black is set as the first color and cyan as the second color is described above, the order of priority of the quantization process is not limited to a particular order. For example, it is possible to set cyan as the first color and correct the threshold for black depending on the gradation value of cyan. However, in order to reduce granularity of the entire image, it is preferable to set priority in the order starting from an ink that has high dot power and tends to be noticeable on the print medium. Note that the dot power being high or low indicates a relative relationship of a degree at which one dot printed on the print medium reduces the lightness. Accordingly, in the case where inks of four colors of black, cyan, magenta, and yellow are used as in the embodiment, it is preferable to set the order of priority such that the first color is black, the second color is cyan, the third color is magenta, and the fourth color is yellow.

Moreover, in the case where an ink with the same hue and different lightness such as light cyan or light magenta is used, it is preferable to set the priority of cyan or magenta higher than the priority of light cyan or light magenta. Moreover, in the case where there are a nozzle row for large dots and a nozzle row for small dots for the same black ink, it is preferable to set the priority of the large dots higher than the priority of the small dots.

Figure 21:
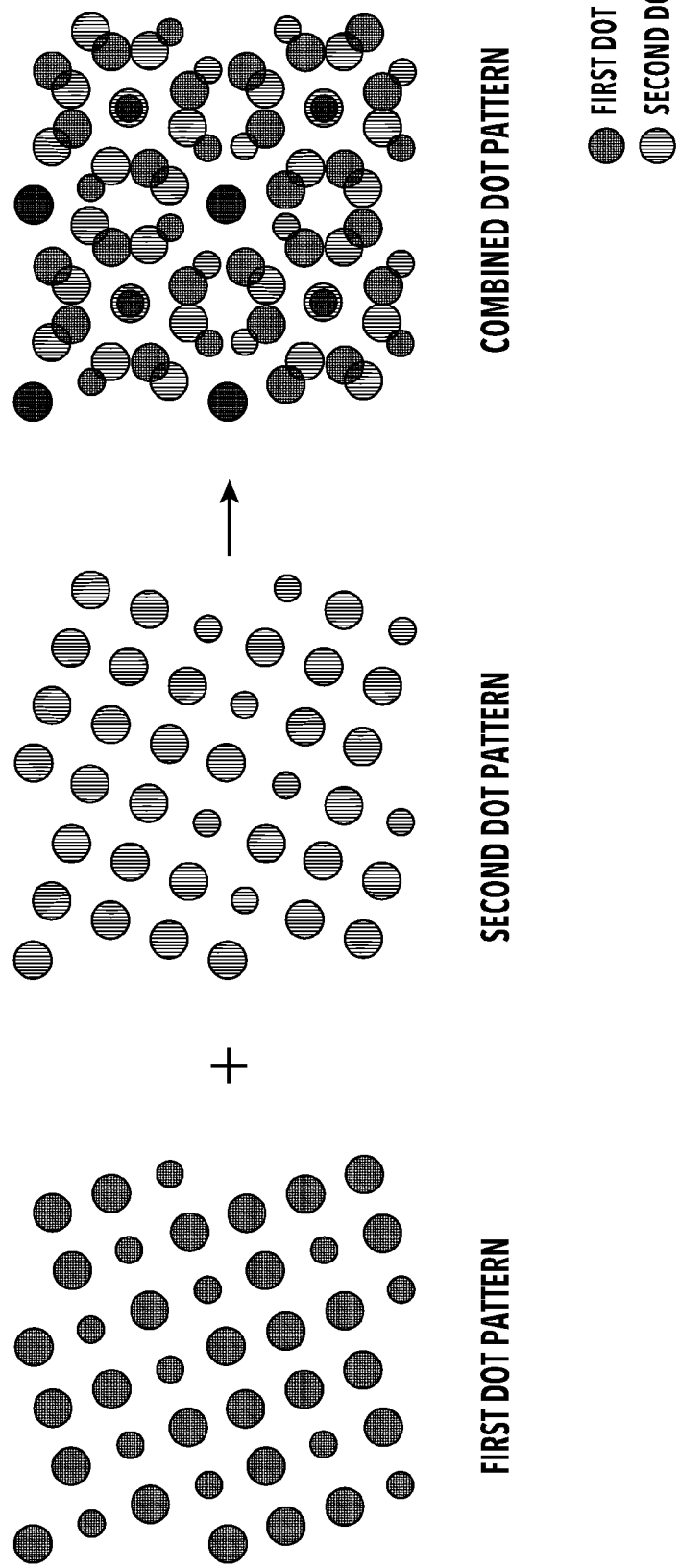
FIG. 21 is a diagram illustrating dot patterns according to the results of the quantization process in the second embodiment.

FIG. 21 illustrates dot patterns formed on the print medium in the case where the quantization process of the embodiment is performed with the large dots (42 μm) set as the first color and the small dots (30 μm) set as the second color. Since the diameters of dots forming the lattice patterns are not even, the translational symmetry of the combined dot pattern is slightly impaired. However, it is possible to suppress variation in dot coverage in a broad area and sufficiently exhibit an effect of suppressing hue unevenness and density unevenness.

Third Embodiment

Also in this embodiment, a serial inkjet printing apparatus and an inkjet printing system as described in FIGS. 11 and 13 are used as in the first and second embodiments. However, in this embodiment, a print head of a mode different from those in the aforementioned embodiments is used and image processing and drive control corresponding to this print head are performed.

<Nozzle Arrangement>

Figure 22A:
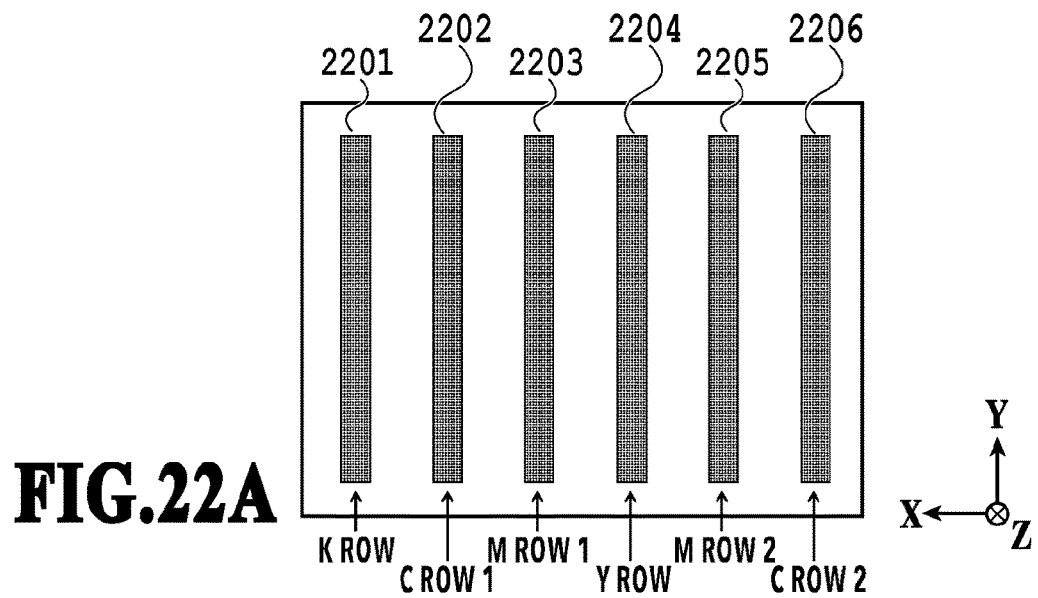
FIGS. 22A to 22C are schematic diagrams illustrating a print head used in a third embodiment.
Figure 22B:
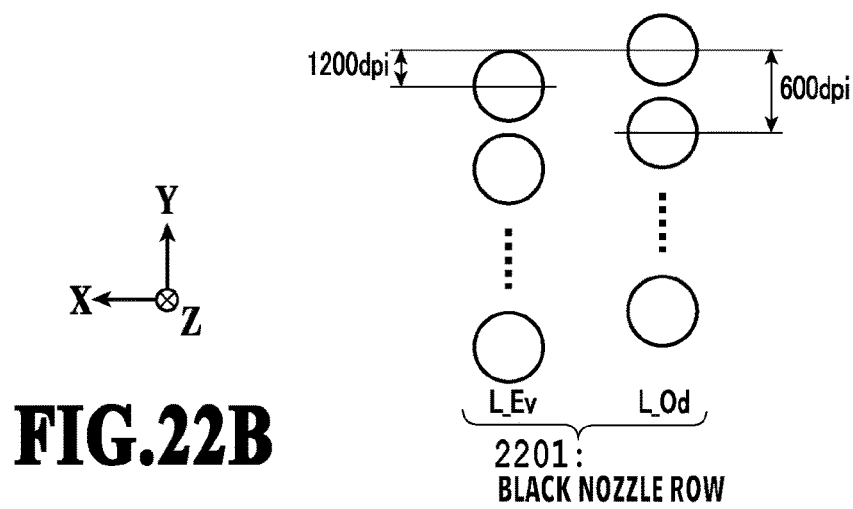
Figure 22C:
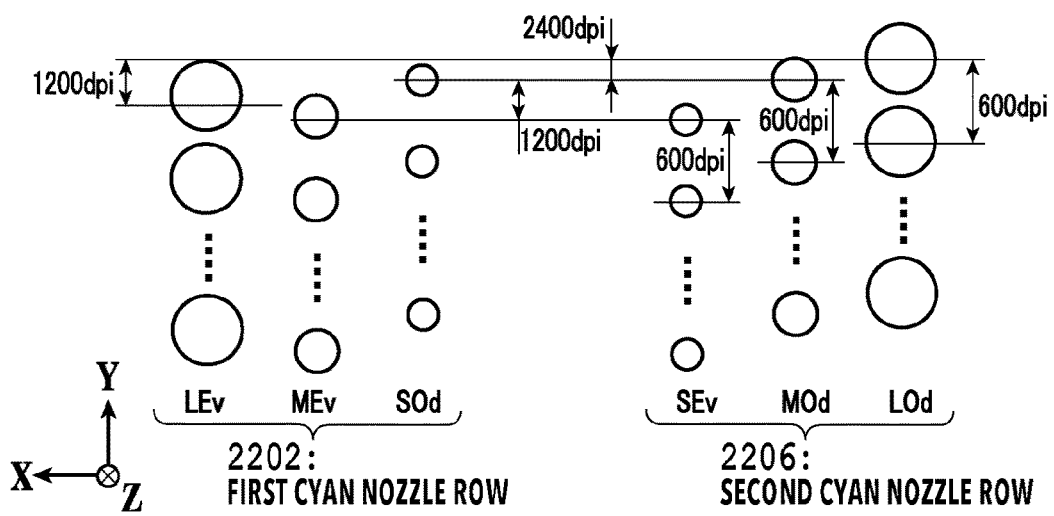

FIGS. 22A to 22C are schematic diagrams illustrating the print head H used in the embodiment as viewed from the nozzle surface side. As illustrated in FIG. 22A, six nozzle rows are arranged in parallel on the nozzle surface. The nozzle rows are a black nozzle row 2201, a first cyan nozzle row 2202, a first magenta nozzle row 2203, a yellow nozzle row 2204, a second magenta nozzle row 2205, and a second cyan nozzle row 2206 from the left.

FIG. 22B is an enlarged view of the black nozzle row 2201. A LEv row and a LOd row are arranged in the black nozzle row 2201. The LEv row and the LOd row are each formed by arranging nozzles, configured to eject 5 pl of black ink, in the Y direction at a pitch of 600 dpi. In each of the LEv row and the LOd row, 128 nozzles are aligned and the LEv row is arranged to be shifted by half a pitch in the −Y direction relative to the LOd row. Performing print scan by using the black nozzle row 2201 having such a configuration allows black dots with a dot diameter of 38 μm to be printed on the print medium at a print density of 1200 dpi. The yellow nozzle row 2204 has the same configuration as the black nozzle row 2201.

FIG. 22C is an enlarged view of the first cyan nozzle row 2202 and the second cyan nozzle row 2206. In the first cyan nozzle row 2202, a LEv row configured to eject 5 pl of cyan ink, an MEv row configured to eject 2 pl of cyan ink, and an SOd row configured to eject 1 pl of cyan ink are aligned. Meanwhile, in the second cyan nozzle row 2206, a LOd row configured to eject 5 pl of cyan ink, an MOd row configured to eject 2 pl of cyan ink, and an SEv row configured to eject 1 pl of cyan ink are aligned. Each nozzle rows are configured by arranging 128 nozzles in the Y direction at a pitch of 600 dpi.

In the first cyan nozzle row 2202 and the second cyan nozzle row 2206, the LEv row is arranged to be shifted by half a pitch (1200 dpi) in the −Y direction relative to the LOd row, the MEv row relative to the MOd row, and the SEv row relative to the SOd row. Moreover, the MEv row and the MOd row configured to eject 2 pl of cyan ink and the SEv row and the SOd row configured to eject 1 pl of cyan ink are arranged to be shifted by quarter of a pitch (2400 dpi) in the −Y direction relative to the LEv row and the LOd row configured to eject 5 pl of cyan ink. The first magenta nozzle row 2203 and the second magenta nozzle row 2205 have the same configuration as the first cyan nozzle row 2202 and the second cyan nozzle row 2206.

<Image Processing>

Figure 23:
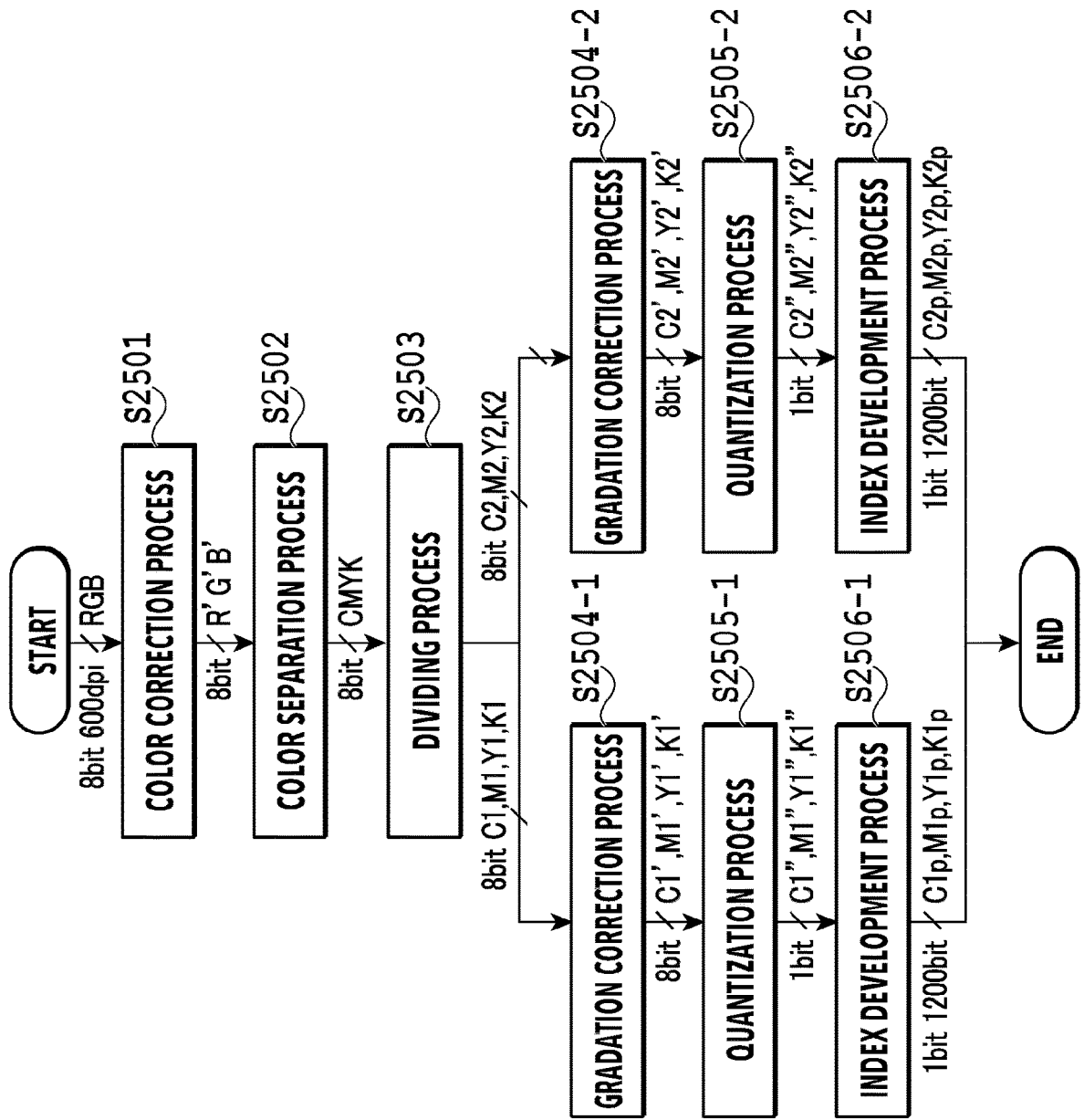
FIG. 23 is a flowchart of image processing in the third embodiment.

FIG. 23 is a flowchart for explaining processing executed by the main control unit 1308 of the image processing apparatus 1 in the case where the printing apparatus 2 of the embodiment prints any image. Since processes performed in S2501 to S2505 are the same as the processes of S1401 to S1405 of the first embodiment described in FIG. 14, description thereof is omitted herein. Note that, although the resolution of image data is 1200 dpi in the first embodiment, the resolution is 600 dpi in this embodiment.

The same processes are performed in parallel for each ink color in processes after steps S2504-1 and S2504-2. In this section, processes for the cyan data (C1' and C2') are described.

In steps S2505-1 and S2505-2, the main control unit 1308 performs a predetermined quantization process on each of pieces of multi-valued data C1' and C2' and generates quantized data C1" for the forward scan and quantized data C2" for backward scan. The method of the quantization process is the same as that in the first embodiment.

In steps S2506-1 and S2506-2, the main control unit 1308 performs an index development process. In the index development process of the embodiment, the main control unit 1308 converts the pieces of binary data C1" and C2" for 600×600 dpi into pieces of binary data C1p and C2p for 600×1200 dpi by using an index pattern prepared in advance. Specifically, a region of one pixel in the X direction×one pixel in the Y direction is divided to form a region of one pixel in the X direction×two pixels in the Y direction and print (1) or non-print (0) of the dot is set for each of the pixels.

FIGS. 24A to 24C are diagrams illustrating dot arrangement patterns and a reference index patterns used in the index development process. FIG. 24A is a diagram illustrating the dot arrangement patterns. One pixel region in 600×600 dpi is associated with two pixels in 600×1200 dpi. In the case where the quantized data C1" or C2" for one pixel in 600×600 dpi is "0", specifically indicates non-print of a dot, no dot is arranged for both pixels in 600×1200 dpi. Meanwhile, in the case where the quantized data C1" or C2" for one pixel in 600×600 dpi is "1", specifically indicates print of a dot, two positions are conceivable as a position for actually printing the dot. In the embodiment, there are prepared a pattern A in which the dot is arranged for an upper pixel, specifically, a pixel on the −Y direction side and a pattern B in which the dot is arranged for a lower pixel, specifically, a pixel on the +Y direction side. In the dot arrangement patterns of the embodiment, the nozzles in the LEv row print dots for the upper pixels and the nozzles in the LOd row print dots for the lower pixels (see FIG. 22B).

FIG. 24B is a diagram illustrating a reference index pattern 2500. In the embodiment, different index patterns are used in the index development process of step S2506-1 and the index development process of step S2506-2. However, both patterns are created based on the reference index pattern 2500.

In the reference index pattern 2500, each square corresponds to one pixel region in 600×600 dpi. For each pixel, the reference index pattern 2500 defines whether to arrange the dot according to the pattern A or the pattern B in the case where the quantized value of the corresponding pixel is "1".

FIG. 24C illustrates binary data for 600 dpi in the X direction and 1200 dpi in the Y direction in the case where the quantized values of the respective pixels are all "1" and the index development process is performed according to the reference index pattern 2500. The binary data as in FIG. 24C is generated for each of the forward scan and the backward scan and is transmitted to the printing apparatus 2. The controller 1301 of the printing apparatus 2 performs predetermined print control according to the received binary data.

Note that, although the dot arrangement patterns of FIG. 24A are patterns for 5 pl ink droplet, that is for the LEv row and the LOd row, setting of outputting a 1 pl ink droplet and a 3 pl ink droplet in a mixed manner may be employed.

<Time Divisional Drive Control>

In the inkjet print head H of the embodiment, a voltage pulse is applied to a thermoelectric conversion element (heater) provided for each of the nozzles to cause film boiling in the ink and the ink is ejected by growth energy of a generated bubble. In this case, if voltage pulses are to be applied to multiple heaters simultaneously, a large-capacity power source is necessary. Accordingly, a conventionally known time divisional driving method is employed.

Figures 25A, 25B:
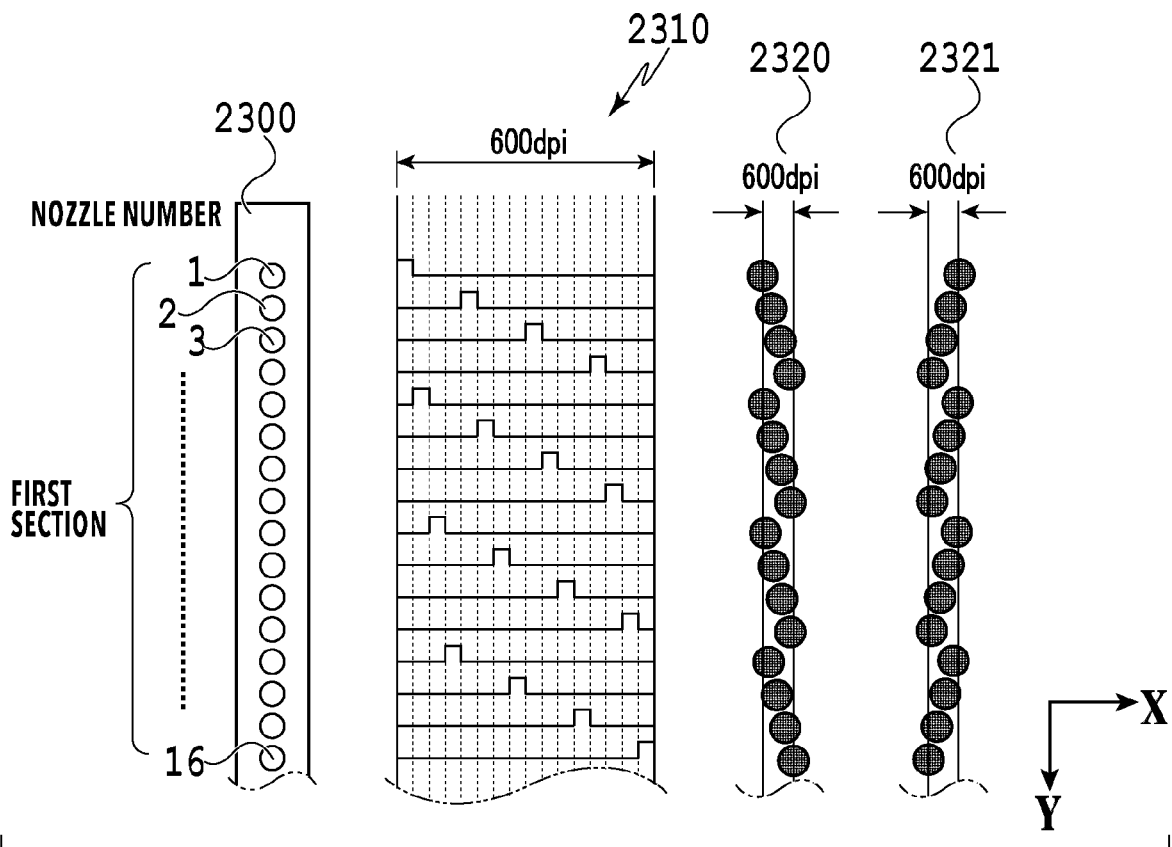
FIGS. 25A and 25B are diagrams for explaining a time divisional driving method.

FIGS. 25A and 25B are diagrams for explaining the time divisional driving method. In the time divisional driving of the embodiment, 128 nozzles aligned in the same nozzle row are divided into 16 blocks and a timing at which the voltage pulses are applied to the heaters in each block is shifted from those in the other blocks.

FIG. 25A is a diagram illustrating block numbers and the order of driving the blocks. FIG. 25A indicates that the nozzles included in a block 1 are driven at the first timing, the nozzles included in a block 2 are driven at the fifth timing, and the nozzles included in a block 16 are driven at the sixteenth timing. Each of the 16 blocks are driven at one of the first to sixteenth timings obtained by dividing a period corresponding to one pixel in 600 dpi into 16 periods.

FIG. 25B is a diagram illustrating nozzles aligned in a nozzle row 2300, a drive timing chart of the individual nozzles, and a dot print state. The nozzles aligned in the Y direction are assigned to the respective blocks such as the block 1, the block 2, . . . , from the first nozzle on the −Y direction side and the sixteenth nozzle is assigned to the block 16. Then, the seventeenth to thirty-second nozzles are assigned to the block 1, the block 2, . . . , and the block 16 again, respectively. Specifically, the block 1 includes the first, seventeenth, . . . , and one hundred thirteenth nozzles, the block 2 includes the second, eighteenth, . . . , and one hundred fourteenth nozzles, and the block 16 includes the sixteenth, thirty second, . . . , and one hundred twenty eighth nozzles.

The timing chart 2310 illustrates a drive timing of each nozzle according to the table of FIG. 25A. Although only the drive timings of the first to sixteenth nozzles are illustrated in this chart, the drive timings of the seventeenth nozzle and beyond are repetition of the drive timings in the timing chart 2310. In the timing chart 2310, the horizontal axis represents time and the vertical axis represents the voltage applied to the heaters. According to the timing chart 2310, the nozzles are driven in the order of the first, fifth, ninth, and thirteenth nozzles and the sixteenth nozzle is lastly driven in the 16 periods obtained by dividing the period corresponding to one pixel in 600 dpi by 16.

In the case where the carriage 1108 (see FIG. 11) is moved in the +X direction under such drive control, a dot pattern 2320 is formed on the print medium. Since the ejection is performed while the carriage 1108 is moved in the X direction, the dots are disposed while being shifted from one another in the X direction depending on the driving order. In further detail, in the case where regions obtained by dividing one pixel region in 600 dpi by 16 are each referred to as one part, as in the first to fourth dots, the dots printed by the four nozzles adjacent to one another are each arranged to be shifted from the adjacent dot by four parts. Accordingly, oblique lines tilted with respect to the X directions are repeatedly arranged in the Y direction on the print medium.

Meanwhile, in the case where the carriage 1108 is moved in the −X direction under the aforementioned drive control, a dot pattern 2321 is formed on the print medium. The direction of the tilt of the oblique lines is inverted in the main scanning direction from that in the dot pattern 2320 for the forward scan.

In the case where the time divisional driving as described above is performed, it is possible to reduce the number of nozzles simultaneously driven and reduce the power source capacity. Meanwhile, the print positions of the dots vary in one pixel region in 600 dpi as in the dot patterns 2320 and 2321.

<Print Control Method>

Description is given of a control method for achieving the robust pattern on the print medium in the case where two-pass multipass printing is performed with the aforementioned index development process, the print head configuration, and the time divisional drive control.

FIGS. 26A to 26D are diagrams for explaining drive control using the first cyan nozzle row 2202 and the second cyan nozzle row 2206 described in FIG. 22C. FIGS. 26A to 26D illustrate a state where dots with a diameter of 38 μm are printed for the respective pixels by using the LEv row and the LOd row configured to eject 5 pl of cyan ink.

Figure 26A:
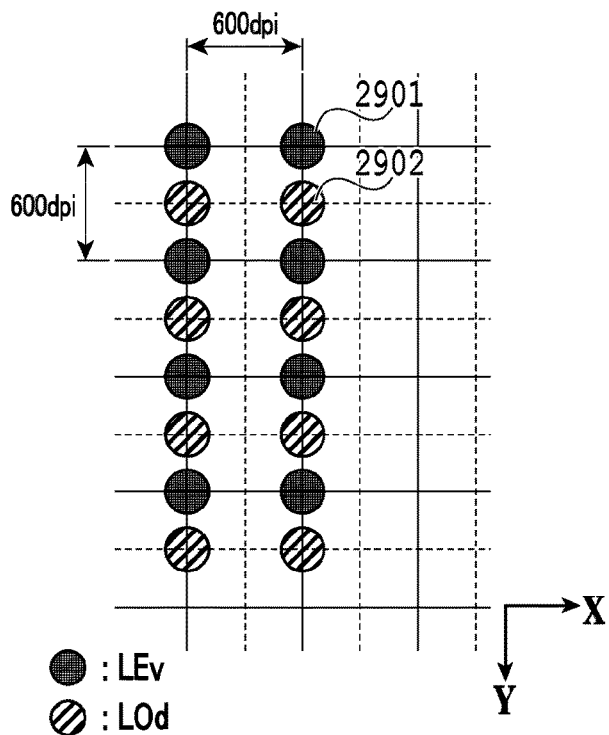
FIGS. 26A to 26D are diagrams for explaining drive control in the third embodiment.
Figure 26B:
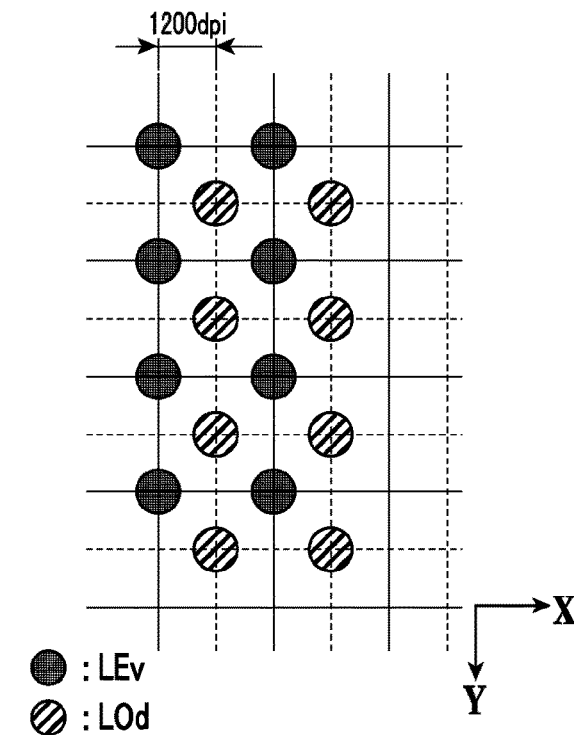

FIG. 26A illustrates a dot pattern obtained in the case where the dots are printed for the respective pixels in 600 dpi by using the LEv row and the LOd row without performing the aforementioned time divisional driving. FIG. 26B illustrates a dot pattern obtained in the case where the print position of the LOd row is shifted relative to the print position of the LEv row by one pixel in 1200 dpi without performing the time divisional driving. Shifting the print position of the LOd row relative to the print position of the LEv row in the X direction by one pixel in 1200 dpi enables formation of a lattice pattern with higher dot dispersiveness than that in FIG. 26A.

Figure 26C:
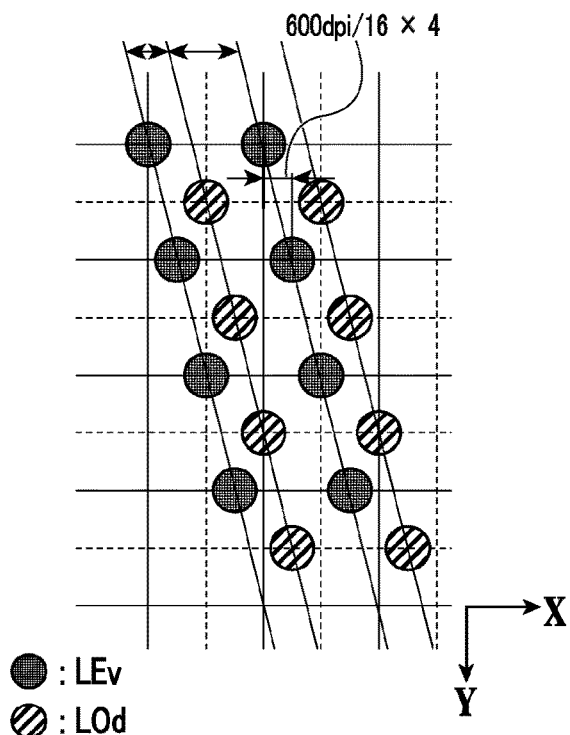

FIG. 26C illustrates a dot pattern obtained in the case where the pattern of FIG. 26B is printed in the forward scan while performing the time divisional driving. Specifically, a pattern in which shifting illustrated in the dot pattern 2320 of FIG. 25B is reflected to the pattern of FIG. 26B is obtained. Although the pattern in this case is a lattice pattern, intervals between straight lines connecting the centers of dots printed by the LOd row and straight lines connecting the centers of dots printed by the LEv row are uneven and the dot dispersiveness is lower than that in FIG. 26B.

Figure 26D:
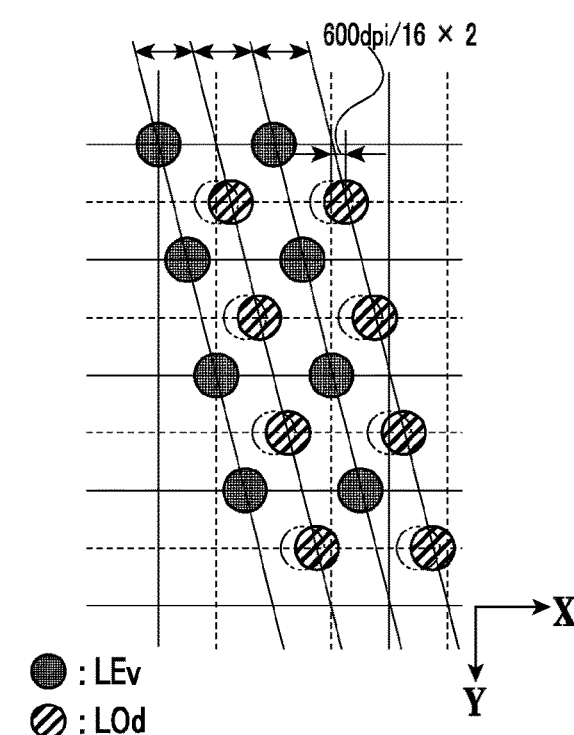

FIG. 26D illustrates a dot pattern obtained in the case where the dots are printed with the print position of the LOd row further shifted in the +X direction from the state of FIG. 26C by (600 dpi÷16×2≈15.9 μm). Such shifting can make the intervals between the dots printed by the LOd row and the dots printed by the LEv row even and achieve a preferable lattice pattern.

The shift amount of (600 dpi÷16×2) herein corresponds to half the X direction shift amount (600 dpi÷16×4) between the dots adjacent to each other in the Y direction in the time divisional driving described in FIG. 25B, that is two blocks in the time divisional driving. Accordingly, in the embodiment, there is performed drive control which uses the aforementioned time divisional driving and in which the drive timing of the LOd row is delayed in the forward scan such that the print position is shifted from the reference position by an amount corresponding to two blocks.

FIGS. 27A and 27B are schematic diagrams for explaining how the drive timing is shifted as described above in the forward and backward print scan. FIG. 27A illustrates a drive timing in the forward scan and FIG. 27B illustrates a drive timing in the backward scan. In the print head H, the first cyan nozzle row 2202 and the second cyan nozzle row 2206 are disposed as illustrated in FIG. 22C.

In the forward scan, first, the LEv row is driven in the time divisional driving at a timing at which the LEv row reaches a reference position. Then, the LOd row is not driven at a timing at which the LOd row reaches a reference position. Instead, the LOd row is driven in the time divisional driving at a timing at which the LOd row reaches a shifted position away from the reference position by a distance corresponding to two blocks (600 dpi÷16 λ2).

In the backward scan, first, the LOd row is not driven at a timing at which the LOd row reaches the reference position. Instead, the LOd row is driven in the time divisional driving at a timing at which the LOd row reaches a shifted position away from the reference position by a distance corresponding to two blocks (600 dpi÷16 λ2). Then, the LEv row is driven in the time divisional driving at a timing at which the LEv row reaches the reference position.

Performing the drive control as described above enables obtaining of the lattice pattern illustrated in FIG. 26D in the forward scan and a lattice pattern inverted from the lattice pattern of FIG. 26D in the main scanning direction in the backward scan. However, if there is a limit to resolution of shifting due to limitations of the printing apparatus, it is only necessary to achieve shifting of at least 1200 dpi.

Although the contents in which the drive timing of the LOd row is shifted (delayed) relative to that of the LEv row is described above, the dot pattern illustrated in FIG. 26D can be obtained also by forwarding the drive timing of the LEv row relative to that of the LOd row. Moreover, the nozzle row whose drive timing is shifted may be switched between the LEv row and the LOd row in the forward scan and the backward scan.

In FIGS. 26A to 26D, description is given of the drive method for achieving a preferable lattice pattern for four nozzles (eight nozzles in the LOd row and the LEv row) adjacent to one another in the Y direction. However, in the time divisional driving of the embodiment, as illustrated in FIG. 25B, shifting of 11 blocks occurs every four nozzles. Accordingly, in the embodiment, an index pattern and a threshold matrix that can eliminate such shifting and enable obtaining of a preferable lattice pattern in the entire nozzle row region are prepared.

<Regarding Index Pattern>

FIGS. 28A and 28B are diagrams for explaining column shifting of a raster group. In each of FIGS. 28A and 28B, a left portion illustrates binary data for the LEv row and a right portion illustrates a dot pattern based on this binary data. In FIGS. 28A and 28B, vertical and horizontal frame lines define one pixel region in 600 dpi and each of black squares indicates that printing of a dot is set by the binary data. In the following description, a group of pixels at the same pixel position in the X direction is referred to as column and a group of pixels at the same pixel position in the Y direction is referred to as raster.

FIG. 28A illustrates binary data in the state where print (1) is set for 1 to 16 nozzles in the LEv row in columns arranged at intervals of three columns and a dot pattern in the case where dots are printed in the forward scan according to this binary data. Since the time divisional driving is performed, the dot pattern 2320 illustrated in FIG. 25B is repeatedly arranged at a cycle of four rasters, at intervals of three columns.

FIG. 28B illustrates binary data in a state where the nozzles in the LEv row are grouped into raster groups each including four nozzles and the print pixels are shifted by one column in the +X direction between each two adjacent raster groups and a dot pattern according to this binary data.

In a comparison between the dot pattern of FIG. 28A and that of FIG. 28B, shifting of the dots due to the time divisional driving is less noticeable in FIG. 28B and FIG. 28B is an image with good uniformity. Although 1 to 16 nozzles are illustrated herein, the same effects can be obtained by shifting the positions of the print pixels in the unit of the raster group for 17 to 128 nozzles according to the aforementioned rules.

FIGS. 29A and 29B are each a diagram illustrating relationships between the binary data for the LEv row and the LOd row and the dot pattern as in FIGS. 28A and 28B. In each of lattice cells, a black square in an upper region indicates that print (1) is set for the corresponding nozzle in the LEv row and a black square in a lower region indicates that print (1) is set for the corresponding nozzle in the LOd row. In the dot pattern, the dots printed by the LEv row and the dots printed by the LOd row are shifted from one another due to the time divisional driving and are also shifted from one another due to the control described in FIGS. 27A and 27B.

Accordingly, for regular binary data as illustrated in FIG. 29A, a certain level of dot dispersiveness is obtained but a lattice pattern in a strict sense is not obtained. Meanwhile, FIG. 29B illustrates the case where the column shifting in the unit of raster group described in FIGS. 28A and 28B is performed on the binary data of FIG. 29A. It can be found that a preferable lattice pattern is obtained in the dot pattern of FIG. 29B.

In the embodiment, as described above, there is prepared in advance an index pattern that enables obtaining of a preferable lattice pattern on the print medium as in FIG. 29B in consideration of the positions of the nozzles in the LEv row and the LOd row and the characteristics of the time divisional driving.

FIGS. 30A to 30D are diagrams illustrating an index pattern 3001 for the forward scan used in the embodiment and pieces of binary data obtained in the case where the index pattern 3001 is used. The index pattern 3001 for the forward scan illustrated in FIG. 30A is a pattern in which the column shift described in FIG. 28B is reflected to the reference index pattern 2500 described in FIG. 24B. Specifically, the index pattern 3001 is a pattern in which reference index pattern 2500 is repeatedly arranged in the X and Y directions and the contents of this pattern are shifted in the +X direction by one column every raster group. FIG. 30B illustrates binary data in the case where the index pattern 3001 illustrated in FIG. 30A is developed according to the dot arrangement patterns illustrated in FIG. 24A.

Meanwhile, FIG. 30C is a pattern illustrating print pixels in the binary data illustrated in FIG. 29B in 600 dpi.

Specifically, in the case where gradation data of about 2/16 (12.5%) is inputted, binary data as illustrated in FIG. 30C is generated in the quantization process of the embodiment. FIG. 30D illustrates a result of developing the binary data illustrated in FIG. 30C according to the development pattern illustrated in FIG. 30B. Specifically, FIG. 30D is a result of a logical AND of the pattern of FIG. 30B and the pattern of FIG. 30C. Performing the ejection operation according to the binary data of FIG. 30C by using the nozzles in the LEv row and the LOd row causes a preferable lattice pattern as illustrated in FIG. 29B to be printed on the print medium.

Figure 31A:
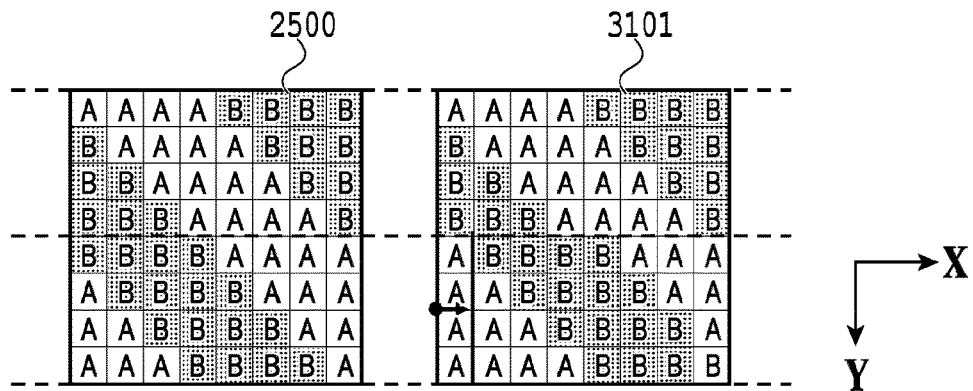
FIGS. 31A and 31B are diagrams illustrating a method of creating the index pattern.
Figure 31B:
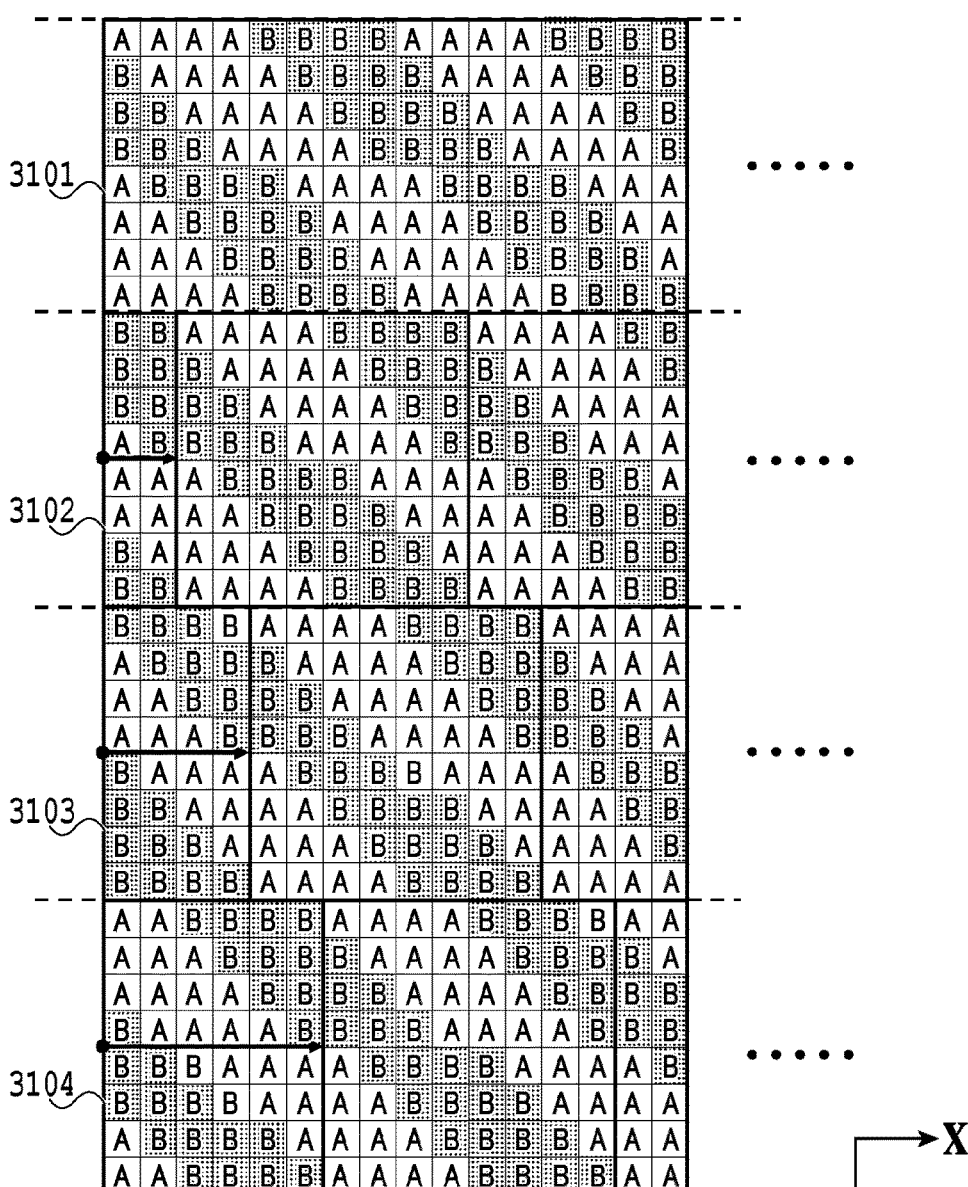

FIGS. 31A and 31B are diagrams for explaining a specific method of creating the index pattern 3001 for the forward scan in the embodiment from the reference index pattern 2500 described in FIG. 25B. First, as illustrated in FIG. 31A, the reference index pattern 2500 having a region of 8 pixels×8 pixels is prepared and the pattern contents of the lower (+Y direction side) four pixels in each row are shifted by one pixel in the +X direction. Hereinafter, the thus-created index pattern is referred to as the first index pattern 3101. Then, the first index pattern 3101 is repeatedly used in the X direction for the first eight rasters.

Next, as illustrated in FIG. 31B, a second index pattern 3102 in which the contents of the entire first index pattern 3101 are shifted by two pixels in the +X direction is created. Then, the second index pattern 3102 is repeatedly used in the X direction for the next eight rasters. A third index pattern 3103 and a fourth index pattern 3104 are similarly created and similarly arranged and an index pattern for a total of 32 rasters is thereby completed.

In the embodiment, the thus-created index pattern having a region of 32 pixels×32 pixels is used in the index development process for the forward scan in S2506-1 of FIG. 24. Meanwhile, in the index development process for backward scan in S2506-2 of FIG. 24, a pattern obtained by inverting the index pattern 3001 for the forward scan in the main scanning direction is used.

<Regarding Threshold Matrix>

Figures 32A, 32B:
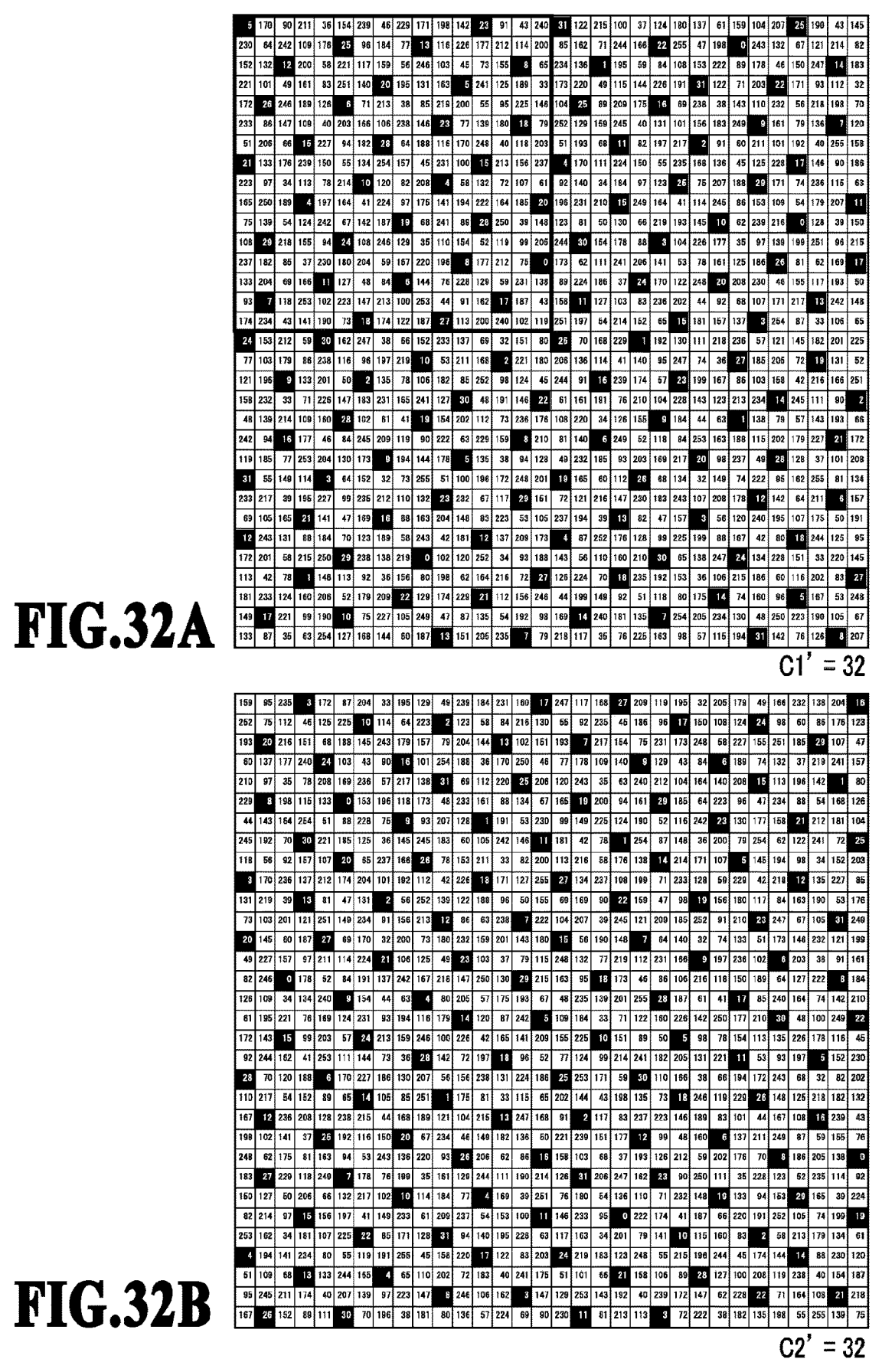

FIGS. 32A and 32B are diagrams illustrating threshold matrices used in the quantization process of the embodiment. FIG. 32A is a threshold matrix used in the quantization process for the forward scan and FIG. 32B is a threshold matrix used in the quantization process for backward scan. Both threshold matrices have a pixel region of 32 pixels×32 pixels like the aforementioned index pattern. FIGS. 32A and 32B illustrate results of quantization in the case where gradation data of C1'=C2'=32 is inputted into all of 32 pixels×32 pixels. Pixels illustrated in black correspond to pixels of print (C1"=1, C2"=1). It can be found that distribution of black pixels in a region surrounded by a bold frame in FIG. 32A matches distribution in the binary data of FIG. 30C illustrating the case where the gradation data of about 12.5% (32/255) is inputted. In this case, the threshold matrix for the forward scan illustrated in FIG. 32A and the threshold matrix for backward scan illustrated in FIG. 32B are in a relationship in which arrangement of the black pixels is opposite in the X direction.

Also in the creation of the threshold matrices used in the embodiment, the image processing apparatus 1 only has to add restrictions for expressing different lattice patterns in the forward scan and the backward scan and then set the thresholds while performing dense-sparse evaluation of dots as in the first embodiment. In this case, in the embodiment, the image processing apparatus 1 only has to form the preferable lattice patterns while taking, particularly, the nozzle arrangement configuration and the restrictions of the time divisional driving into consideration.

Figure 33:
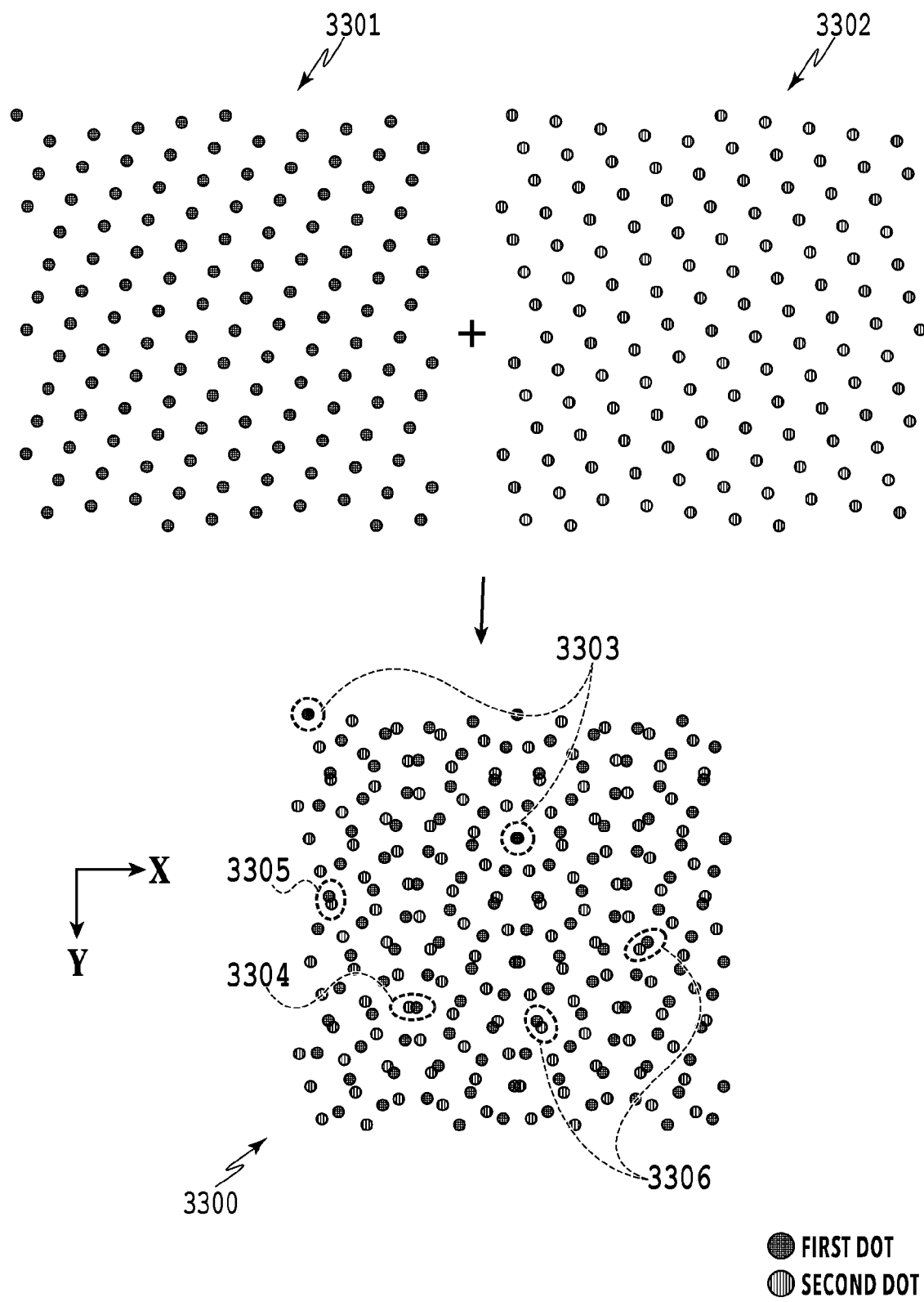
FIG. 33 is a diagram illustrating a robust pattern achieved in the third embodiment.

FIG. 33 is a diagram illustrating dot patterns of the embodiment formed on the print medium in the case where the series of control operations described above is performed. FIG. 33 illustrates a first dot pattern 3301 printed on the print medium in the forward scan according to the gradation data C1', a second dot pattern 3302 printed on the print medium in the backward scan according to the gradation data C2', and a combined dot pattern 3300 of the patterns 3301 and 3302.

According to FIG. 33, the first dot pattern 3301 and the second dot pattern 3302 are different lattice patterns (first condition). Moreover, in the combined dot pattern 3300 obtained by superimposing the patterns 3301 and 3302 one on top of the other, there are superimposed dots 3303 and a neighboring dot 3304 and the first dot and the second dot forming the neighboring dot 3304 are arranged at an interval smaller than the lattice spacing (second condition). Moreover, in the combined dot pattern 3300, there are multiple neighboring dots with different approach directions such as the neighboring dot 3304 in which dots approach in the X direction, a neighboring dot 3305 in which dots approach in the Y direction, and a neighboring dot 3306 in which dots approach in an oblique direction (third condition). Thus, the combined dot pattern 3300 of the embodiment can be considered as the robust pattern.

As described above, according to the embodiment, the quantization process is performed by using the threshold matrices illustrated in FIGS. 32A and 32B with the print head illustrated in FIGS. 22A to 22C, under the time divisional drive control illustrated in FIGS. 25A and 25B, and the index development process is performed by using the index pattern illustrated in FIG. 30A. This allows preferable different lattice patterns to be formed respectively for the forward scan and the backward scan while making the print position shifting due to the time divisional drive control and the nozzle arrangement configuration in the print head H less noticeable and a preferable robust pattern can be printed on the print medium.

<Control in Low Gradation Value Region>

In the case where the quantization process is performed by using the threshold matrices illustrated in FIGS. 32A and 32B, a situation where only one of the LEv nozzle row or the LOd nozzle row is used occurs in a low gradation value region. This is because, in the case where a lattice pattern is formed in one of the dot patterns, a situation where only one of the LEv nozzle row or the LOd nozzle row is used inevitably occurs and the same nozzle row is used also in the other dot pattern obtained by inverting the one dot pattern in the X direction. In this case, there is a risk that the usage frequencies of the nozzle rows become uneven and the life of the print head becomes shorter. In view of this, special threshold matrices are prepared for a low gradation value region in the embodiment.

Figures 34A, 34B:
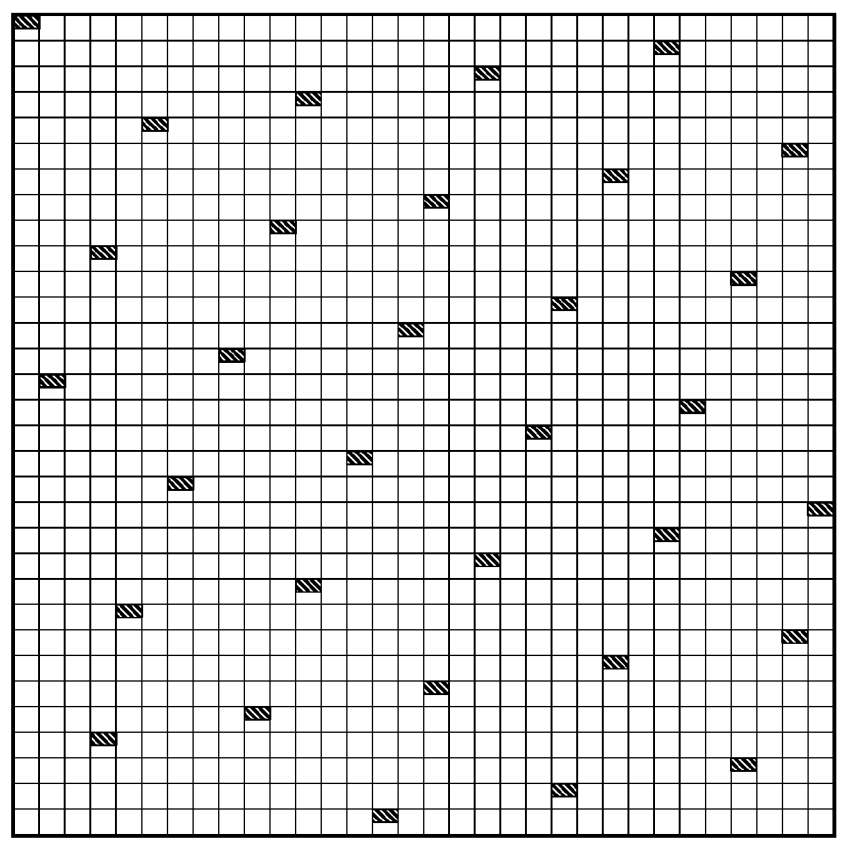
FIGS. 34A to 34D are diagrams illustrating threshold matrices used in a low gradation value region.

FIGS. 34A to 34D are diagrams for explaining the threshold matrices used in the low gradation value region of the embodiment. FIG. 34A is a threshold matrix for the forward scan. The threshold matrix for the forward scan is assumed to be the same as the threshold matrix illustrated in FIG. 32A. In FIG. 34A, pixels of print (C1"=1) in the case where gradation data of C1'=32 is uniformly inputted are illustrated as black pixels. FIG. 34B illustrates a result of the index development process performed based on FIG. 34A by using the index pattern in FIG. 30A. It can be found that the pixels in which print (1) is set all correspond to the LEv nozzle row.

Figures 34C, 34D:
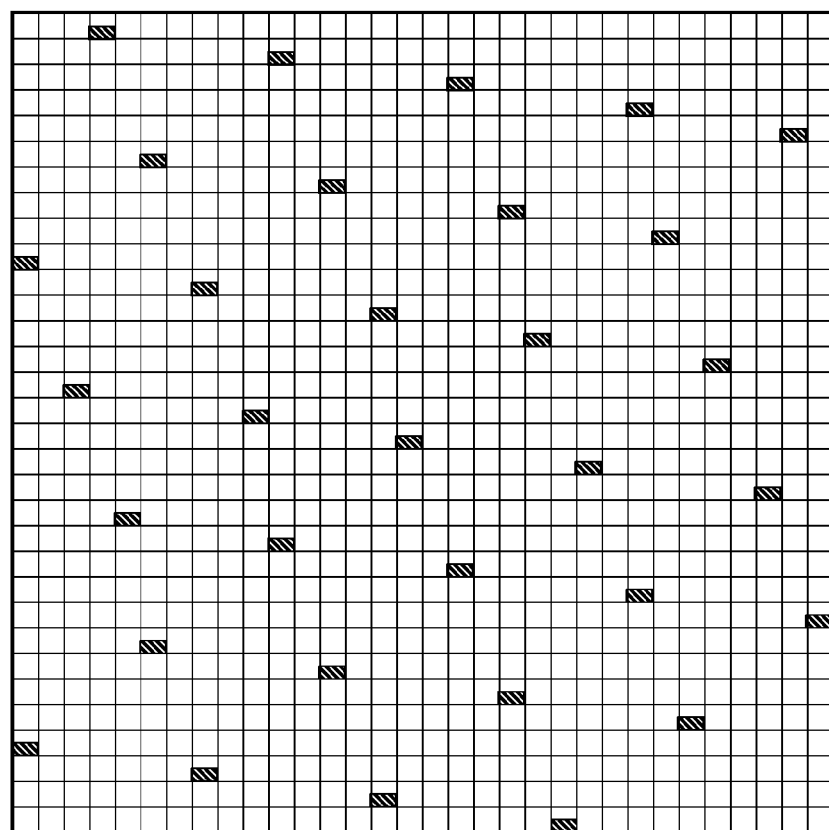

Meanwhile, FIG. 34C is a threshold matrix for backward scan used in the low gradation value region. This threshold matrix is a matrix in which thresholds of a threshold matrix inverted in the X direction are further offset by an odd number of rasters such that all pixels in which print (1) is set are made to correspond to the LOd nozzle row. As illustrated in FIG. 34D, this causes all pixels in which print (1) is set to correspond to the LOd nozzle row and can equalize the usage frequency of the LOd nozzle row with that of the LEv nozzle row. Moreover, different lattice patterns can be achieved in the first dot pattern and the second dot pattern.

Figure 35:
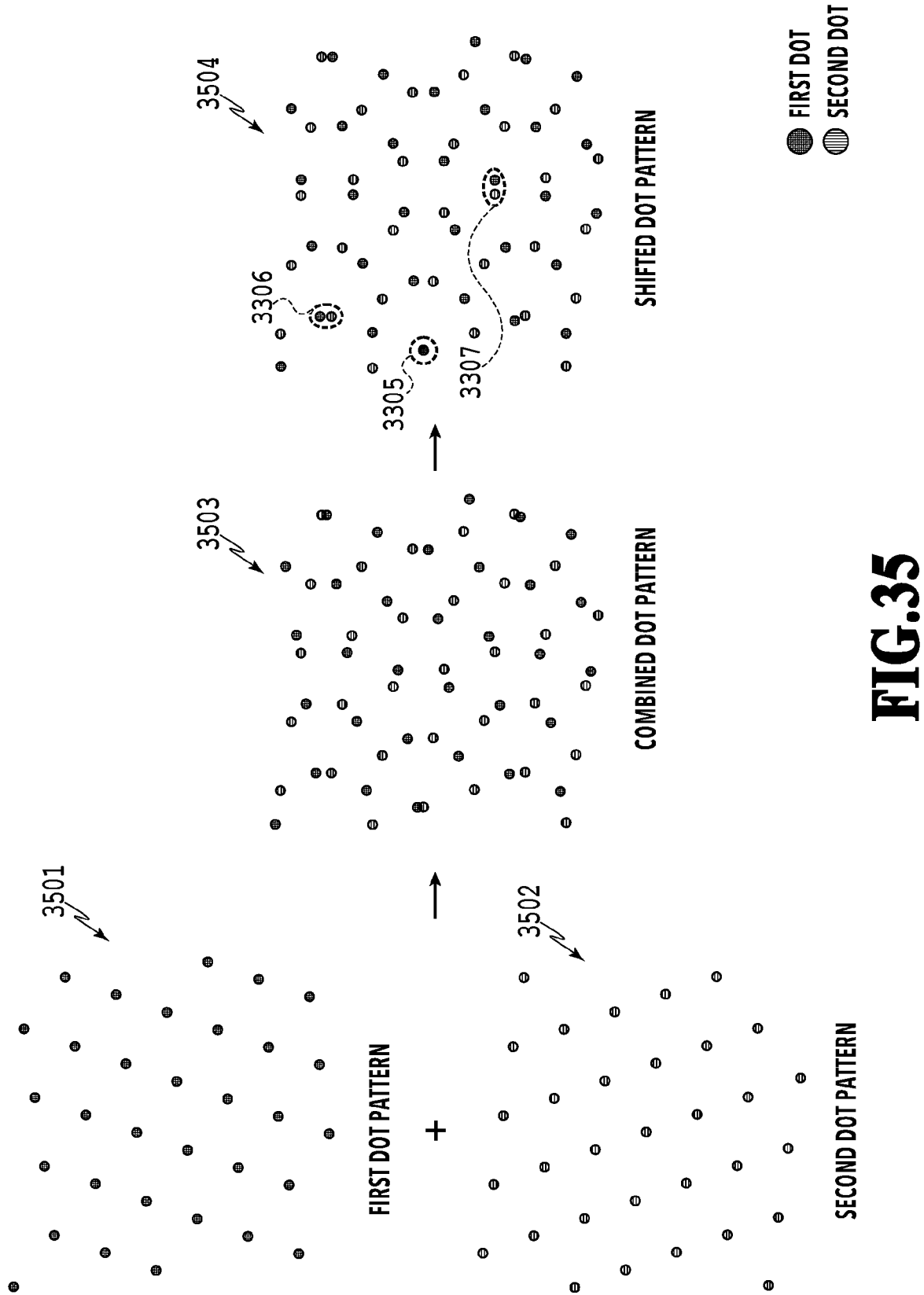
FIG. 35 is a diagram illustrating dot patterns formed in the low gradation value region.

FIG. 35 is a diagram illustrating dot patterns formed on the print medium in the case where gradation data of C1'=C2'=8 is uniformly inputted. FIG. 35 illustrates a first dot pattern 3501 printed on the print medium in the forward scan according to the gradation data C1', a second dot pattern 3502 printed on the print medium in the backward scan according to the gradation data C2', and a combined dot pattern 3503 of the patterns 3501 and 3502. In this example, since the first dot pattern 3501 is printed only by the LEv nozzle row and the second dot pattern 3502 is printed only by the LOd nozzle row, there is no superimposed dot in the combined dot pattern. However, in the case where the first dot pattern 3501 and the second dot pattern 3502 are shifted relative to each other in the Y direction by one pixel in 1200 dpi, a shifted dot pattern 3504 including a superimposed dot 3305 and multiple neighboring dots 3306 and 3307 is obtained. In this shifted dot pattern 3504, there are the neighboring dots 3306 and 3307 with different approach directions and a robust pattern is thus formed.

According to the embodiment described above, the image processing apparatus 1 can perform main image processing at a resolution of 600 dpi, in other words, at low load. Meanwhile, the printing apparatus 2 can achieve printing of substantially 1200 dpi×1200 dpi by using the print head capable of achieving a print resolution of 1200 dpi and by using the time divisional driving. Moreover, in the series of image processes, the threshold matrices and index patterns suitable for the time divisional drive control and the nozzle arrangement configuration of the print head are prepared for the forward scan and the backward scan and the image processes based on these matrices and patterns are performed. This allows preferable different lattice patterns to be printed respectively in the forward scan and the backward scan while making the print position shifting due to the time divisional drive control and the nozzle arrangement configuration in the print head less noticeable. As a result, a preferable robust pattern can be printed on the print medium.

Fourth Embodiment

In the third embodiment, the column shift in the unit of the raster group is performed on the reference index pattern 2500 illustrated in FIG. 25 to generate the actually-used index pattern illustrated in FIG. 30A and the index pattern obtained by inverting this index pattern in the X direction. Then, the image processing apparatus 1 assigns each piece of image data to the LEv row or the LOd row by using the index patterns generated as described above. Meanwhile, in this embodiment, such assigning of print data to the LEv row or the LOd row is performed by a mask process.

Figure 36:
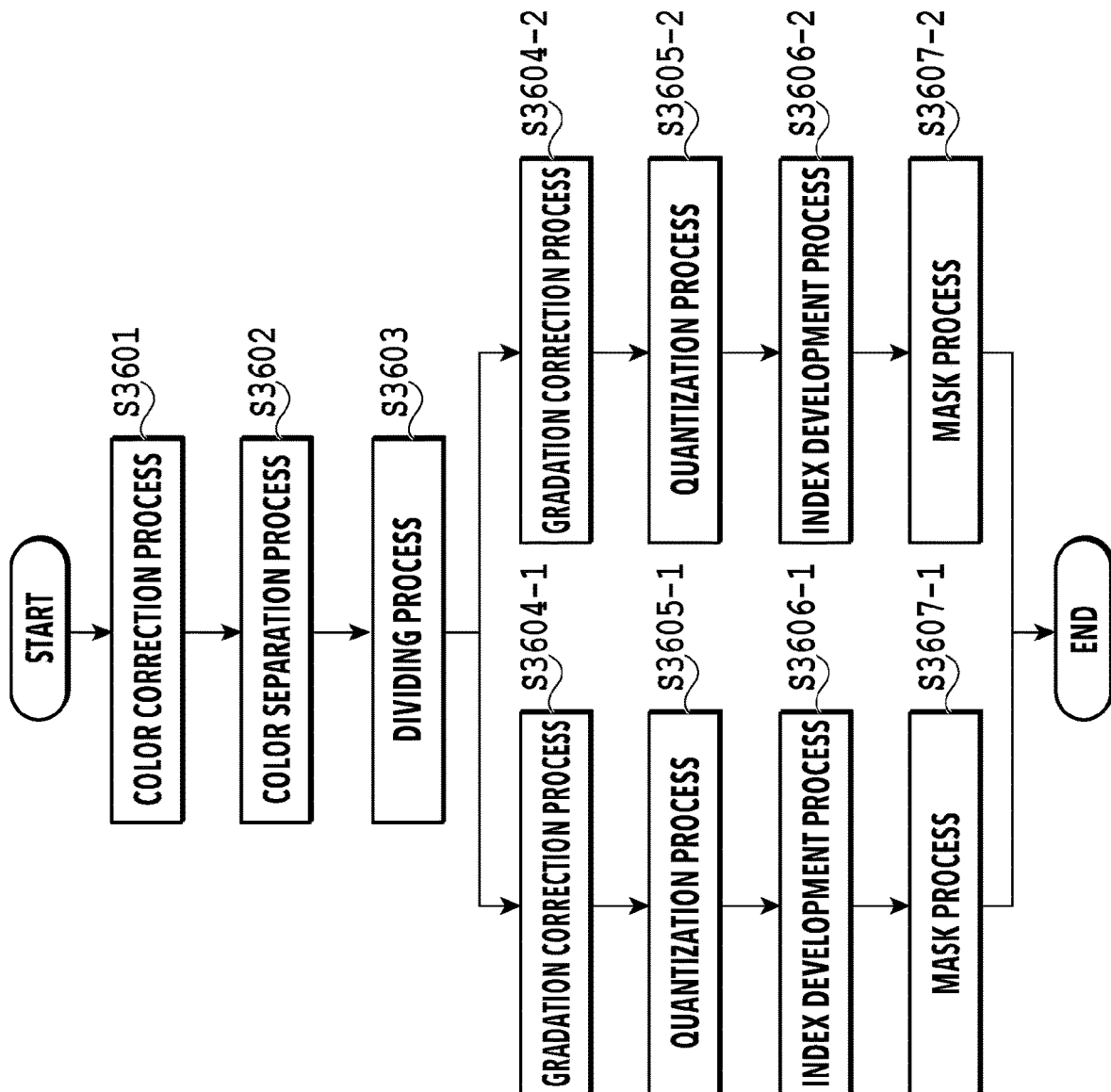
FIG. 36 is a flowchart of image processing in a fourth embodiment.

FIG. 36 is a flowchart for explaining processes executed by the main control unit 1308 of the image processing apparatus 1 in the case where the printing apparatus 2 of the embodiment prints any image. Since processes performed in S3601 to S3605-1 and S3605-2 are the same as the processes of S2501 to S2505-1 and S2505-2 in the third embodiment described in FIG. 23, description thereof is omitted.

In the embodiment, in S3606-1 and S3606-2, the main control unit 1308 performs an index development process using an index pattern different from those in the third embodiment.

FIGS. 37A to 37C are diagrams illustrating a dot arrangement pattern and the index pattern used in the index development process of the embodiment. FIG. 37A is a diagram illustrating the dot arrangement pattern of the embodiment. In the embodiment, there is used only the pattern C in which dots are arranged in both of the upper pixel and the lower pixel in the case where the quantized value of one pixel in 600 dpi×600 dpi is "1".

FIG. 37B is a diagram illustrating the index pattern. In the embodiment, the pattern C is set for all pixels forming a 8×8 pixel region. Accordingly, in the case where the quantized values of the respective pixels are uniformly "1", the binary data for 600 dpi in the X direction and 1200 dpi in the Y direction is as illustrated in FIG. 37C regardless of whether the scan is the forward scan or the backward scan.

Returning to the description of FIG. 36, the main control unit performs a mask process in step S3607-1 and step S3607-2. In the mask process, for each of the pixels in 600 dpi, one of the upper pixel and the lower pixel forming this pixel is masked. Specifically, for each of the pixels in 600 dpi, whether the printing is to be performed in the LEv row or the LOd row is determined. Such a mask process is performed by calculation of a logical AND between the binary data generated in the index development process and a mask pattern prepared in advance.

FIGS. 38A and 38B illustrate mask patterns used in the aforementioned mask process. FIG. 38A is a mask pattern with the same contents as the reference index pattern described in FIG. 25C. Moreover, FIG. 38B illustrates a state where the column shifting in the unit of the raster group is performed on the mask pattern of FIG. 38A. Performing the mask process using the mask pattern illustrated in FIG. 38B enables formation of the first dot pattern in the third embodiment on the print medium in the forward scan. Moreover, performing the mask process by using a mask pattern obtained by inverting the mask pattern of FIG. 38B in the main scanning direction enables formation of the second dot pattern in the third embodiment in the backward scan. A combined dot pattern obtained by combining the first dot pattern and the second dot pattern is thus the same robust pattern as that in the third embodiment.

OTHER EMBODIMENTS

Although the contents in which the image processing apparatus 1 performs the steps described in FIGS. 14, 23, and 36 are described above, the controller 1301 of the printing apparatus 2 may perform some of the steps. In the steps illustrated in the aforementioned flowcharts, there is no particular definition of a clear border between the steps performed by the image processing apparatus 1 and the steps performed by the printing apparatus 2. For example, in the third and fourth embodiments, if a mode in which the image processing apparatus 1 performs the steps up to the quantization process is employed, the image processing apparatus 1 can perform the steps up to the quantization process at the resolution of 600 dpi that is lower than the print resolution and this enables reduction of the processing load. In this case, in the printing apparatus 2, the controller 1301 performs the index development process by using the dot arrangement pattern and the index pattern stored in the data buffer 1306. In this case, the entire printing system including the image processing apparatus 1 and the printing apparatus 2 is the image processing apparatus of the present invention. Moreover, a mode in which the printing apparatus 2 directly receives the multi-valued RGB image data and performs all steps described in the aforementioned flowcharts may be employed depending on the performance of the printing apparatus. In this case, the printing apparatus 2 is the image processing apparatus of the present invention.

Moreover, the number of bits of input-output data in each step is not limited to the number of bits described above. The number of bits of output data may be set higher than the number of bits of input data to maintain accuracy. Moreover, although four colors of CMYK are described as an example of the number of colors in the printing apparatus, the printing apparatus may be configured to use colors that are of the same type but have different densities such as light cyan, light magenta, and gray and particular colors such as red, green, and blue. In this case, the image processing apparatus may generate as many types of gradation data as the number of colors in the color separation process and perform the aforementioned image processes for each color in the processes after the color separation process.

Moreover, although the serial inkjet printing apparatus is described as an example in the aforementioned embodiments, all embodiments described above can be applied also to a line printing apparatus. Also in a line inkjet print head, misalignment between nozzle rows sometimes becomes a problem in the case where two or more nozzle rows perform printing on the same pixel region. In such a case, the image processing apparatus only has to perform processes similar to those in the aforementioned embodiments with a dot pattern formed by any nozzle row being the first dot pattern and a dot pattern formed by the other nozzle row being the second dot pattern.

Moreover, although the thermal jet print head that ejects the ink by applying the voltage pulse to the heater is used in the third and fourth embodiments, the ejection method is not limited to a particular method in any of the aforementioned embodiments. For example, the embodiments can be effectively applied to various printing apparatuses such as a so-called piezoelectric inkjet recording apparatus that ejects ink by using a piezoelectric element.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-128331 filed Jul. 29, 2020, which is hereby incorporated by reference wherein in its entirety.

What is claimed is:

1. An image processing method comprising the steps of:
obtaining gradation data corresponding to a predetermined gradation value; and
generating first data corresponding to a first dot pattern and second data corresponding to a second dot pattern which will be printed so as to overlap the first dot pattern on a print medium based on the gradation data,
the first dot pattern including first lattices which are formed of dots arranged repeatedly at a first interval in a first direction and dots arranged repeatedly at a second interval in a second direction, and
the second dot pattern including second lattices which are formed of dots arranged repeatedly at a third interval in a third direction and dots arranged repeatedly at a fourth interval in a fourth direction,
wherein a combined dot pattern formed by combining the first dot pattern and the second dot pattern in a first relative position in which a center of one dot in the second dot pattern is superimposed on a center of one dot in the first dot pattern, includes:
 (i) first neighboring dots in which a first dot included in the first dot pattern and a second dot included in the second dot pattern are located at a distance from each other which distance is smaller than any one of the first, second, third and fourth intervals, and
 (ii) second neighboring dots in which a third dot included in the first dot pattern and a fourth dot included in the second dot pattern are located at a distance from each other which distance is smaller than any one of the first, second, third and fourth intervals,
wherein a first tilt of a straight line connecting a center of each dot in the first neighboring dots is different from a second tilt of a straight line connecting a center of each dot in the second neighboring dots.

2. The image processing method according to claim 1, wherein the combined dot pattern further includes:
 (iii) third neighboring dots in which a fifth dot included in the first dot pattern and a sixth dot included in the second dot pattern are located at a distance from each other which distance is smaller than any one of the first, second, third and fourth intervals,
wherein a third tilt of a straight line connecting a center of each dot in the third neighboring dots is different from the first tilt and the second tilt.

3. The image processing method according to claim 1, wherein in the combined dot pattern, a plurality of unit regions each of which includes the superimposed dots, the first neighboring dots and the second neighboring dots, are arranged in a repeating manner.

4. The image processing method according to claim 1, wherein
a second combined dot pattern formed by combining the first dot pattern and the second dot pattern in a second relative position different from the first relative position, includes:
 (iv) superimposed dots formed by superimposing a dot included in the first dot pattern and a dot included in the second dot pattern,
 (v) fourth neighboring dots in which a seventh dot included in the first dot pattern and an eighth dot included in the second dot pattern are located at a distance from each other which distance is smaller than any one of the first, second, third and fourth intervals, and a tilt of a straight line connecting a center of each dot in the seventh dot and the eighth dot is the first tilt, and
 (vi) fifth neighboring dots in which a ninth dot included in the first dot pattern and a tenth dot included in the second dot pattern are located at a distance from each other which distance is smaller than any one of the first, second, third and fourth intervals, and a tilt of a straight line connecting a center of each dot in the ninth dot and the tenth dot is the second tilt.

5. The image processing method according to claim 1, further comprising the steps of:
generating two pieces of gradation data based on the gradation data,
generating first quantized data by quantizing one of the two pieces of gradation data by using a first threshold matrix, and
generating second quantized data by quantizing the other of the two pieces of gradation data by using a second threshold matrix different from the first threshold matrix.

6. The image processing method according to claim 5, wherein
first gradation data and second gradation data are generated based on gradation data of a first gradation value,
third gradation data and fourth gradation data are generated based on gradation data of a second gradation value higher than the first gradation value,
a print dot pattern corresponding to a result of quantization performed on the third gradation data by using the first threshold matrix is a pattern in which print dots are added to a print dot pattern corresponding to a result of quantization performed on the first gradation data by using the first threshold matrix, and
a print dot pattern corresponding to a result of quantization performed on the fourth gradation data by using the second threshold matrix is a pattern in which print dots are added to a print dot pattern corresponding to a result of quantization performed on the second gradation data by using the second threshold matrix.

7. The image processing method according to claim 1, wherein the gradation data corresponds to a first color, and the first dot pattern and the second dot pattern are patterns for printing dots of the first color,
the image processing method further comprising the steps of:
obtaining gradation data corresponding to a second color, and
generating third data corresponding to a third dot pattern for printing dots of the second color and fourth data corresponding to a fourth dot pattern for printing dots of the second color which will be printed so as to overlap the third dot pattern on a print medium based on the gradation data corresponding to the second color, the third dot pattern including third lattices which are formed of dots arranged repeatedly at a fifth interval in a fifth direction and dots arranged repeatedly at a sixth interval in a sixth direction, and the fourth dot pattern including fourth lattices which are formed of dots arranged repeatedly at a seventh interval in a seventh direction and dots arranged repeatedly at an eighth interval in an eighth direction, wherein a second combined dot pattern formed by combining the third dot pattern and the fourth dot pattern in a relative position in which a center of one dot in the fourth dot pattern is superimposed on a center of one dot in the third dot pattern, includes:

(iii) third neighboring dots in which a fifth dot included in the third dot pattern and a sixth dot included in the fourth dot pattern are located at a distance from each other which distance is smaller than any one of the fifth, the sixth, the seventh and the eighth intervals, and (iv) fourth neighboring dots in which a seventh dot included in the third dot pattern and an eighth dot included in the fourth dot pattern are located at a distance from each other which distance is smaller than any one of the fifth, the sixth, the seventh and the eighth intervals, wherein a third tilt of a straight line connecting a center of each dot in the third neighboring dots is different from a fourth tilt of a straight line connecting a center of each dot in the fourth neighboring dots.

8. The image processing method according to claim 7, further comprising the steps of:

generating first gradation data and second gradation data based on gradation data corresponding to the first color, generating third gradation data and fourth gradation data based on gradation data corresponding to the second color, generating first quantized data corresponding to the first color by comparing a first threshold in a first threshold matrix with the first gradation data, generating third quantized data corresponding to the second color by comparing a corrected threshold obtained by subtracting a value of the first gradation data from the first threshold with the third gradation data, generating second quantized data corresponding to the first color by comparing a second threshold in a second threshold matrix with the second gradation data, and generating fourth quantized data corresponding to the second color by comparing a corrected threshold obtained by subtracting a value of the third gradation data from the second threshold with the fourth gradation data.

9. The image processing method according to claim 7, wherein a lightness of a dot of the first color is lower than a lightness of a dot of the second color.

10. The image processing method according to claim 1, wherein the first dot pattern is printed in a forward scan of a print unit and the second dot pattern is printed in a backward scan of the print unit.

11. The image processing method according to claim 1, wherein the first dot pattern is printed with a first nozzle row arranged in a print unit in a predetermined scan and the second dot pattern is printed with a second nozzle row arranged in the print unit in the predetermined scan.

12. A non-transitory computer-readable storage medium storing a program for causing one or more processors of a computer to execute an image processing method comprising the steps of:

obtaining gradation data corresponding to a predetermined gradation value; and generating first data corresponding to a first dot pattern and second data corresponding to a second dot pattern which will be printed so as to overlap the first dot pattern on a print medium based on the gradation data, the first dot pattern including first lattices which are formed of dots arranged repeatedly at a first interval in a first direction and dots arranged repeatedly at a second interval in a second direction, and the second dot pattern including second lattices which are formed of dots arranged repeatedly at a third interval in a third direction and dots arranged repeatedly at a fourth interval in a fourth direction, wherein a combined dot pattern formed by combining the first dot pattern and the second dot pattern in a relative position in which a center of one dot in the second dot pattern is superimposed on a center of one dot in the first dot pattern, includes:

(i) first neighboring dots in which a first dot included in the first dot pattern and a second dot included in the second dot pattern are located at a distance from each other which distance is smaller than any one of the first, second, third and fourth intervals, and (ii) second neighboring dots in which a third dot included in the third dot pattern and a fourth dot included in the fourth dot pattern are located at a distance from each other which distance is smaller than any one of the first, second, third and fourth intervals, wherein a first tilt of a straight line connecting a center of each dot in the first neighboring dots is different from a second tilt of a straight line connecting a center of each dot in the second neighboring dots.

13. An image processing apparatus comprising:

an obtaining unit configured to obtain gradation data corresponding to a predetermined gradation value; and a generation unit configured to generate first data corresponding to a first dot pattern and second data corresponding to a second dot pattern which will be printed so as to overlap the first dot pattern on a print medium based on the gradation data, the first dot pattern including first lattices which are formed of dots arranged repeatedly at a first interval in a first direction and dots arranged repeatedly at a second interval in a second direction, and the second dot pattern including second lattices which are formed of dots arranged repeatedly at a third interval in a third direction and dots arranged repeatedly at a fourth interval in a fourth direction, wherein a combined dot pattern formed by combining the first dot pattern and the second dot pattern in a first relative position in which a center of one dot in the second dot pattern is superimposed on a center of one dot in the first dot pattern, includes:

(i) first neighboring dots in which a first dot included in the first dot pattern and a second dot included in the second dot pattern are located at a distance from each other which distance is smaller than any one of the first, second, third and fourth intervals, and (ii) second neighboring dots in which a third dot included in the first dot pattern and a fourth dot included in the second dot pattern are located at a distance from each other which distance is smaller than any one of the first, second, third and fourth intervals, wherein a first tilt of a straight line connecting a center of each dot in the first neighboring dots is different from a second tilt of a straight line connecting a center of each dot in the second neighboring dots.

14. The image processing apparatus according to claim 13, wherein the combined dot pattern includes,
(iii) third neighboring dots in which a fifth dot included in the first dot pattern and a sixth dot included in the second dot pattern are located at a distance from each other which distance is smaller than any one of the first, second, third and fourth intervals, wherein a third tilt of a straight line connecting a center of each dot in the third neighboring dots is different from the first tilt and the second tilt.

15. The image processing apparatus according to claim 13, wherein a plurality of unit regions each of which includes the superimposed dots, the first neighboring dots and the second neighboring dots are arranged in a repeating manner in the combined dot pattern.

16. The image processing apparatus according to claim 13, wherein
a second combined dot pattern formed by combining the first dot pattern and the second dot pattern in a second relative position different from the first relative position, includes:
(iv) superimposed dots formed by superimposing a dot included in the first dot pattern and a dot included in the second dot pattern,
(v) fourth neighboring dots in which a seventh dot included in the first dot pattern and an eighth dot included in the second dot pattern are located at a distance from each other which distance is smaller than any one of the first, second, third and fourth intervals, and a tilt of a straight line connecting a center of each dot in the seventh dot and the eighth dot is the first tilt, and
(vi) fifth neighboring dots in which a ninth dot included in the first dot pattern and a tenth dot included in the second dot pattern are located at a distance from each other which distance is smaller than any one of the first, second, third and fourth intervals, and a tilt of a straight line connecting a center of each dot in the ninth dot and the tenth dot is the second tilt.

17. The image processing apparatus according to claim 13, wherein the generation unit,
generates two pieces of gradation data based on the gradation data,
generates first quantized data by quantizing one of the two pieces of gradation data by using a first threshold matrix, and
generates second quantized data by quantizing the other of the two pieces of gradation data by using a second threshold matrix different from the first threshold matrix.

18. The image processing apparatus according to claim 17, wherein
the generation unit generates first gradation data and second gradation data based on gradation data of a first gradation value, and generates third gradation data and fourth gradation data based on gradation data of a second gradation value higher than the first gradation value,
a print dot pattern corresponding to a result of quantization performed on the third gradation data by using the first threshold matrix is a pattern in which print dots are added to a print dot pattern corresponding to a result of quantization performed on the first gradation data by using the first threshold matrix, and
a print dot pattern corresponding to a result of quantization performed on the fourth gradation data by using the second threshold matrix is a pattern in which print dots are added to a print dot pattern corresponding to a result of quantization performed on the second gradation data by using the second threshold matrix.

19. The image processing apparatus according to claim 13, wherein
the gradation data corresponds to a first color,
the first dot pattern and the second dot pattern are patterns for printing dots of the first color,
the obtaining unit further obtains gradation data corresponding to a second color,
the generation unit further generates third data corresponding to a third dot pattern for printing dots of the second color and fourth data corresponding to a fourth dot pattern for printing dots of the second color which will be printed so as to overlap the third dot pattern on a print medium based on the gradation data corresponding to the second color,
the third dot pattern including third lattices which are formed of dots arranged repeatedly at a fifth interval in a fifth direction and dots arranged repeatedly at a sixth interval in a sixth direction, and
the fourth dot pattern including fourth lattices which are formed of dots arranged repeatedly at a seventh interval in a seventh direction and dots arranged repeatedly at an eighth interval in an eighth direction,
wherein
a second combined dot pattern formed by combining the third dot pattern and the fourth dot pattern in a relative position in which a center of one dot in the fourth dot pattern is superimposed on a center of one dot in the third dot pattern, includes:
(iii) third neighboring dots in which a fifth dot included in the third dot pattern and a sixth dot included in the fourth dot pattern are located at a distance from each other which distance is smaller than any one of the fifth, sixth, seventh and eighth intervals, and
(iv) fourth neighboring dots in which a seventh dot included in the third dot pattern and an eighth dot included in the fourth dot pattern are located at a distance from each other which distance is smaller than any one of the fifth, sixth, seventh and eighth intervals,
wherein a third tilt of a straight line connecting a center of each dot in the third neighboring dots is different from a fourth tilt of a straight line connecting a center of each dot in the fourth neighboring dots.

20. The image processing apparatus according to claim 19, wherein the generation unit,
generates first gradation data and second gradation data based on gradation data corresponding to the first color,
generates third gradation data and fourth gradation data based on gradation data corresponding to the second color,
generates first quantized data corresponding to the first color by comparing a first threshold in a first threshold matrix with the first gradation data,
generates third quantized data corresponding to the second color by comparing a corrected threshold obtained by subtracting a value of the first gradation data from the first threshold with the third gradation data, generates second quantized data corresponding to the first color by comparing a second threshold in a second threshold matrix with the second gradation data, and generates fourth quantized data corresponding to the second color by comparing a corrected threshold obtained by subtracting a value of the third gradation data from the second threshold with the fourth gradation data.

21. The image processing apparatus according to claim 19, wherein a lightness of a dot of the first color is lower than a lightness of a dot of the second color.

22. The image processing apparatus according to claim 13, wherein the first dot pattern is printed in a forward scan of a print unit and the second dot pattern is printed in a backward scan of the print unit.

23. The image processing apparatus according to claim 13, wherein the first dot pattern is printed with a first nozzle row arranged in a print unit in a predetermined scan and the second dot pattern is printed with a second nozzle row arranged in the print unit in the predetermined scan.

* * * * *